United States Patent
Ko et al.

(10) Patent No.: US 8,325,846 B2
(45) Date of Patent: Dec. 4, 2012

(54) DATA TRANSMISSION METHOD AND APPARATUS IN MULTIPLE ANTENNA SYSTEM

(75) Inventors: Hyun Soo Ko, Anyang-si (KR); Ja Ho Koo, Anyang-si (KR); Jae Hoon Chung, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/201,214

(22) PCT Filed: Feb. 16, 2010

(86) PCT No.: PCT/KR2010/000957
§ 371 (c)(1),
(2), (4) Date: Aug. 11, 2011

(87) PCT Pub. No.: WO2010/093226
PCT Pub. Date: Aug. 19, 2010

(65) Prior Publication Data
US 2011/0310994 A1    Dec. 22, 2011

Related U.S. Application Data

(60) Provisional application No. 61/152,560, filed on Feb. 13, 2009, provisional application No. 61/154,424, filed on Feb. 22, 2009, provisional application No. 61/185,847, filed on Jun. 10, 2009, provisional application No. 61/222,121, filed on Jul. 1, 2009, provisional application No. 61/222,897, filed on Jul. 2, 2009, provisional application No. 61/295,973, filed on Jan. 18, 2010, provisional application No. 61/296,846, filed on Jan. 20, 2010, provisional application No. 61/302,895, filed on Feb. 9, 2010.

(30) Foreign Application Priority Data

Feb. 13, 2010  (KR) ................ 10-2010-0013654

(51) Int. Cl.
    H04B 7/02 (2006.01)
    H04L 1/02 (2006.01)
(52) U.S. Cl. ........ 375/267; 375/299; 375/347; 375/346; 375/230; 375/231; 455/500; 455/504; 455/506; 455/101
(58) Field of Classification Search .................. 375/267, 375/299, 347, 346, 230, 231; 425/500, 504, 425/506, 101
See application file for complete search history.

(56) References Cited

U.S. PATENT DOCUMENTS 8,107,455 B2 * 1/2012 Ko et al. ............... 370/344
(Continued)

FOREIGN PATENT DOCUMENTS

| EP | 1928115 | 6/2008 |
|---|---|---|
| KR | 10-0640349 | 10/2006 |
| KR | 1020080086333 | 9/2008 |

(Continued)

OTHER PUBLICATIONS

Myung et al., "Peak Power Characteristics of Single Carrier FDMA MIMO Precoding System", IEEE 66th Vehicular Technology Conference, Sep. 2007, pp. 477-481.

(Continued)

Primary Examiner — Phuong Phu
(74) Attorney, Agent, or Firm — Lee, Hong, Degerman, Kang & Waimey

(57) ABSTRACT

A data transmission method in a multiple antenna system is provided. The method includes: defining a codebook including at least one precoding matrix composed of a plurality of rows and columns, wherein the codebook is at least one of a first type in which all elements of the precoding matrix are non-zero elements, a second type in which any one column of the precoding matrix includes non-zero element and the remaining columns include at least one zero element, and a third type in which all columns of the precoding matrix include at least one zero element; precoding an input symbol by using the defined codebook; and transmitting the precoded symbol.

16 Claims, 8 Drawing Sheets

U.S. PATENT DOCUMENTS

| | | | |
|---|---|---|---|
| 8,194,778 B2* | 6/2012 | Ko et al. | 375/267 |
| 2007/0286304 A1 | 12/2007 | Kim et al. | |
| 2008/0013610 A1 | 1/2008 | Varadarajan et al. | |
| 2008/0186916 A1 | 8/2008 | Oshiba et al. | |
| 2008/0260058 A1 | 10/2008 | Li | |
| 2010/0208838 A1* | 8/2010 | Lee et al. | 375/267 |
| 2010/0220801 A1* | 9/2010 | Lee et al. | 375/267 |
| 2010/0284484 A1* | 11/2010 | Jongren et al. | 375/267 |
| 2011/0058621 A1* | 3/2011 | Clerckx et al. | 375/267 |
| 2011/0096851 A1* | 4/2011 | Clerckx et al. | 375/259 |

FOREIGN PATENT DOCUMENTS

| | | |
|---|---|---|
| WO | 2007041086 | 4/2007 |
| WO | 2007095102 | 8/2007 |

OTHER PUBLICATIONS

Griego et al., "Uplink Single-User MIMO for 3GPP LTE," IEEE International Symposium on Personal, Indoor and Mobile Radio Communications, Sep. 2007, pp. 1-5.

* cited by examiner

FIG. 5

Type 1
$$\frac{1}{2}\begin{bmatrix} a & e & i \\ b & f & j \\ c & g & k \\ d & h & l \end{bmatrix}$$

Type 2
$$\frac{1}{2}\begin{bmatrix} a & e & 0 \\ b & f & 0 \\ c & 0 & k \\ d & 0 & l \end{bmatrix}$$

Type 3
$$\frac{1}{2}\begin{bmatrix} a & 0 & 0 \\ b & 0 & 0 \\ 0 & g & 0 \\ 0 & 0 & l \end{bmatrix}$$

FIG. 6

$$\frac{1}{2}\begin{bmatrix} 1 & 1 & 0 \\ -a & a & j \\ 1 & 0 & 1 \\ -b & 0 & b \end{bmatrix} \qquad \frac{1}{2}\begin{bmatrix} 1 & 1 & 0 \\ -a & a & j \\ -1 & 0 & 1 \\ b & 0 & b \end{bmatrix}$$

$$\frac{1}{2}\begin{bmatrix} 1 & 1 & 0 \\ -a & a & 0 \\ j & 0 & 1 \\ -jb & 0 & b \end{bmatrix} \qquad \frac{1}{2}\begin{bmatrix} 1 & 1 & 0 \\ -a & a & 0 \\ -j & 0 & 1 \\ jb & 0 & b \end{bmatrix}$$

FIG. 7

$$\frac{1}{2}\begin{bmatrix} a & e & 0 \\ b & f & 0 \\ c & 0 & k \\ d & 0 & l \end{bmatrix}$$

$$\sqrt{\frac{1}{3}} \quad \sqrt{\frac{2}{3}} \quad \sqrt{\frac{2}{3}}$$

DATA TRANSMISSION METHOD AND APPARATUS IN MULTIPLE ANTENNA SYSTEM

CROSS-REFERENCE TO RELATED APPLICATIONS

This application is the National Stage filing under 35 U.S.C. 371 of International Application No. PCT/KR2010/000957, filed on Feb. 16, 2010, which claims the benefit of earlier filing date and right of priority to Korean Application No. 10-2010-0013654, filed on Feb. 13, 2010, and also claims the benefit of U.S. Provisional Application Ser. Nos. 61/302,895, filed on Feb. 9, 2010, 61/296,846, filed on Jan. 20, 2010, 61/295,973, filed on Jan. 18, 2010, 61/222,897, filed on Jul. 2, 2009, 61/222,121, filed on Jul. 1, 2009, 61/185,847, filed on Jun. 10, 2009, 61/154,424, filed on Feb. 22, 2009, and 61/152,560, filed on Feb. 13, 2009, the contents of which are all hereby incorporated by reference herein in their entirety.

TECHNICAL FIELD

The present invention relates to wireless communications, and more particularly, to a data transmission method using multiple antennas.

BACKGROUND ART

To maximize performance and communication capacity of a wireless communication system, a multiple input multiple output (MIMO) system has drawn attention in recent years. Being evolved from the conventional technique in which a single transmit (Tx) antenna and a single receive (Rx) antenna are used, a MIMO technique uses multiple Tx antennas and multiple Rx antennas to improve transfer efficiency of data to be transmitted or received. The MIMO system is also referred to as a multiple antenna system. In the MIMO technique, instead of receiving one whole message through a single antenna path, data segments are received through a plurality of antennas and are then collected as one piece of data. As a result, a data transfer rate can be improved in a specific range, or a system range can be increased with respect to a specific data transfer rate.

The MIMO technique includes transmit diversity, spatial multiplexing, and beamforming. The transmit diversity is a technique in which the multiple Tx antennas transmit the same data so that transmission reliability increases. The spatial multiplexing is a technique in which the multiple Tx antennas simultaneously transmit different data so that data can be transmitted at a high speed without increasing a system bandwidth. The beamforming is used to add a weight to multiple antennas according to a channel condition so as to increase a signal to interference plus noise ratio (SINR) of a signal. In this case, the weight can be expressed by a weight vector or a weight matrix, which is respectively referred to as a precoding vector or a precoding matrix.

The spatial multiplexing is classified into single-user spatial multiplexing and multi-user spatial multiplexing. The single-user spatial multiplexing is also referred to as a single user MIMO (SU-MIMO). The multi-user spatial multiplexing is also referred to as a spatial division multiple access (SDMA) or a multi user MIMO (MU-MIMO). A capacity of a MIMO channel increases in proportion to the number of antennas. The MIMO channel can be decomposed into independent channels. If the number of Tx antennas is Nt, and the number of Rx antennas is Nr, then the number of independent channels is Ni where $Ni \leq \min\{Nt, Mr\}$. Each independent channel can be referred to as a spatial layer. A rank represents the number of non-zero eigen-values of the MIMO channel and can be defined as the number of spatial streams that can be multiplexed.

The MIMO technique includes a codebook-based precoding scheme. The codebook-based precoding scheme performs data precoding by using a precoding matrix which is the most similar to a MIMO channel among predetermined precoding matrices. The use of the codebook-based precoding scheme can result in decrease of overhead since a precoding matrix indicator (PMI) can be transmitted as feedback data. The codebook consists of a codebook set capable of representing a spatial channel. The number of antennas has to be increased to obtain a higher data transfer rate. The greater the number of antennas, the greater the number of codebook sets used to configure the codebook.

Recently, a user equipment having four antennas is taken into account. Therefore, there is a need for a codebook applicable to the increased number of antennas of the user equipment. A new codebook is designed by considering the following aspects. (1) A signal having a low peak-to-average power ratio (PAPR) in an uplink shall be able to be transmitted, and power shall be effectively used when transmitting the low-PAPR signal. (2) A signal of some antennas may be transmitted with power lower than actual power due to an obstacle located right before such as a hand gripping situation, and a preferable antenna for this case shall be able to be used selectively. (3) When applying a pre-defined downlink codebook to an uplink scenario, a problem caused by a limited maximum output of the user equipment shall be taken input account. In a low geometry, a signal is transmitted by increasing output power, and due to a limited output of a power amplifier of the user equipment, a signal having a lower PAPR can be transmitted with effective power by using a defined downlink codebook. However, Tx symbols are additionally used due to elements of a row of a conventional codebook, and thus the PAPR may increase. As such, the codebook of which the PAPR is increasing is not suitable in uplink transmission in which power is limited.

Accordingly, there is a need to design a codebook suitable for uplink transmission depending on the number of antennas of a user equipment in a multiple antenna system.

SUMMARY OF INVENTION

Technical Problem

The present invention provides a method and apparatus for designing a codebook suitable for uplink transmission and for effectively transmitting uplink data by using the codebook.

Technical Solution

According to an aspect of the present invention, a data transmission method in a multiple antenna system is provided. The method includes: defining a codebook including at least one precoding matrix composed of a plurality of rows and columns, wherein the codebook is at least one of a first type in which all elements of the precoding matrix are non-zero elements, a second type in which any one column of the precoding matrix includes non-zero element and the remaining columns include at least one zero element, and a third type in which all columns of the precoding matrix include at least one zero element; precoding an input symbol by using the defined codebook; and transmitting the precoded symbol.

In the aforementioned aspect of the present invention, the codebook may be a codebook for rank-3 transmission.

In addition, the codebook may be a codebook for 4 transmit antennas.

In addition, the codebook may be a codebook for uplink transmission.

Advantageous Effects

A codebook suitable for uplink transmission through an increased number of antennas in a multiple antenna system can be provided, thereby being able to effectively transmit uplink data.

DESCRIPTION OF DRAWINGS

FIG. 5 shows exemplary types of a 4 transmit (Tx) rank-3 codebook according to an embodiment of the present invention.
FIG. 6 shows a method of configuring a 4Tx rank-3 codebook according to an embodiment of the present invention.
FIG. 7 shows power allocation using a 4Tx rank-3 codebook according to an embodiment of the present invention.

MODE FOR INVENTION

Figure 1:
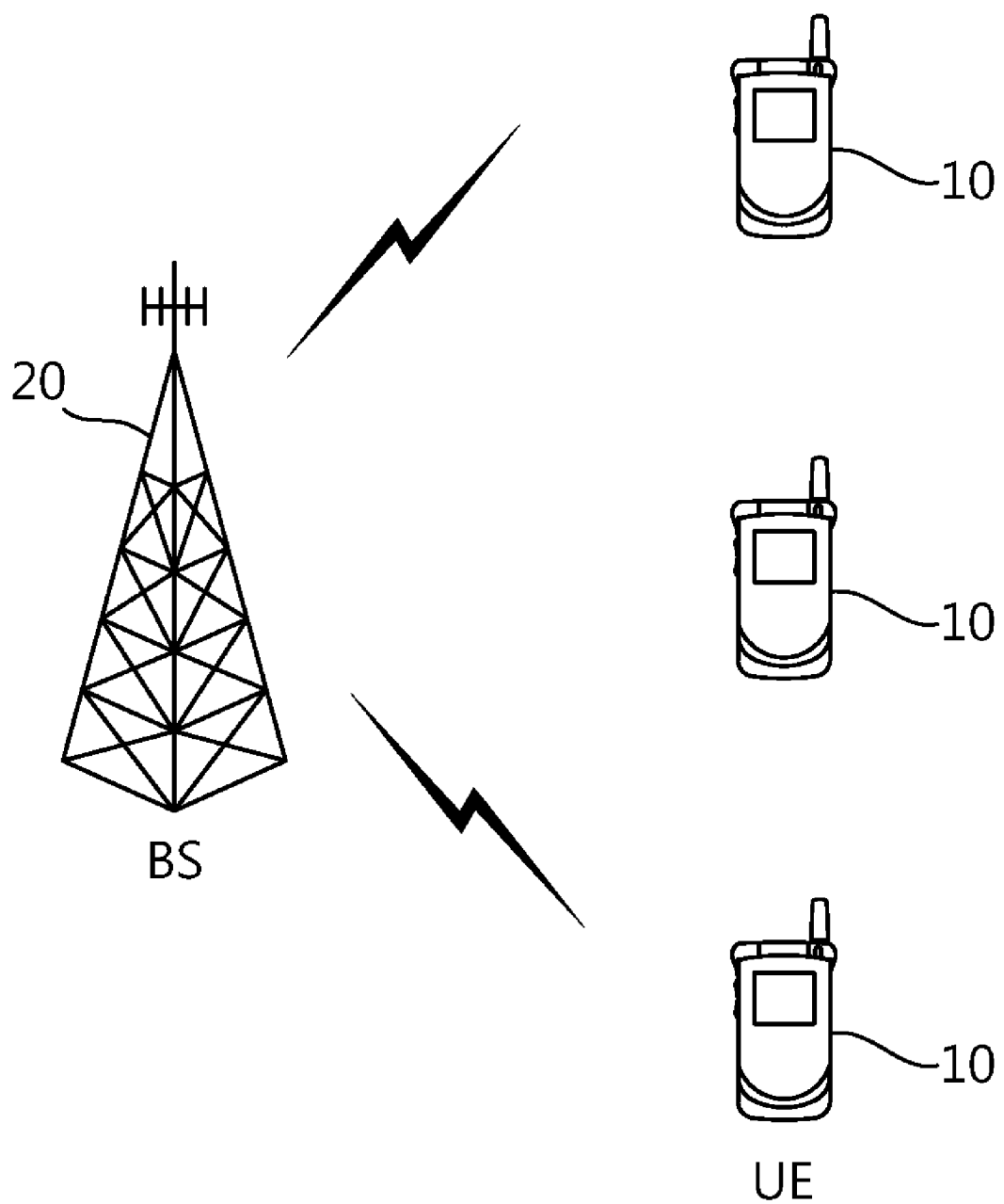
FIG. 1 shows a wireless communication system.

FIG. 1 shows a wireless communication system. The wireless communication system can be widely deployed to provide a variety of communication services, such as voices, packet data, etc.

The wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink (DL) denotes a communication link from the BS to the UE, and an uplink (UL) denotes a communication link from the UE to the BS. In the DL, a transmitter may be a part of the BS 20, and a receiver may be a part of the UE 10. In the UL, the transmitter may be a part of the UE 10, and the receiver may be a part of the BS 20.

The wireless communication system may be a system based on orthogonal frequency division multiplexing (OFDM)/orthogonal frequency division multiple access (OFDMA). The OFDM uses a plurality of orthogonal subcarriers. Further, the OFDM uses an orthogonality between inverse fast Fourier transform (IFFT) and fast Fourier transform (FFT). A transmitter transmits data by performing IFFT on the data. A receiver restores original data by performing FFT on a received signal. The transmitter uses IFFT to combine the plurality of subcarriers, and the receiver uses FFT to split the plurality of subcarriers.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas. The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched Tx diversity (FSTD), time switched Tx diversity (TSTD), etc. In case of a rank 2 or higher ranks, the scheme may be spatial multiplexing (SM), generalized cyclic delay diversity (GCDD), selective virtual antenna permutation (S-VAP), etc. The SFBC is a scheme for effectively applying selectivity in a space domain and a frequency domain to ensure both a diversity gain and a multi-user scheduling gain in a corresponding dimension. The STBC is a scheme for applying selectivity in the space domain and a time domain. The FSTD is a scheme in which signals transmitted to multiple antennas are divided based on frequency, and the TSTD is a scheme in which the signals transmitted to the multiple antennas are divided based on time. The SM is a scheme for transmitting different data to each antenna to improve a transfer rate. The GCDD is a scheme for applying selectivity in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
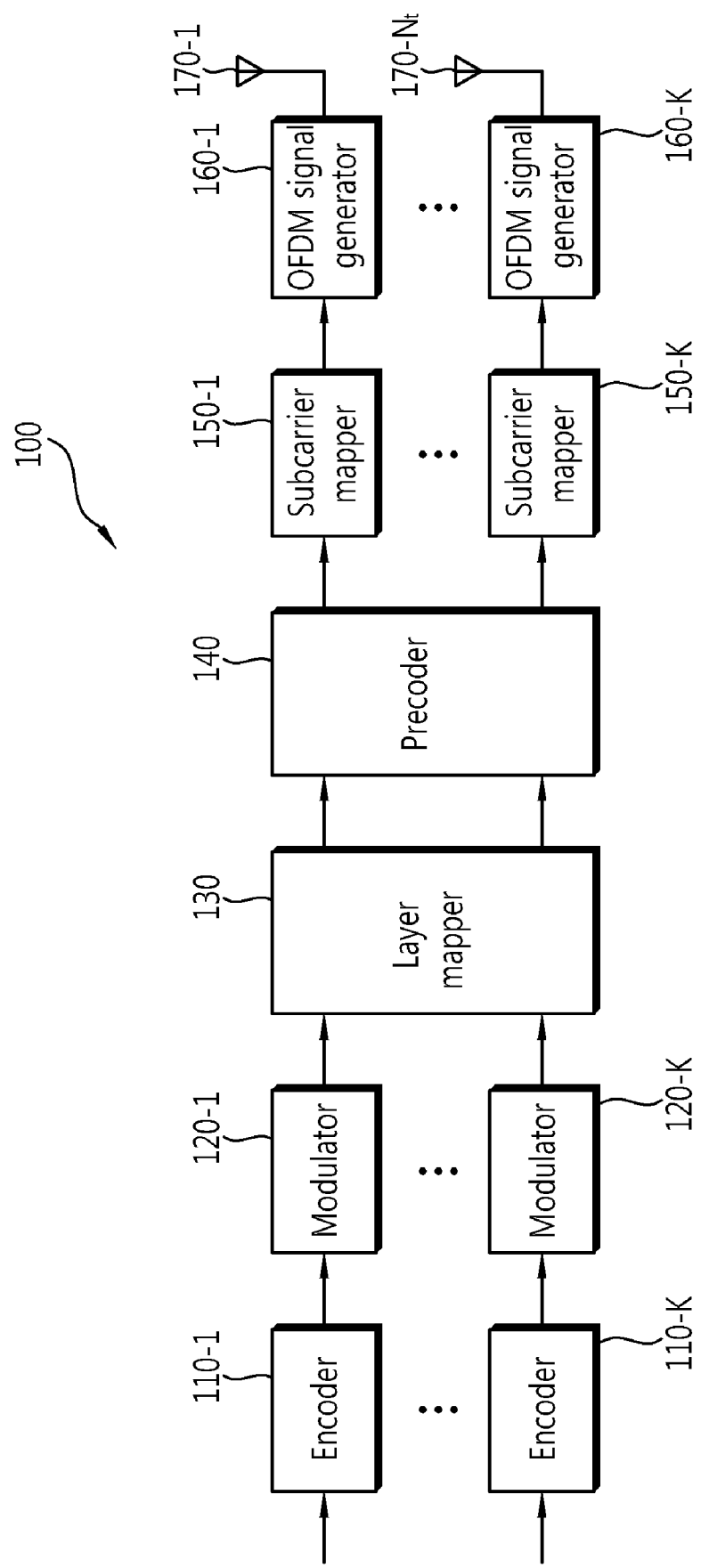
FIG. 2 shows an exemplary structure of a transmitter.

FIG. 2 shows an exemplary structure of a transmitter. A transmitter 100 includes encoders 110-1, ..., 110-K, modulators 120-1, ..., 120-K, a layer mapper 130, a precoder 140, subcarrier mappers 150-1, ..., 150-K, and OFDM signal generators 160-1, ..., 160-K. The transmitter 100 also includes Nt (Nt>1) Tx antennas 170-1, ..., 170-Nt.

The encoders 110-1, ..., 110-K generate coded data by encoding input data according to a predetermined coding scheme. The coded data is referred to as a codeword. A codeword b can be expressed by Equation 1 below.

$$b^{(q)}(0), \ldots, b^{(q)}(M_{bit}^{(q)}-1) \quad \text{[Equation 1]}$$

In Equation 1, q denotes a codeword index, and $M_{bit}^{(q)}$ denotes the number of bits of the codeword q.

Scrambling is performed on the codeword. A scrambled codeword c can be expressed by Equation 2 below.

$$c^{(q)}(0), \ldots, c^{(q)}(M_{bit}^{(q)}-1) \quad \text{[Equation 2]}$$

The modulators 120-1, ..., 120-K arrange the coded data into symbols representing locations on a signal constellation. A modulation scheme is not limited to a specific modulation scheme, and may be an m-phase shift keying (m-PSK) or an m-quadrature amplitude modulation (m-QAM). For example, the m-PSK may be binary PSK (BPSK), quadrature PSK (QPSK), or 8-PSK. The m-QAM may be 16-QAM, 64-QAM, or 256-QAM.

A codeword d arranged to the symbol on the signal constellation can be expressed by Equation 3 below.

$$d^{(q)}(0), \ldots, d^{(q)}(M_{symb}^{(q)}-1) \quad \text{[Equation 3]}$$

In Equation 3, $M_{symb}^{(q)}$ denotes the number of symbols of the codeword q.

The layer mapper 130 defines a layer of an input symbol so that each antenna can distribute a specific symbol to a path of each antenna. The layer is defined as an information path input to the precoder 140. A symbol x input to the path of each antenna can be expressed by Equation 4 below.

$$x(i)=[x^{(0)}(i)\ldots x^{(v-1)}(i)]^T \qquad \text{[Equation 4]}$$

In Equation 4, v denotes the number of layers.

The information path located ahead of the precoder 140 can be called a virtual antenna (or a layer). The precoder 140 processes an input symbol by using a MIMO scheme according to the multiple Tx antennas 170-1, ..., 170-Nt. The precoder 140 may use codebook-based precoding. A codebook (e.g., 4Tx rank-3 codebook) generated according to the present invention may be used in the codebook-based precoding.

The precoder 140 distributes an antenna-specific symbol to the subcarrier mappers 150-1, ..., 150-K for a path of a specific antenna. Each information path transmitted to one antenna by the precoder 140 by the use of one subcarrier mapper is called a stream. The antenna may be a physical antenna.

A signal $y^{(p)}(i)$ sent to each antenna port p can be expressed by Equation 5 below.

$$y(i)=[\ldots y^{(p)}(i) \ldots]^T \qquad \text{[Equation 5]}$$

The subcarrier mappers 150-1, ..., 150-K allocate input symbols to relevant subcarriers and then multiplex the resultant symbols according to a user. The OFDM signal generators 160-1, ..., 160-K modulate input symbols according to an OFDM scheme and then outputs OFDM symbols. The OFDM signal generators 160-1, ..., 160-K can perform IFFT on input symbols. A cyclic prefix (CP) may be inserted into a time-domain symbol which has undergone the IFFT. The OFDM symbols are transmitted through the respective Tx antennas 170-1, ..., 170-Nt.

In the MIMO system, the transmitter 100 can operate in two modes. One is an SCW mode and the other is an MCW mode. In the SCW mode, Tx signals transmitted through a MIMO channel have the same data rate. In the MCW mode, data transmitted through the MIMO channel is independently encoded, and thus the Tx signals can have different data rates. The MCW mode operates when a rank is greater than or equal to 2.

Figure 3:
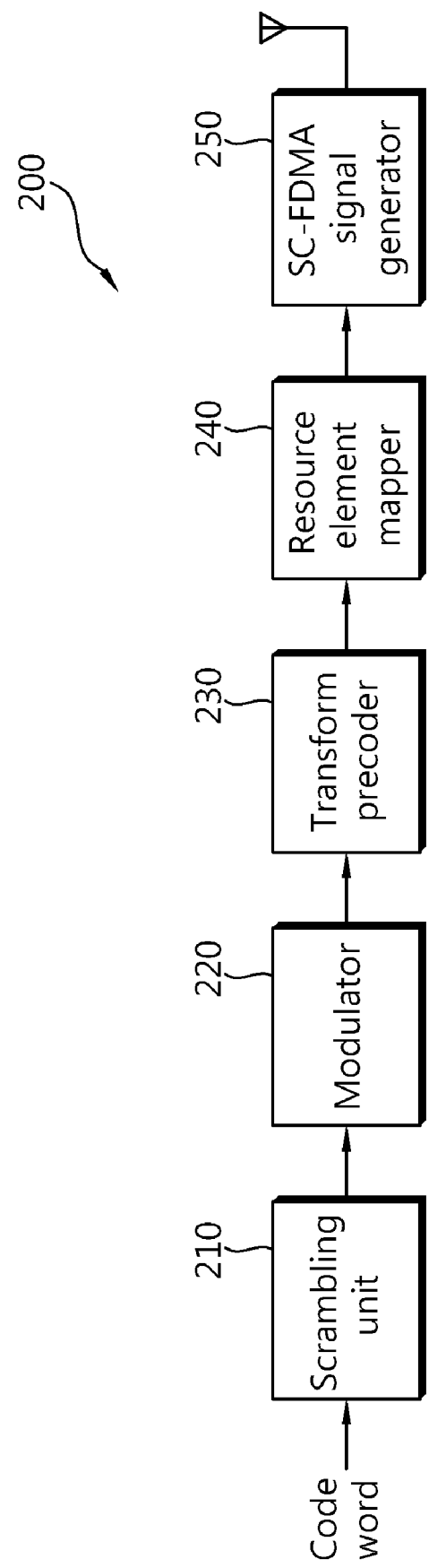
FIG. 3 shows another exemplary structure of a transmitter.

FIG. 3 shows another exemplary structure of a transmitter. This structure can be used for UL transmission using an SC-FDMA access scheme.

Referring to FIG. 3, a transmitter 200 includes a scrambling unit 210, a modulator 220, a transform precoder 230, a resource element mapper 240, and an SC-FDMA signal generator 250.

The scrambling unit 210 performs scrambling on an input codeword. The codeword may have a length corresponding to the number of bits transmitted through a PUSCH of one subframe. The modulator 220 arranges the scrambled codeword to a modulation symbol that expresses a position on a signal constellation. There is no restriction on the modulation scheme, and thus m-PSK or m-QAM may be used as the modulation scheme. For example, QPSK, 16QAM, 64QAM, etc., can be used as the modulation scheme in the PUSCH.

A codeword d arranged to the modulation symbol on the signal constellation can be expressed by Equation 6 below.

$$d(0),\ldots,d(M_{symb}-1) \qquad \text{[Equation 6]}$$

In Equation 6, $M_{symb}$ denotes the number of modulation symbols of the codeword d.

The transform precoder 230 divides the codeword d arranged to the modulation symbol on the signal constellation into $M_{symb}/M^{PUSCH}_{sc}$ sets, and matches each set to one SC-FDMA symbol. $M^{PUSCH}_{sc}$ denotes the number of subcarriers included in a bandwidth for UL transmission, and may correspond to a DFT size. The transform precoder 230 generates a DFT symbol in a frequency domain by performing DFT according to Equation 7 below.

$$z(l \cdot M^{PUSCH}_{sc} + k) = \qquad \text{[Equation 7]}$$

$$\frac{1}{\sqrt{M^{PUSCH}_{sc}}} \sum_{i=0}^{M^{PUSCH}_{sc}-1} d(l \cdot M^{PUSCH}_{sc} + i) e^{-j\frac{2\pi i k}{M^{PUSCH}_{sc}}}$$

$$k = 0, \ldots, M^{PUSCH}_{sc} - 1$$

$$l = 0, \ldots, M_{symb}/M^{PUSCH}_{sc} - 1$$

In Equation 7, k denotes a frequency-domain index and l denotes a time-domain index. A resource element is denoted by (k,l). A DFT symbol derived from Equation 8 is output such as $z(0), \ldots, z(M_{symb}-1)$. When $M^{PUSCH}_{RB}$ denotes the number of resource blocks included in a bandwidth scheduled for UL transmission and $N^{RB}_{sc}$ denotes the number of subcarriers included in a resource block in the frequency domain, then it is expressed as $M^{PUSCH}_{sc}=M^{PUSCH}_{RB} N^{RB}_{sc}$. $M^{PUSCH}_{RB}$ is applied as expressed by Equation 8 below.

$$M_{RB}^{PUSCH}=2^{\alpha_2} \cdot 3^{\alpha_3} \cdot 5^{\alpha_5} \leq N_{RB}^{UL} \qquad \text{[Equation 8]}$$

In Equation 8, $\alpha_2$, $\alpha_3$, and $\alpha_5$ belong to a set of non-negative integers.

The resource element mapper 240 maps DFT symbols $z(0), \ldots, z(M_{symb}-1)$ output from the transform precoder 230 to a resource element. The SC-FDMA signal generator 250 generates an SC-FDMA signal of a time domain for each antenna. The SC-FDMA signal is transmitted through a Tx antenna.

Figure 4:
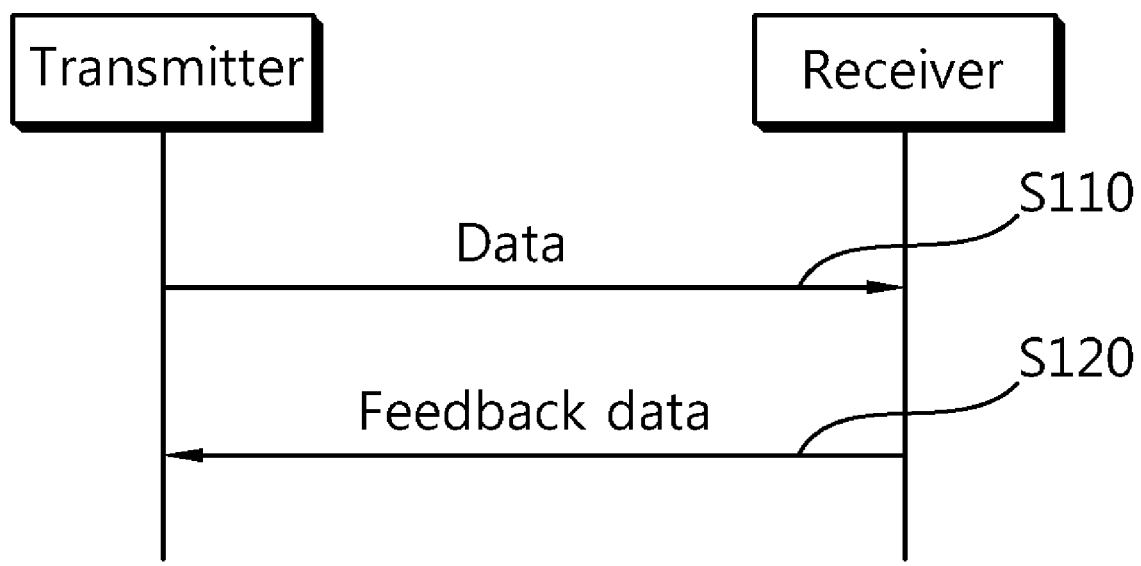
FIG. 4 shows data processing performed between a transmitter and a receiver in a multiple antenna system according to an embodiment of the present invention.

FIG. 4 shows data processing performed between a transmitter and a receiver in a multiple antenna system according to an embodiment of the present invention.

Referring to FIG. 4, the transmitter transmits data to the receiver (step S110). The transmitter performs precoding on an input symbol by defining a codebook including at least one precoding matrix composed of a plurality of rows and columns or by using a pre-defined codebook, and then transmits the precoded symbol, that is, data. In this case, the codebook can be defined in various types. The types of the codebook will be described below.

The transmitter may include a scheduler, a channel encoder/mapper, a MIMO encoder, an OFDM modulator, etc. The transmitter may include Nt(Nt>1) Tx antennas. The transmitter may be a part of a BS in a downlink, and may be a part of a UE in an uplink.

The scheduler receives data from N users, and outputs K streams to be transmitted concurrently. The scheduler determines a data transfer rate and a user for transmission using an available radio resource by the use of channel information of each user. The scheduler selects a code rate, a modulation and coding scheme (MCS), etc., by extracting the channel information from feedback data. For an operation of a MIMO system, the feedback data may include control information such as a channel quality indicator (CQI), channel state information (CSI), a channel covariance matrix, a precoding weight, a channel rank, etc. Examples of the CSI include a channel matrix between the transmitter and the receiver, a channel correlation matrix of a channel, a quantized channel matrix, a quantized channel correlation matrix, etc. Examples of the CQI include a signal to noise ratio (SNR) between the transmitter and the receiver, a signal to interference and noise ratio (SINR), etc.

The available radio resource allocated by the scheduler implies a radio resource used at data transmission in the wireless communication system. For example, each time slot is the resource in a time division multiple access (TDMA) system, each code and each time slot are the resource in a code division multiple access (CDMA) system, and each subcarrier and each time slot are the resource in an orthogonal frequency division multiplex access (OFDMA) system. To avoid interference to other users in the same cell or sector, the respective resources may be defined to be orthogonal in a time, code, or frequency domain.

The channel encoder/mapper generates coded data by encoding an input stream according to a predetermined coding scheme, and maps the coded data to a symbol for expressing a position on a signal constellation. The MIMO encoder performs precoding on the input symbol. The precoding is a scheme of performing pre-processing on a symbol to be transmitted. Examples of the precoding scheme include random beamforming (RBF), zero forcing beamforming (ZFBF), etc., for generating a symbol by applying a weight vector, a precoding matrix, etc. Codebook-based precoding that uses a predetermined codebook set may be used as the precoding scheme. The OFDM modulator transmits the input symbol through the Tx antenna by allocating the symbol to a relevant subcarrier.

The receiver transmits feedback data for the data received from the transmitter (step S120). The receiver may include an OFDM demodulator, a channel estimator, a MIMO decoder, a channel decoder/de-mapper, a feedback information obtaining unit, etc. The receiver may include Nr(Nr>1) Rx antennas. The receiver may be a part of the UE in the downlink, and may be a part of the BS in the uplink.

A signal received through the Rx antenna is demodulated by the OFDM demodulator. The channel estimator estimates a channel. The MIMO decoder performs post-processing as opposed to the operation of the MIMO encoder. The decoder/de-mapper de-maps the input symbol from the coded data and decodes the coded data, thereby restoring original data. The feedback information obtaining unit generates user information including a CSI, a CQI, a PMI, etc. The generated user information is configured as the feedback data and is transmitted to the transmitter.

Feedback Data of MIMO-OFDM System>

Control information such as a CQI, a CSI, a channel covariance matrix, a precoding weight, a channel rank, etc., is required for an operation of a MIMO-OFDM system. In a frequency division duplex (FDD) system, a receiver reports such information through a feedback channel. A time division duplex (TDD) system can obtain information to be used in downlink transmission by estimating an uplink channel by the use of a reciprocity property of the channel.

The CQI is necessary for resource allocation and link adaptation. An SNR/SINR or the like may be used as the CQI. The SNR/SINR may be defined as a 4-bit CQI by being quantized with an interval of 1.89 dB at 16 levels. The receiver reports a CQI index defined after quantization of the SNR/SINR to the transmitter. In addition, when using the MIMO scheme, up to 2 codewords (CWs) can be supported. That is, for transmission of a rank 2 or higher ranks, CQIs of a first CW and a second CW have to be reported to the transmitter. The first CW may be expressed in 4 bits. The second CW is a value indicating a difference to the $1^{st}$ CW and may be expressed in 3 bits.

A precoding scheme is a MIMO technique for transmitting a Tx data stream by performing pre-processing by using a pre-processing weight. Equation 9 shows a precoding scheme for performing pre-processing on a Tx data stream x by using the pre-processing weight.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(v-1)}(i) \end{bmatrix} \quad \text{[Equation 9]}$$

where, $i = 0, 1, \ldots, M_{symb}^{layer}$

In Equation 9, W(i) denotes a precoding matrix. A DFT matrix U and a diversity matrix D(i) for a cyclic delay diversity (CDD) can be used in a pre-processed Tx data stream y as shown in Equation 10.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad \text{[Equation 10]}$$

D(i) and U can be determined according to a transport layer.

Equation 11 shows an example of generating the precoding matrix W(i) according to the rank.

$$W(i) = C_k \quad \text{[Equation 11]}$$
$$k = \mod\left(\left\lfloor \frac{i+1}{v} \right\rfloor - 1, 4\right) + 1 = \mod\left(\left\lfloor \frac{i}{v} \right\rfloor - 1, 4\right) + 1$$
$$k \in \{1, 2, \ldots 4\}$$

In Equation 11, $C_1$, $C_2$, $C_3$, and $C_4$ denote precoding matrixes corresponding to precoder indices 12, 13, 14, and 15, and u denotes the rank (or the transport layer).

Table 1 shows an example of the DFT matrix U and the delay matrix D(i) for the CDD applied according to the transport layer.

TABLE 1

| Number of layers | D(i) | U |
|---|---|---|
| 1 | $[1]$ | $[1]$ |
| 2 | $\begin{bmatrix} 1 & 0 \\ 0 & e^{-j2\pi i/2} \end{bmatrix}$ | $\begin{bmatrix} 1 & 0 \\ 0 & e^{-j2\pi i/2} \end{bmatrix}$ |
| 3 | $\begin{bmatrix} 1 & 0 & 0 \\ 0 & e^{-j2\pi i/3} & 0 \\ 0 & 0 & e^{-j4\pi i/3} \end{bmatrix}$ | $\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ |
| 4 | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ | $\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ |

According to a method of generating a precoding weight, there are various schemes such as zero forcing beamforming, eigen beamforming, and codebook-based precoding, etc. A CSI, a channel variance matrix, a codebook index, etc., are required to apply each scheme. In DL transmission of the conventional system, the codebook-based precoding is supported in 2Tx MIMO transmission and 4Tx MIMO transmission. For this, codebooks are respectively defined for 2Tx/4Tx.

In codebook-based precoding, the receiver has several predetermined precoding matrixes. The receiver estimates a channel by using a signal transmitted from the transmitter and determines a precoding matrix which is the most similar to an estimated channel state. The receiver feeds back a determined precoding matrix index (PMI) to the transmitter. The transmitter transmits data by selecting a codebook suitable for the fed-back precoding matrix. In the codebook-based precoding, an amount of feedback data decreases since only the PMI is transmitted. In the codebook-based precoding scheme, system performance varies depending on a codebook configuration method, a type of a codebook, and a size of the codebook. When using the codebook-based precoding scheme, performance deterioration may occur if the codebook does not fully reveal a channel state. However, if the size of the codebook increases, the performance can approach to optimal performance since the channel state can be fully revealed.

Closed-loop MIMO

A method using a precoding weight similar to a channel according to a channel condition is called a closed-loop MIMO scheme, and a method of using the precoding weight according to a specific rule irrespective of the channel condition is called an open-loop MIMO scheme.

An amount of a precoding weight reported for the closed-loop MIMO by a receiver may vary depending on a frequency unit, a reporting period, etc. If one precoding weight is defined as a frequency range, a system bandwidth can be classified into a wideband (WB), a subband (SB), a bestband (BB), etc., according to the frequency range. The SB may include at least one subcarrier, and the WB may include at least one SB. The BB implies a band having a good channel state as a result of channel measurement of the receiver. In the codebook-based precoding, a defined PMI is fed back. The PMI may be defined as a WB PMI, an SB PMI, and a BB PMI according to a range of applying the PMI. Among the defined precoding matrixes, a PMI capable of maximizing an average throughput of a specific band is selected. The narrower the range of applying the PMI, the better the performance of the precoding weight.

If a resource block is defined as an aggregation of 12 contiguous subcarriers, a system bandwidth and an SB can be expressed by regarding the resource block as a basic unit. Table 2 shows an example of expressing the system bandwidth and the SB by regarding the resource block as the basic unit.

TABLE 2

| System bandwidth | Subband size. | M (number of bestband) |
| --- | --- | --- |
| 6-7 | Wideband CQI only | Wideband CQI only |
| 8-11 | 2 | 1 |
| 11-26 | 2 | 3 |
| 27-63 | 3 | 5 |
| 64-110 | 4 | 6 |

The WB may be defined as the system bandwidth, and may be defined as a maximum unit for calculating a CQI. The SB may be defined as k contiguous resource blocks, and may be defined as a minimum unit for calculating the CQI. The number of BBs may be determined according to the system bandwidth.

A size of the SB may be defined differently depending on the system bandwidth. Values of the same magnitude may be used for a range of CQI calculation and a range of PMI application. A method used for the CQI calculation and the PMI application will be described by taking a system having 24 resource blocks as the system bandwidth for example.

(1) When transmitting a WB CQI/WB, the receiver selects a PMI capable of maximizing an average throughput of 24 resource blocks, and calculates an average CQI of the 24 resource blocks by applying the selected PMI. The receiver may obtain one WB CQI and one WB PMI.

(2) When transmitting an SB CQI/SB PMI, the receiver selects a PMI for SBs consisting of 2 resource blocks and calculates an average CQI. The receiver may obtain 12 SB CQIs and 12 SB PMIs.

(3) When transmitting an SB CQI/WB PMI, the receiver selects a PMI capable of maximizing an average throughput of the 24 resource blocks, and calculates an average CQI in a unit of 2 resource blocks by using the PMI (12 CQIs and 1 PMI). The receiver may obtain 12 SB CQIs and one WB PMI.

(4) When transmitting a WB CQI/SB PMI, the receiver selects a PMI in a unit of 2 resource blocks and calculates an average CQI of the 24 resource blocks by applying the selected PMIs. The receiver may obtain one WB CQI and 12 SB PMIs.

(5) When transmitting a best M average CQI/PMI and a WB CQI/PMI, the receiver selects 3 SBs having the highest throughput among SBs in a unit of 2 resource blocks and selects a PMI for a BB (2×3=6 resource blocks (RBs)) to calculate an average CQI of the BB. Further, the receiver selects a PMI for the 24 resource blocks and calculates a CQI.

<Opportunistic Beamforming>

When considering scheduling to allocate resources to users of which a channel condition is in an almost maximum state, a multi-user diversity gain decreases in a static channel condition where a channel of each user changes slowly. Spatial signal processing may be performed in such a static channel condition to allow the channel condition to be changed much and faster, thereby increasing a multi-user gain. This is called an opportunistic beamforming scheme. When applying the opportunistic beamforming scheme, a BS can obtain the same effect as if a beam is formed in an irregular direction by applying a precoding weight having an irregular-type size and phase to each antenna. Accordingly, a channel condition of each user changes more dynamically. Therefore, when using the opportunistic beamforming scheme in a channel condition where a channel changes slowly while using the scheduling scheme together, a greater multi-user diversity gain can be obtained. In addition, in an OFDMA system, a different precoding weight can be applied for each frequency resource, and a scheduling gain can be obtained by making a frequency flat channel to a frequency selective channel. Examples of the frequency resource used in the OFDMA system include a subblock, a resource block, a subcarrier, etc.

A codebook-based precoding scheme reports a PMI by selecting a precoding matrix which is the most similar to a channel condition among predetermined precoding matrixes and can advantageously decrease overhead caused by feedback data. However, since a codebook is configured by combining codebook sets capable of representing a spatial channel, more codebook sets have to be combined to constitute the codebook in proportion to the number of Tx antennas. Designing of the codebook becomes difficult as the number of Tx antennas increases, and the overhead of the feedback data may increase as a size of the codebook increases.

<Designing of UL codebook>

Now, a method of configuring a UL codebook for an increased number of Tx antennas of a UE will be described. A method of generating a 4Tx rank-3 codebook when the UE transmits data with a rank 3 by using 4 Tx antennas will be described for example. However, the number of antennas and the rank number are not limited thereto in the present invention.

FIG. 5 shows exemplary types of a 4Tx rank-3 codebook according to an embodiment of the present invention.

Referring to FIG. 5, a codebook that supports two or more ranks through a plurality of antennas includes at least one precoding matrix composed of a plurality of rows and columns. The 4Tx rank-3 codebook includes at least one 4×3 (row×column)-sized precoding matrix. The 4Tx rank-3 codebook can be classified into 3 types according to distribution of zero elements included in the column or row of the precoding matrix. A codebook type 1 is a codebook including a precoding matrix of which all elements are composed of non-zero elements. A codebook type 2 is a codebook including a precoding matrix of which any one of columns is composed of only non-zero elements and the remaining columns are composed of at least one zero element. A codebook type 3 is a codebook including a precoding matrix of which all columns are composed of at least one zero element. Herein, elements 'a' to 'l' of the precoding matrix can be expressed by a complex value. An antenna power normalization factor 1/2 of antenna power can be applied to the 4Tx rank-3 codebook to cope with strength of a signal transmitted from four Tx antennas. That is, each precoding matrix included in the 4Tx rank-3 codebook can be normalized to 1/2. A first normalization factor may be a power normalization factor depending on the number of antennas.

The number of non-zero elements included in each row of the precoding matrix differs for each codebook type. A second normalization factor of antenna power can be applied according to the number of non-zero elements. In case of the codebook type 1, three non-zero elements are included for each row of the precoding matrix, and thus a second normalization factor √(1/3) (i.e., root (1/3)) can be applied. In case of the codebook type 2, two non-zero elements are included for each row, and thus a second normalization factor √(1/2) (i.e., root (1/2)) can be applied. In case of the codebook type 3, one non-zero element is included for each row of the precoding matrix, and thus a second normalization factor √(1/1) (i.e., root (1/1)) can be applied. The second normalization factor may be a power normalization factor depending on the codebook type.

The codebook type 1 of the 4Tx rank-3 codebook to which the first normalization factor and the second normalization factor are applied can be expressed by Equation 12 below. The codebook type 2 can be expressed by Equation 13 below. The codebook type 3 can be expressed by Equation 14 below.

$$\frac{1}{2}\begin{bmatrix} a & e & i \\ b & f & j \\ c & g & k \\ d & h & l \end{bmatrix} \times \frac{1}{\sqrt{3}} \quad \text{[Equation 12]}$$

$$\frac{1}{2}\begin{bmatrix} a & e & 0 \\ b & f & 0 \\ c & 0 & k \\ d & 0 & l \end{bmatrix} \times \frac{1}{\sqrt{2}} \quad \text{[Equation 13]}$$

$$\frac{1}{2}\begin{bmatrix} a & 0 & 0 \\ b & 0 & 0 \\ 0 & g & 0 \\ 0 & 0 & l \end{bmatrix} \quad \text{[Equation 14]}$$

In case of using the codebook type 1, data can be transmitted through 4 antennas for each layer, and thus a high spatial diversity gain can be obtained. However, since Tx symbols are additionally used by to elements of the row of the codebook, a PAPR may increase. In case of using the codebook type 3, the spatial diversity gain is low but the Tx symbols are not additionally used by to the elements of the row of the codebook, and thus the PAPR can remain to be low. When using the codebook type 2, the PAPR can be slightly high while obtaining the spatial diversity gain. Therefore, the codebook type 3 can be regarded as a cubic metric preserving (CMP) codebook that maintains a low cubic metric (CM). The codebook type 2 can be regarded as a cubic metric friendly (CMF) codebook that has a slightly high CM and that can increase the spatial diversity gain.

Hereinafter, a method of configuring the codebook types 1 to 3 of the 4Tx rank-3 codebook will be described.

<4Tx Rank-3 Codebook Type 1>

There is a high possibility that rank-3 UL transmission will be selected in a high geometry situation. Therefore, a UE can transmit a signal with lower Tx power, and can be free from restriction of Tx power. However, each channel may face a limited Tx power situation when considering wider bandwidth transmission or concurrent transmission of data and a control signal. Therefore, a limited power situation and an unlimited power situation need to be both considered properly in the rank-3 transmission.

A DL rank-3 codebook is configured such that all elements of each column are composed of non-zero elements, and a signal is transmitted with same Tx power in each layer. Therefore, data can be transmitted with the same Tx power in each layer.

A UL rank-3 codebook can be configured by selecting some of precoding matrices included in the DL rank-3 codebook. For example, a UL 4Tx rank-3 codebook type 1 can be configured based on a DL 4Tx rank-3 codebook. The UL 4Tx rank-3 codebook can be configured by preferentially selecting a precoding matrix configured with QPSK and/or a precoding matrix having an even number of negative signs among the precoding matrices included in the DL 4Tx rank-3 codebook. This is because when configuring the codebook, the use of the smallest possible number of alphabets is advantageous in terms of calculation complexity, and a codebook having a DFT format ensures the orthogonality between respective layers to the maximum extent possible. For example, in the DL 4Tx rank-3 codebook, a precoding matrix having indices 0, 2, 8, and 10 is composed of 1 and −1, and an even number of elements have a negative sign in one column.

Table 3 shows an example of the UL 4Tx rank-3 codebook selected based on the DL 4Tx rank-3 codebook. In this case, 8 precoding matrices (having indices 0, 1, 2, 3, 8, 10, 12, and 13) composed of 1, −1, j, and −j in the DL 4Tx rank-3 codebook are selected as the UL 4Tx rank-3 codebook.

TABLE 3

UL 4Tx rank 3 codebook index

| 0 | 1 | 2 | 3 |
|---|---|---|---|
| $\frac{1}{2}\begin{bmatrix} 1 & 1 & 1 \\ 1 & 1 & -1 \\ 1 & -1 & -1 \\ 1 & -1 & 1 \end{bmatrix}$ | $\frac{1}{2}\begin{bmatrix} 1 & -j & 1 \\ j & 1 & -j \\ 1 & j & 1 \\ -j & 1 & j \end{bmatrix}$ | $\frac{1}{2}\begin{bmatrix} 1 & -1 & 1 \\ -1 & 1 & 1 \\ 1 & 1 & 1 \\ -1 & -1 & 1 \end{bmatrix}$ | $\frac{1}{2}\begin{bmatrix} 1 & j & -1 \\ -j & 1 & -j \\ -1 & -j & 1 \\ j & 1 & j \end{bmatrix}$ |
| 8 | 10 | 12 | 13 |
| $\frac{1}{2}\begin{bmatrix} 1 & 1 & -1 \\ 1 & 1 & 1 \\ -1 & 1 & -1 \\ -1 & 1 & 1 \end{bmatrix}$ | $\frac{1}{2}\begin{bmatrix} 1 & -1 & -1 \\ -1 & 1 & -1 \\ -1 & -1 & 1 \\ 1 & 1 & 1 \end{bmatrix}$ | $\frac{1}{2}\begin{bmatrix} 1 & 1 & 1 \\ 1 & 1 & -1 \\ 1 & -1 & 1 \\ -1 & 1 & 1 \end{bmatrix}$ | $\frac{1}{2}\begin{bmatrix} 1 & 1 & -1 \\ 1 & 1 & 1 \\ -1 & 1 & 1 \\ 1 & -1 & 1 \end{bmatrix}$ |

Table 4 shows another example of the UL 4Tx rank-3 codebook selected based on the DL 4Tx rank-3 codebook. In this case, 8 precoding matrices (having indices 9, 3, 0, 2, 8, 10, 11, and 15) composed of 1, −1, j, and −j in the DL 4Tx rank-3 codebook are selected as the UL 4Tx rank-3 codebook.

TABLE 4

UL 4Tx rank 3 codebook index

| 9 | 3 | 0 | 2 |
|---|---|---|---|
| $\frac{1}{2}\begin{bmatrix} 1 & 1 & -j \\ j & -1 & -1 \\ 1 & 1 & j \\ j & -j & 1 \end{bmatrix}$ | $\frac{1}{2}\begin{bmatrix} 1 & j & -1 \\ -j & 1 & -j \\ -1 & j & 1 \\ j & 1 & j \end{bmatrix}$ | $\frac{1}{2}\begin{bmatrix} 1 & 1 & 1 \\ 1 & 1 & -1 \\ 1 & -1 & -1 \\ 1 & -1 & 1 \end{bmatrix}$, | $\frac{1}{2}\begin{bmatrix} 1 & -1 & 1 \\ -1 & 1 & 1 \\ 1 & 1 & 1 \\ -1 & -1 & 1 \end{bmatrix}$ |
| 8 | 10 | 11 | 15 |
| $\frac{1}{2}\begin{bmatrix} 1 & 1 & -1 \\ 1 & 1 & 1 \\ -1 & 1 & -1 \\ -1 & 1 & 1 \end{bmatrix}$ | $\frac{1}{2}\begin{bmatrix} 1 & -1 & -1 \\ -1 & 1 & -1 \\ -1 & -1 & 1 \\ 1 & 1 & 1 \end{bmatrix}$ | $\frac{1}{2}\begin{bmatrix} 1 & 1 & j \\ -j & j & -1 \\ 1 & 1 & -j \\ -j & j & 1 \end{bmatrix}$ | $\frac{1}{2}\begin{bmatrix} 1 & -1 & -1 \\ -1 & 1 & -1 \\ -1 & -1 & 1 \\ -1 & -1 & -1 \end{bmatrix}$ | herein that an element of (1, 2) has a value of '1' and an element of (2, 2) has a value of 'a' in the second column, and an element of (3, 3) has a value of '1' and an element of (4, 3) has a value of 'b' in the third column. In this case, 'a' and 'b' can be expressed by complex values.

6 precoding matrices (having indices 0, 2, 8, 10, 12, and 13) composed of 1 and −1 in the DL 4Tx rank-3 codebook can be selected as the UL 4Tx rank-3 codebook.

The 4Tx rank-3 codebook type 1 configured as described above can be usefully used to increase spatial multiplexing capability in a low-speed environment.

<4Tx Rank-3 Codebook Type 2>

FIG. 6 shows a method of configuring a 4Tx rank-3 codebook according to an embodiment of the present invention.

Referring to FIG. 6, the 4Tx rank-3 codebook type 2 is configured by using a method of configuring an orthogonal codebook for each layer. In the codebook type 2, a first column is composed of only non-zero elements and second and third columns each include two zero elements (or non-zero elements) in different rows. In case of performing switching between the column composed of only non-zero elements and the columns including zero elements, a resultant matrix can be regarded as equivalent to the previous pattern. Hereinafter, a location of elements of a codebook or a precoding matrix is expressed by (row, column) for convenience of explanation.

The second and third columns can be configured in a codebook format used in 4Tx rank-2 transmission. It is assumed The first column composed of only non-zero elements is configured as follows such that the first column has an orthogonal relation with the second and third columns including zero elements.

(1) The non-zero elements of the second and third column are inserted to the first column at the same rows. In this case, 'a' and 'b' can be multiplied by a negative value in the process of insertion. That is, when the non-zero elements of the column including zero elements are inserted to the column composed of only non-zero elements, an element of a first row may be directly inserted and an element of a second row may be inserted by multiplying a negative value.

(2) When the non-zero elements of the second and third columns are inserted to the first column at the same row, 'a' may be inserted by multiplying a negative value and 'b' may be inserted directly while the other non-zero element (e.g., 1) of the column including 'b' is inserted by multiplying a negative value. That is, when inserting elements of the column including zero elements to the column including only non-zero elements, in the column of which non-zero elements are located in a relatively upper row, a second non-zero element may be multiplied by a negative value, and in the column of which non-zero elements are located in a relatively lower row, a first non-zero element may be multiplied by a negative value.

(3) When the non-zero elements of the second and third columns are inserted to the first column at the same row, a complex value j may be inserted. The complex value can be expressed by j=exp(j×π/2). When inserting elements of the column including zero elements to the column including only non-zero elements, in the column of which non-zero elements are located in a relatively upper row, a second non-zero element may be multiplied by a negative value, and in the column of which non-zero elements are located in a relatively lower row, a first non-zero element may be multiplied by j and a second non-zero element may be multiplied by −j.

(4) When the non-zero elements of the second and third columns are inserted to the first column at the same row, a complex value j may be inserted. When inserting elements of the column including zero elements to the column including only non-zero elements, in the column of which non-zero elements are located in a relatively upper row, a second non-zero element may be multiplied by a negative value, and in the column of which non-zero elements are located in a relatively lower row, a first non-zero element may be multiplied by −j and a second non-zero element may be multiplied by j.

As such, by inserting the non-zero elements of the second and third columns into the first column, the orthogonal 4Tx rank-3 codebook type 2 can be configured for each layer.

Meanwhile, the second and third columns can be configured in a codebook format used in 4Tx rank-2 transmission. A configuration of the 4Tx rank-3 codebook based on the 4Tx rank-2 codebook will be described.

The 4Tx rank-2 codebook can be expressed by Equation 15 below. The 4Tx rank-2 codebook can be expressed in three types according to an arrangement of elements included therein.

$$\begin{bmatrix} a & 0 \\ b & 0 \\ 0 & g \\ 0 & h \end{bmatrix} \text{ or } \begin{bmatrix} a & 0 \\ 0 & f \\ c & 0 \\ 0 & h \end{bmatrix} \text{ or } \begin{bmatrix} a & 0 \\ 0 & f \\ 0 & g \\ d & 0 \end{bmatrix} \quad [\text{Equation 15}]$$

In Equation 15, values 'a' to 'h' are non-zero elements and may be complex values. These values can be expressed restrictively for QPSK or 8PSK. The 4Tx rank-2 codebook can be subjected to column permutation, and can be expressed by Equation 16 below.

$$\begin{bmatrix} 0 & e \\ 0 & f \\ c & 0 \\ d & 0 \end{bmatrix} \text{ or } \begin{bmatrix} 0 & e \\ b & 0 \\ 0 & g \\ d & 0 \end{bmatrix} \text{ or } \begin{bmatrix} 0 & e \\ b & 0 \\ c & 0 \\ 0 & h \end{bmatrix} \quad [\text{Equation 16}]$$

Equations 15 and 16 have a column permutation relation and can be regarded as equivalent matrices. The column permutation can be implemented by using layer permutation or layer shift in a multiple antenna system considering multiple codewords.

If the values 'a' to 'h' are expressed with QPSK in Equation 15 above, the 4Tx rank-2 codebook can be configured as shown in Table 5 below.

TABLE 5

| index | 1<br>9 | 2<br>10 | 3<br>11 | 4<br>12 | 5<br>13 | 6<br>14 | 7<br>15 | 8<br>16 |
|---|---|---|---|---|---|---|---|---|
| Type 1 | $\begin{bmatrix} 1 & 0 \\ 1 & 0 \\ 0 & 1 \\ 0 & 1 \end{bmatrix}$ | $\begin{bmatrix} 1 & 0 \\ 1 & 0 \\ 0 & 1 \\ 0 & -1 \end{bmatrix}$ | $\begin{bmatrix} 1 & 0 \\ 1 & 0 \\ 0 & 1 \\ 0 & j \end{bmatrix}$ | $\begin{bmatrix} 1 & 0 \\ 1 & 0 \\ 0 & 1 \\ 0 & -j \end{bmatrix}$ | $\begin{bmatrix} 1 & 0 \\ -1 & 0 \\ 0 & 1 \\ 0 & 1 \end{bmatrix}$ | $\begin{bmatrix} 1 & 0 \\ -1 & 0 \\ 0 & 1 \\ 0 & -1 \end{bmatrix}$ | $\begin{bmatrix} 1 & 0 \\ -1 & 0 \\ 0 & 1 \\ 0 & j \end{bmatrix}$ | $\begin{bmatrix} 1 & 0 \\ -1 & 0 \\ 0 & 1 \\ 0 & -j \end{bmatrix}$ |
| | $\begin{bmatrix} 1 & 0 \\ j & 0 \\ 0 & 1 \\ 0 & 1 \end{bmatrix}$ | $\begin{bmatrix} 1 & 0 \\ j & 0 \\ 0 & 1 \\ 0 & -1 \end{bmatrix}$ | $\begin{bmatrix} 1 & 0 \\ j & 0 \\ 0 & 1 \\ 0 & j \end{bmatrix}$ | $\begin{bmatrix} 1 & 0 \\ j & 0 \\ 0 & 1 \\ 0 & -j \end{bmatrix}$ | $\begin{bmatrix} 1 & 0 \\ -j & 0 \\ 0 & 1 \\ 0 & 1 \end{bmatrix}$ | $\begin{bmatrix} 1 & 0 \\ -j & 0 \\ 0 & 1 \\ 0 & -1 \end{bmatrix}$ | $\begin{bmatrix} 1 & 0 \\ -j & 0 \\ 0 & 1 \\ 0 & j \end{bmatrix}$ | $\begin{bmatrix} 1 & 0 \\ -j & 0 \\ 0 & 1 \\ 0 & -j \end{bmatrix}$ |
| Type 2 | $\begin{bmatrix} 1 & 0 \\ 0 & 1 \\ 1 & 0 \\ 0 & 1 \end{bmatrix}$ | $\begin{bmatrix} 1 & 0 \\ 0 & 1 \\ 1 & 0 \\ 0 & -1 \end{bmatrix}$ | $\begin{bmatrix} 1 & 0 \\ 0 & 1 \\ 1 & 0 \\ 0 & j \end{bmatrix}$ | $\begin{bmatrix} 1 & 0 \\ 0 & 1 \\ 1 & 0 \\ 0 & -j \end{bmatrix}$ | $\begin{bmatrix} 1 & 0 \\ 0 & 1 \\ -1 & 0 \\ 0 & 1 \end{bmatrix}$ | $\begin{bmatrix} 1 & 0 \\ 0 & 1 \\ -1 & 0 \\ 0 & -1 \end{bmatrix}$ | $\begin{bmatrix} 1 & 0 \\ 0 & 1 \\ -1 & 0 \\ 0 & j \end{bmatrix}$ | $\begin{bmatrix} 1 & 0 \\ 0 & 1 \\ -1 & 0 \\ 0 & -j \end{bmatrix}$ |
| | $\begin{bmatrix} 1 & 0 \\ 0 & 1 \\ j & 0 \\ 0 & 1 \end{bmatrix}$ | $\begin{bmatrix} 1 & 0 \\ 0 & 1 \\ j & 0 \\ 0 & -1 \end{bmatrix}$ | $\begin{bmatrix} 1 & 0 \\ 0 & 1 \\ j & 0 \\ 0 & j \end{bmatrix}$ | $\begin{bmatrix} 1 & 0 \\ 0 & 1 \\ j & 0 \\ 0 & -j \end{bmatrix}$ | $\begin{bmatrix} 1 & 0 \\ 0 & 1 \\ -j & 0 \\ 0 & 1 \end{bmatrix}$ | $\begin{bmatrix} 1 & 0 \\ 0 & 1 \\ -j & 0 \\ 0 & -1 \end{bmatrix}$ | $\begin{bmatrix} 1 & 0 \\ 0 & 1 \\ -j & 0 \\ 0 & j \end{bmatrix}$ | $\begin{bmatrix} 1 & 0 \\ 0 & 1 \\ -j & 0 \\ 0 & -j \end{bmatrix}$ |
| Type 3 | $\begin{bmatrix} 1 & 0 \\ 0 & 1 \\ 0 & 1 \\ 1 & 0 \end{bmatrix}$ | $\begin{bmatrix} 1 & 0 \\ 0 & 1 \\ 0 & -1 \\ 1 & 0 \end{bmatrix}$ | $\begin{bmatrix} 1 & 0 \\ 0 & 1 \\ 0 & j \\ 1 & 0 \end{bmatrix}$ | $\begin{bmatrix} 1 & 0 \\ 0 & 1 \\ 0 & -j \\ 1 & 0 \end{bmatrix}$ | $\begin{bmatrix} 1 & 0 \\ 0 & 1 \\ 0 & 1 \\ -1 & 0 \end{bmatrix}$ | $\begin{bmatrix} 1 & 0 \\ 0 & 1 \\ 0 & -1 \\ -1 & 0 \end{bmatrix}$ | $\begin{bmatrix} 1 & 0 \\ 0 & 1 \\ 0 & j \\ -1 & 0 \end{bmatrix}$ | $\begin{bmatrix} 1 & 0 \\ 0 & 1 \\ 0 & -j \\ -1 & 0 \end{bmatrix}$ |

TABLE 5-continued

| index | 1 9 | 2 10 | 3 11 | 4 12 | 5 13 | 6 14 | 7 15 | 8 16 |
|---|---|---|---|---|---|---|---|---|
| | $\begin{bmatrix} 1 & 0 \\ 0 & 1 \\ 0 & 1 \\ j & 0 \end{bmatrix}$ | $\begin{bmatrix} 1 & 0 \\ 0 & 1 \\ 0 & -1 \\ j & 0 \end{bmatrix}$ | $\begin{bmatrix} 1 & 0 \\ 0 & 1 \\ 0 & j \\ j & 0 \end{bmatrix}$ | $\begin{bmatrix} 1 & 0 \\ 0 & 1 \\ 0 & -j \\ j & 0 \end{bmatrix}$ | $\begin{bmatrix} 1 & 0 \\ 0 & 1 \\ 0 & 1 \\ -j & 0 \end{bmatrix}$ | $\begin{bmatrix} 1 & 0 \\ 0 & 1 \\ 0 & -1 \\ -j & 0 \end{bmatrix}$ | $\begin{bmatrix} 1 & 0 \\ 0 & 1 \\ 0 & j \\ -j & 0 \end{bmatrix}$ | $\begin{bmatrix} 1 & 0 \\ 0 & 1 \\ 0 & -j \\ -j & 0 \end{bmatrix}$ |

The 4Tx rank-2 codebook types 1 to 3 each include 16 precoding matrices, and can be indicated by precoding matrix indices (PMIS) 1 to 16. The 4Tx rank-2 codebook can be configured by combining some precoding matrices included in each type. For example, the 4Tx rank-2 codebook can be configured by selecting 8 precoding matrices from the type 1, 4 precoding matrices from the type 2, and 4 precoding matrices from the type 3. A precoding matrix having indices 3, 4, 7, 8, 9, 10, 13, and 14 may be selected from the type 1, a precoding matrix having indices 1, 2, 5, and 6 may be selected from the type 2, and a precoding matrix of indices 3, 4, 7, and 8 may be selected from the type 3, which is referred to as a codebook set A. Alternatively, a precoding matrix having indices 3, 4, 7, 8, 9, 10, 13, and 14 may be selected from the type 1, a precoding matrix having indices 1, 2, 5, and 6 may be selected from the type 2, and a precoding matrix of indices 1, 2, 5, and 6 may be selected from the type 3, which is referred to as a codebook set B.

The 4Tx rank-3 codebook can be configured by using a method of configuring the aforementioned 4Tx rank-2 codebook on the basis of the configured 4Tx rank-2 codebook sets A and B.

Table 6 shows the 4Tx rank-3 codebook set configured based on the 4Tx rank-2 codebook. In this case, 6 precoding matrices are included in the 4Tx rank-3 codebook.

TABLE 6

| 4Tx rank-3 codebook set | PMI of 4Tx rank-2 codebook type 1 | PMI of 4Tx rank-2 codebook type 2 | PMI of 4Tx rank-2 codebook type 3 |
|---|---|---|---|
| A-1 | 7  8 | 1  5 | 3  4 |
| A-2 | 7  8 | 2  6 | 7  8 |
| B-1 | 7  8 | 1  2 | 1  5 |
| B-2 | 7  8 | 1  5 | 1  2 |
| B-3 | 7  8 | 1  6 | 2  5 |
| B-4 | 7  8 | 2  5 | 1  6 |
| B-5 | 7  8 | 2  6 | 5  6 |
| B-6 | 7  8 | 5  6 | 2  6 |

A 4Tx rank-3 codebook set A-1 can be expressed by precoding matrices shown in Equation 17 below according to the proposed method.

$$\begin{bmatrix} 1 & 1 & 0 \\ 1 & -1 & 0 \\ 1 & 0 & 1 \\ -j & 0 & j \end{bmatrix} \begin{bmatrix} 1 & 1 & 0 \\ 1 & -1 & 0 \\ 1 & 0 & 1 \\ j & 0 & -j \end{bmatrix} \begin{bmatrix} 1 & 1 & 0 \\ -1 & 0 & 1 \\ 1 & 1 & 0 \\ -1 & 0 & 1 \end{bmatrix}$$
$$\begin{bmatrix} 1 & 1 & 0 \\ -1 & 0 & 1 \\ -1 & -1 & 0 \\ -1 & 0 & 1 \end{bmatrix} \begin{bmatrix} 1 & 1 & 0 \\ 1 & 0 & 1 \\ -j & 0 & j \\ -1 & 1 & 0 \end{bmatrix} \begin{bmatrix} 1 & 1 & 0 \\ 1 & 0 & 1 \\ j & 0 & -j \\ -1 & 1 & 0 \end{bmatrix}$$ [Equation 17]

In addition thereto, 4Tx rank-3 codebook sets A-2 and B-1 to B-6 are also configured with 6 precoding matrices generated according to the proposed method.

When 8 precoding matrices are included in the 4Tx rank-3 codebook, the 4Tx rank-3 codebook set can be configured as shown in Table 7 below.

TABLE 7

| 4Tx rank-3 codebook set | PMI of 4Tx rank-2 codebook type 1 | PMI of 4Tx rank-2 codebook type 2 | PMI of 4Tx rank-2 codebook type 3 |
|---|---|---|---|
| C-1 | 7  8  9  13 | 2  6 | 7  8 |
| C-2 | 7  8  10  14 | 1  5 | 3  4 |

The combination type of the 4Tx rank-2 codebook and the number of precoding matrices included in the 4Tx rank-3 codebook are for exemplary purposes only, and the present invention is not limited thereto. The 4Tx rank-3 codebook can be configured with a various number of precoding matrices in various combinations.

FIG. 7 shows power allocation using a 4Tx rank-3 codebook according to an embodiment of the present invention.

Referring to FIG. 7, when using the 4Tx rank-3 codebook, power can be allocated not uniformly for each column of a precoding matrix. Relatively low power can be allocated to a column which does not have zero elements, and relatively high power can be allocated to a column to which a zero element is inserted.

For example, in the 4Tx rank-3 codebook type 2, relatively lower power can be allocated to a first column including only non-zero elements than the remaining columns including zero elements. In order to transmit a signal with the same level of power for each layer, the signal can be transmitted by allocating 1/3 power to the column including only non-zero elements and 2/3 power to the columns including zero elements. A signal of a first layer mapped to the first column has 1/3*1/4 power per element, but is transmitted with 1/3 power since the signal is transmitted through 4 antennas. Signals of second and third layers mapped to second and third columns have 2/3*1/4 power per element, but are transmitted with 1/3 power since the signals are transmitted through two antennas. As such, different power can be allocated to each column according to a ratio of zero elements or non-zero elements included in the columns of the precoding matrix, and thus it is possible to regulate power of the transmitted signal so that each layer has the same power.

<4Tx Rank-3 Codebook Type 3>

The 4Tx rank-3 codebook type 3 is configured with one column vector which selects and combines any two rows among 4 rows and two column vectors which select only any one row among the 4 rows. The column vector which selects and combines any two rows implies a column including two non-zero elements. The column vector which selects only any one row implies a column including one non-zero element. In this case, non-zero elements of each column are located in different rows. That is, the rank-3 codebook type 3 is configured with a column composed of an antenna combination vector for combining a plurality of antennas and a column composed of an antenna selection vector for selecting any one of the plurality of antennas. A low PAPR can be maintained by using the 4Tx rank-3 codebook type 3.

It is assumed herein that a first column includes two non-zero elements, and second and third columns include one non-zero element. The first column may be composed of the antenna combination vector, and the second and third columns may be composed of the antenna selection vector. The antenna selection vector is used to select two antennas among four antennas, and may be configured by combining antennas according to an antenna number such as (1,2), (1,3), (1,4), and (3,4). In the antenna combination vector, '1' may be inserted to an upper row of non-zero elements, and any one of QPSK elements 1, −1, j, and −j may be inserted to a lower row. There is no restriction on positions of the column of the antenna combination vector and the column of the antenna selection vector. In case of performing column switching between the columns of the antenna selection vector, a result matrix pattern can be regarded as equivalent to the previous pattern.

In the 4Tx rank-3 codebook type 3, the antenna combination vector can be composed of numeric character of '1' or '−1' by default. In case of using a precoding matrix including the antenna combination vector when configuring the 4Tx rank-3 codebook, a precoding matrix including each of two orthogonal vectors may be included in the 4Tx rank-3 codebook. For example, two orthogonal vectors may be configured by multiplying a second element among non-zero elements of the antenna combination vector by a negative value.

Table 8 shows an example of the 4Tx rank-3 codebook type 3 including orthogonal antenna combination vectors.

TABLE 8

$$\frac{1}{2}\begin{bmatrix}1&0&0\\1&0&0\\0&1&0\\0&0&1\end{bmatrix} \quad \frac{1}{2}\begin{bmatrix}1&0&0\\0&1&0\\0&0&1\\1&0&0\end{bmatrix} \quad \frac{1}{2}\begin{bmatrix}1&0&0\\0&1&0\\1&0&0\\0&0&1\end{bmatrix} \quad \frac{1}{2}\begin{bmatrix}0&1&0\\0&0&1\\1&0&0\\1&0&0\end{bmatrix}$$

TABLE 8-continued $$\frac{1}{2}\begin{bmatrix}1&0&0\\-1&0&0\\0&1&0\\0&0&1\end{bmatrix} \quad \frac{1}{2}\begin{bmatrix}1&0&0\\0&1&0\\0&0&1\\-1&0&0\end{bmatrix} \quad \frac{1}{2}\begin{bmatrix}1&0&0\\0&1&0\\-1&0&0\\0&0&1\end{bmatrix} \quad \frac{1}{2}\begin{bmatrix}0&1&0\\0&0&1\\1&0&0\\-1&0&0\end{bmatrix}$$

When configuring a precoding matrix of the 4Tx rank-3 codebook type 3, a chordal distance depending on an element value in the column including non-zero elements can be taken into account.

(1) The chordal distance is not influenced by an element value of one column having one non-zero element.

Table 9 shows an example of the chordal distance depending on the element value of the column including one non-zero element in the 4Tx rank-3 codebook type 3.

TABLE 9

| Chordal distance | Codebook A | Codebook B |
|---|---|---|
| No distance | $\begin{bmatrix}1&0&0\\1&0&0\\0&a&0\\0&0&b\end{bmatrix}$ | $\begin{bmatrix}1&0&0\\1&0&0\\0&c&0\\0&0&d\end{bmatrix}$ |
| Medium (0.356) | $\begin{bmatrix}1&0&0\\1&0&0\\0&a&0\\0&0&b\end{bmatrix}$ | $\begin{bmatrix}1&0&0\\j&0&0\\0&c&0\\0&0&d\end{bmatrix}$ |
| Longest (0.5) | $\begin{bmatrix}1&0&0\\1&0&0\\0&a&0\\0&0&b\end{bmatrix}$ | $\begin{bmatrix}1&0&0\\-1&0&0\\0&c&0\\0&0&d\end{bmatrix}$ |
| Medium (0.356) | $\begin{bmatrix}1&0&0\\1&0&0\\0&a&0\\0&0&b\end{bmatrix}$ | $\begin{bmatrix}1&0&0\\-j&0&0\\0&c&0\\0&0&d\end{bmatrix}$ |

(2) In a codebook having the same element value, a chordal distance of a codebook set configured with column switching is 0 (i.e., no distance).

Table 10 shows an example of a chordal distance based on column switching.

TABLE 10

| Chordal distance | codebook set |
|---|---|
| No distance | $\begin{bmatrix}1&0&0\\1&0&0\\0&1&0\\0&0&1\end{bmatrix} \begin{bmatrix}1&0&0\\1&0&0\\0&0&1\\0&1&0\end{bmatrix} \begin{bmatrix}0&1&0\\0&1&0\\1&0&0\\0&0&1\end{bmatrix} \begin{bmatrix}0&0&1\\0&0&1\\1&0&0\\0&1&0\end{bmatrix} \begin{bmatrix}0&1&0\\0&1&0\\0&0&1\\1&0&0\end{bmatrix} \begin{bmatrix}0&0&1\\0&0&1\\0&1&0\\1&0&0\end{bmatrix}$ |

(3) The chordal distance can be determined according to an element value of a column including two non-zero elements.

The chordal distance depending on changes in elements will be described under the assumption that an element value of a column including two non-zero elements has a QPSK phase. Table 11 shows an example of the codebook type 3 for 4Tx rank-3 transmission.

TABLE 11

| Codebook A | Codebook B |
|---|---|
| $\begin{bmatrix} 1 & 0 & 0 \\ a & 0 & 0 \\ 0 & 1 & 0 \\ 0 & 0 & 1 \end{bmatrix}$ | $\begin{bmatrix} b & 0 & 0 \\ c & 0 & 0 \\ 0 & 0 & 1 \\ 0 & 1 & 0 \end{bmatrix}$ |

In the codebook type 3, the non-zero elements of the column having one non-zero element are located at rows including zero elements of the column having two non-zero elements. Since the column having one non-zero element does not have an effect on the chordal distance of the codebook set, the column having one non-zero element may include any element value. Column switching can be performed between the columns having one non-zero element, and this case does not have an effect on the chordal distance, either. Therefore, the chordal distance in the codebook type 3 can be determined according to the column including two non-zero elements.

Table 12 shows a non-zero element of the column including two non-zero element in a 2×1 vector format.

TABLE 12

| First Vector | Second Vector |
|---|---|
| $\begin{bmatrix} 1 \\ a \end{bmatrix}$ | $\begin{bmatrix} b \\ c \end{bmatrix}$ |

An element of the vector may have any value. For example, the element of the vector may have a QPSK or BPSK phase value. To calculate a chordal distance between two vectors, it is assumed that each element has a QPSK phase. A first row of a first vector is fixed to '1' to limit the number of cases. Any value can be used as a normalization factor for the vector.

Table 13 to Table 16 show examples of a chordal distance between the first vector and the second vector. Herein, the vector is normalized with 1/sqrt(4), and indicates the chordal distances '0'=0, '3'=1/sqrt(8), and '5'=1/2.

TABLE 13

| Chordal distance | 1st Vector | 2nd Vector | Chordal distance | 1st Vector | 2nd Vector |
|---|---|---|---|---|---|
| 0 | $\begin{bmatrix} 1 \\ 1 \end{bmatrix}$ | $\begin{bmatrix} 1 \\ 1 \end{bmatrix}$ | 5 | $\begin{bmatrix} 1 \\ 1 \end{bmatrix}$ | $\begin{bmatrix} 1 \\ -1 \end{bmatrix}$ |
| 3 | $\begin{bmatrix} 1 \\ 1 \end{bmatrix}$ | $\begin{bmatrix} j \\ 1 \end{bmatrix}$ | 3 | $\begin{bmatrix} 1 \\ 1 \end{bmatrix}$ | $\begin{bmatrix} j \\ -1 \end{bmatrix}$ |
| 5 | $\begin{bmatrix} 1 \\ 1 \end{bmatrix}$ | $\begin{bmatrix} -1 \\ 1 \end{bmatrix}$ | 0 | $\begin{bmatrix} 1 \\ 1 \end{bmatrix}$ | $\begin{bmatrix} -1 \\ -1 \end{bmatrix}$ |
| 3 | $\begin{bmatrix} 1 \\ 1 \end{bmatrix}$ | $\begin{bmatrix} -j \\ 1 \end{bmatrix}$ | 3 | $\begin{bmatrix} 1 \\ 1 \end{bmatrix}$ | $\begin{bmatrix} -j \\ -1 \end{bmatrix}$ |
| 3 | $\begin{bmatrix} 1 \\ 1 \end{bmatrix}$ | $\begin{bmatrix} 1 \\ j \end{bmatrix}$ | 3 | $\begin{bmatrix} 1 \\ 1 \end{bmatrix}$ | $\begin{bmatrix} 1 \\ -j \end{bmatrix}$ |
| 0 | $\begin{bmatrix} 1 \\ 1 \end{bmatrix}$ | $\begin{bmatrix} j \\ j \end{bmatrix}$ | 5 | $\begin{bmatrix} 1 \\ 1 \end{bmatrix}$ | $\begin{bmatrix} j \\ -j \end{bmatrix}$ |
| 3 | $\begin{bmatrix} 1 \\ 1 \end{bmatrix}$ | $\begin{bmatrix} -1 \\ j \end{bmatrix}$ | 3 | $\begin{bmatrix} 1 \\ 1 \end{bmatrix}$ | $\begin{bmatrix} -1 \\ -j \end{bmatrix}$ |
| 5 | $\begin{bmatrix} 1 \\ 1 \end{bmatrix}$ | $\begin{bmatrix} -j \\ j \end{bmatrix}$ | 0 | $\begin{bmatrix} 1 \\ 1 \end{bmatrix}$ | $\begin{bmatrix} -j \\ -j \end{bmatrix}$ |

TABLE 14

| Chordal distance | 1st Vector | 2nd Vector | Chordal distance | 1st Vector | 2nd Vector |
|---|---|---|---|---|---|
| 3 | $\begin{bmatrix} 1 \\ j \end{bmatrix}$ | $\begin{bmatrix} 1 \\ 1 \end{bmatrix}$ | 3 | $\begin{bmatrix} 1 \\ j \end{bmatrix}$ | $\begin{bmatrix} 1 \\ -1 \end{bmatrix}$ |
| 5 | $\begin{bmatrix} 1 \\ j \end{bmatrix}$ | $\begin{bmatrix} j \\ 1 \end{bmatrix}$ | 0 | $\begin{bmatrix} 1 \\ j \end{bmatrix}$ | $\begin{bmatrix} j \\ -1 \end{bmatrix}$ |
| 3 | $\begin{bmatrix} 1 \\ j \end{bmatrix}$ | $\begin{bmatrix} -1 \\ 1 \end{bmatrix}$ | 3 | $\begin{bmatrix} 1 \\ j \end{bmatrix}$ | $\begin{bmatrix} -1 \\ -1 \end{bmatrix}$ |
| 0 | $\begin{bmatrix} 1 \\ j \end{bmatrix}$ | $\begin{bmatrix} -j \\ 1 \end{bmatrix}$ | 5 | $\begin{bmatrix} 1 \\ j \end{bmatrix}$ | $\begin{bmatrix} -j \\ -1 \end{bmatrix}$ |
| 0 | $\begin{bmatrix} 1 \\ j \end{bmatrix}$ | $\begin{bmatrix} 1 \\ j \end{bmatrix}$ | 5 | $\begin{bmatrix} 1 \\ j \end{bmatrix}$ | $\begin{bmatrix} 1 \\ -j \end{bmatrix}$ |
| 3 | $\begin{bmatrix} 1 \\ j \end{bmatrix}$ | $\begin{bmatrix} j \\ j \end{bmatrix}$ | 3 | $\begin{bmatrix} 1 \\ j \end{bmatrix}$ | $\begin{bmatrix} j \\ -j \end{bmatrix}$ |
| 5 | $\begin{bmatrix} 1 \\ j \end{bmatrix}$ | $\begin{bmatrix} -1 \\ j \end{bmatrix}$ | 0 | $\begin{bmatrix} 1 \\ j \end{bmatrix}$ | $\begin{bmatrix} -1 \\ -j \end{bmatrix}$ |
| 3 | $\begin{bmatrix} 1 \\ j \end{bmatrix}$ | $\begin{bmatrix} -j \\ j \end{bmatrix}$ | 3 | $\begin{bmatrix} 1 \\ j \end{bmatrix}$ | $\begin{bmatrix} -j \\ -j \end{bmatrix}$ |

TABLE 15

| Chordal distance | 1st Vector | 2nd Vector | Chordal distance | 1st Vector | 2nd Vector |
|---|---|---|---|---|---|
| 5 | $\begin{bmatrix} 1 \\ -1 \end{bmatrix}$ | $\begin{bmatrix} 1 \\ 1 \end{bmatrix}$ | 0 | $\begin{bmatrix} 1 \\ -1 \end{bmatrix}$ | $\begin{bmatrix} 1 \\ -1 \end{bmatrix}$ |
| 3 | $\begin{bmatrix} 1 \\ -1 \end{bmatrix}$ | $\begin{bmatrix} j \\ 1 \end{bmatrix}$ | 3 | $\begin{bmatrix} 1 \\ -1 \end{bmatrix}$ | $\begin{bmatrix} j \\ -1 \end{bmatrix}$ |
| 0 | $\begin{bmatrix} 1 \\ -1 \end{bmatrix}$ | $\begin{bmatrix} -1 \\ 1 \end{bmatrix}$ | 5 | $\begin{bmatrix} 1 \\ -1 \end{bmatrix}$ | $\begin{bmatrix} -1 \\ -1 \end{bmatrix}$ |
| 3 | $\begin{bmatrix} 1 \\ -1 \end{bmatrix}$ | $\begin{bmatrix} -j \\ 1 \end{bmatrix}$ | 3 | $\begin{bmatrix} 1 \\ -1 \end{bmatrix}$ | $\begin{bmatrix} -j \\ -1 \end{bmatrix}$ |

TABLE 15-continued

| Chordal distance | 1$^{st}$ Vector | 2$^{nd}$ Vector | Chordal distance | 1$^{st}$ Vector | 2$^{nd}$ Vector |
|---|---|---|---|---|---|
| 3 | $\begin{bmatrix}1\\-1\end{bmatrix}$ | $\begin{bmatrix}1\\j\end{bmatrix}$ | 3 | $\begin{bmatrix}1\\-1\end{bmatrix}$ | $\begin{bmatrix}1\\-j\end{bmatrix}$ |
| 5 | $\begin{bmatrix}1\\-1\end{bmatrix}$ | $\begin{bmatrix}j\\j\end{bmatrix}$ | 0 | $\begin{bmatrix}1\\-1\end{bmatrix}$ | $\begin{bmatrix}j\\-j\end{bmatrix}$ |
| 3 | $\begin{bmatrix}1\\-1\end{bmatrix}$ | $\begin{bmatrix}-1\\j\end{bmatrix}$ | 3 | $\begin{bmatrix}1\\-1\end{bmatrix}$ | $\begin{bmatrix}-1\\-j\end{bmatrix}$ |
| 0 | $\begin{bmatrix}1\\-1\end{bmatrix}$ | $\begin{bmatrix}-j\\j\end{bmatrix}$ | 5 | $\begin{bmatrix}1\\-1\end{bmatrix}$ | $\begin{bmatrix}-j\\-j\end{bmatrix}$ |

TABLE 16

| Chordal distance | 1$^{st}$ Vector | 2$^{nd}$ Vector | Chordal distance | 1$^{st}$ Vector | 2$^{nd}$ Vector |
|---|---|---|---|---|---|
| 3 | $\begin{bmatrix}1\\-j\end{bmatrix}$ | $\begin{bmatrix}1\\1\end{bmatrix}$ | 3 | $\begin{bmatrix}1\\-j\end{bmatrix}$ | $\begin{bmatrix}1\\-1\end{bmatrix}$ |
| 0 | $\begin{bmatrix}1\\-j\end{bmatrix}$ | $\begin{bmatrix}j\\1\end{bmatrix}$ | 5 | $\begin{bmatrix}1\\-j\end{bmatrix}$ | $\begin{bmatrix}j\\-1\end{bmatrix}$ |
| 3 | $\begin{bmatrix}1\\-j\end{bmatrix}$ | $\begin{bmatrix}-1\\1\end{bmatrix}$ | 3 | $\begin{bmatrix}1\\-j\end{bmatrix}$ | $\begin{bmatrix}-1\\-1\end{bmatrix}$ |
| 5 | $\begin{bmatrix}1\\-j\end{bmatrix}$ | $\begin{bmatrix}-j\\1\end{bmatrix}$ | 0 | $\begin{bmatrix}1\\-j\end{bmatrix}$ | $\begin{bmatrix}-j\\-1\end{bmatrix}$ |
| 5 | $\begin{bmatrix}1\\-j\end{bmatrix}$ | $\begin{bmatrix}1\\j\end{bmatrix}$ | 0 | $\begin{bmatrix}1\\-j\end{bmatrix}$ | $\begin{bmatrix}1\\-j\end{bmatrix}$ |
| 3 | $\begin{bmatrix}1\\-j\end{bmatrix}$ | $\begin{bmatrix}j\\j\end{bmatrix}$ | 3 | $\begin{bmatrix}1\\-j\end{bmatrix}$ | $\begin{bmatrix}j\\-j\end{bmatrix}$ |
| 0 | $\begin{bmatrix}1\\-j\end{bmatrix}$ | $\begin{bmatrix}-1\\j\end{bmatrix}$ | 5 | $\begin{bmatrix}1\\-j\end{bmatrix}$ | $\begin{bmatrix}-1\\-j\end{bmatrix}$ |
| 3 | $\begin{bmatrix}1\\-j\end{bmatrix}$ | $\begin{bmatrix}-j\\j\end{bmatrix}$ | 3 | $\begin{bmatrix}1\\-j\end{bmatrix}$ | $\begin{bmatrix}-j\\-j\end{bmatrix}$ |

As described above, an orthogonal vector has a maximum chordal distance. A vector set having a maximum chordal distance of 5 in Table 13 to Table 16 can be expressed by Equation 17 below.

TABLE 17

| Chordal distance | 1$^{st}$ Vector | 2$^{nd}$ Vector | Chordal distance | 1$^{st}$ Vector | 2$^{nd}$ Vector |
|---|---|---|---|---|---|
| 5 | $\begin{bmatrix}1\\1\end{bmatrix}$ | $\begin{bmatrix}1\\-1\end{bmatrix}$ | 5 | $\begin{bmatrix}1\\-1\end{bmatrix}$ | $\begin{bmatrix}1\\1\end{bmatrix}$ |
| 5 | $\begin{bmatrix}1\\1\end{bmatrix}$ | $\begin{bmatrix}j\\-j\end{bmatrix}$ | 5 | $\begin{bmatrix}1\\-1\end{bmatrix}$ | $\begin{bmatrix}j\\j\end{bmatrix}$ |

TABLE 17-continued

| Chordal distance | 1$^{st}$ Vector | 2$^{nd}$ Vector | Chordal distance | 1$^{st}$ Vector | 2$^{nd}$ Vector |
|---|---|---|---|---|---|
| 5 | $\begin{bmatrix}1\\1\end{bmatrix}$ | $\begin{bmatrix}-1\\1\end{bmatrix}$ | 5 | $\begin{bmatrix}1\\-1\end{bmatrix}$ | $\begin{bmatrix}-1\\-1\end{bmatrix}$ |
| 5 | $\begin{bmatrix}1\\1\end{bmatrix}$ | $\begin{bmatrix}-j\\j\end{bmatrix}$ | 5 | $\begin{bmatrix}1\\-1\end{bmatrix}$ | $\begin{bmatrix}-j\\-j\end{bmatrix}$ |
| 5 | $\begin{bmatrix}1\\j\end{bmatrix}$ | $\begin{bmatrix}1\\-j\end{bmatrix}$ | 5 | $\begin{bmatrix}1\\-j\end{bmatrix}$ | $\begin{bmatrix}1\\j\end{bmatrix}$ |
| 5 | $\begin{bmatrix}1\\j\end{bmatrix}$ | $\begin{bmatrix}j\\1\end{bmatrix}$ | 5 | $\begin{bmatrix}1\\-j\end{bmatrix}$ | $\begin{bmatrix}1\\1\end{bmatrix}$ |
| 5 | $\begin{bmatrix}1\\j\end{bmatrix}$ | $\begin{bmatrix}-1\\j\end{bmatrix}$ | 5 | $\begin{bmatrix}1\\-j\end{bmatrix}$ | $\begin{bmatrix}1\\1\end{bmatrix}$ |
| 5 | $\begin{bmatrix}1\\j\end{bmatrix}$ | $\begin{bmatrix}-j\\-1\end{bmatrix}$ | 5 | $\begin{bmatrix}1\\-j\end{bmatrix}$ | $\begin{bmatrix}1\\j\end{bmatrix}$ |

If a codebook is configured such that '1' is always located in a first row and an element of a QPSK phase is located in a second row, then 16 types of vector sets of Table 17 can be expressed by Equation 18 below.

TABLE 18

| Chordal distance | 1$^{st}$ Vector | 2$^{nd}$ Vector | Chordal distance | 1$^{st}$ Vector | 2$^{nd}$ Vector |
|---|---|---|---|---|---|
| 5 | $\begin{bmatrix}1\\1\end{bmatrix}$ | $\begin{bmatrix}1\\-1\end{bmatrix}$ | 5 | $\begin{bmatrix}1\\-1\end{bmatrix}$ | $\begin{bmatrix}1\\1\end{bmatrix}$ |
| 5 | $\begin{bmatrix}1\\j\end{bmatrix}$ | $\begin{bmatrix}1\\-j\end{bmatrix}$ | 5 | $\begin{bmatrix}1\\-j\end{bmatrix}$ | $\begin{bmatrix}1\\j\end{bmatrix}$ |

4Tx transmission can be used to improve uplink transmission capability. Precoded spatial multiplexing can be used to increase spatial multiplexing capability in a slow-speed environment. An uplink system is designed to have a low PAPR since a signal distortion phenomenon may occur depending on a power amplifier of a UE in an uplink. The PAPR is restricted relatively less in a medium geometry or high geometry area, and thus such an environment can be taken into account in the designing of the codebook. That is, when configuring the codebook, a codebook having a cubic metric preserving (CMP) or cubic metric friendly (CMF) format can be configured.

Two codewords mapped to three layers can be taken into consideration when configuring the CMP to support a rank 3. Any one of three columns, that is, a column in which one layer is mapped to one codeword, is configured as an antenna selection vector, and a precoding matrix composed of the remaining columns in which two layers are mapped to one codeword is selected to have great diversity depending on antenna selection. That is, a column vector having one non-zero element is mapped to a certain layer having one codeword, and this column vector may be an antenna selection vector for selecting antennas 1 to 4. For example, the column vector having one non-zero element can be composed of vectors such as $[1000]^T$, $[0100]^T$, $[0010]^T$, and $[0001]^T$. Any one column can be configured as the antenna selection vector among column vectors for a codeword to which two layers are mapped in a weight matrix having three columns. The antenna selection vector selects an antenna different from an antenna selected from a column mapped to which a codeword having one layer is mapped. Any one column can be configured as a vector for combining two antennas among the column vectors for the codeword to which two layers are mapped. An element of a vector for antenna combination may have any phase value. For example, the element of the vector can be expressed by a QPSK or BPSK phase. Any one of two elements of the vector for antenna combination can be expressed always by a fixed value. '1' may be always mapped to an element of an upper row (or a row of a low index) of the two elements. A magnitude of the two elements can be normalized to a proper magnitude. For example, each column can be normalized to a value of 1/sqrt(2) so that a column of the vector for antenna combination has the same power as other columns.

As such, since the chordal distance of the configured codebook set may be determined according to a relation between columns including two non-zero elements, the codebook set is configured such that the chordal distance has a maximum value when determining two non-zero elements. For example, the codebook set may be configured such that the chordal distance has the maximum value by using 16 orthogonal vector sets as shown in Table 17. When any element among the non-zero element has a fixed phase, the codebook set may be configured by using 4 orthogonal vector sets so that the chordal distance has the maximum value. For example, as shown in Table 18, '1' may be always located in a first row and an element of a QPSK phase may be located in a second row.

Meanwhile, a codebook set having a distance smaller than the maximum chordal distance can also be configured. Table 19 shows an example of the codebook set having the distance smaller than the maximum chordal distance.

It is assumed that a first codeword is mapped to a first layer, and a second codeword is mapped to a second layer and a third layer. In this case, the first layer is mapped to a first column, the second layer is mapped to a second column, and the third layer is mapped to a third column. Since the second layer and the third layer are mapped to one codeword, switching performs between the second column and the third column results in an equivalent pattern.

An antenna selection vector is used in the first column and the second column or the third column. Herein, codebook sets A to F represent a switching pattern between antenna selection codebooks. In a column having two non-zero elements, a first element and a second element may have any phase. In the codebooks 1 and 2, a third column is composed of an orthogonal vector set. For example, a value of '1' may be always mapped to the first element of the third column, and 1 or −1 (or j or −j) may be mapped to the second element. That is, it can be expressed by $x \in \{1, -1\}$ or $x \in \{j, -j\}$.

Table 20 to Table 25 show examples of a codebook set when $x \in \{1, -1\}$ or $x \in \{j, -j\}$ in the codebook set of Table 19.

TABLE 19

| Set | Codebook 1 | Codebook 2 |
|---|---|---|
| A | $\frac{1}{2}\begin{bmatrix} 1 & 0 & 0 \\ 0 & 1 & 0 \\ 0 & 0 & 1 \\ 0 & 0 & x \end{bmatrix}$ | $\frac{1}{2}\begin{bmatrix} 0 & 1 & 0 \\ 1 & 0 & 0 \\ 0 & 0 & 1 \\ 0 & 0 & x \end{bmatrix}$ |
| B | $\frac{1}{2}\begin{bmatrix} 1 & 0 & 0 \\ 0 & 0 & 1 \\ 0 & 1 & 0 \\ 0 & 0 & x \end{bmatrix}$ | $\frac{1}{2}\begin{bmatrix} 0 & 1 & 0 \\ 0 & 0 & 1 \\ 1 & 0 & 0 \\ 0 & 0 & x \end{bmatrix}$ |
| C | $\frac{1}{2}\begin{bmatrix} 1 & 0 & 0 \\ 0 & 0 & 1 \\ 0 & 0 & x \\ 0 & 1 & 0 \end{bmatrix}$ | $\frac{1}{2}\begin{bmatrix} 0 & 1 & 0 \\ 0 & 0 & 1 \\ 0 & 0 & x \\ 1 & 0 & 0 \end{bmatrix}$ |
| D | $\frac{1}{2}\begin{bmatrix} 0 & 0 & 1 \\ 1 & 0 & 0 \\ 0 & 1 & 0 \\ 0 & 0 & x \end{bmatrix}$ | $\frac{1}{2}\begin{bmatrix} 0 & 0 & 1 \\ 0 & 1 & 0 \\ 1 & 0 & 0 \\ 0 & 0 & x \end{bmatrix}$ |
| E | $\frac{1}{2}\begin{bmatrix} 0 & 0 & 1 \\ 1 & 0 & 0 \\ 0 & 0 & x \\ 0 & 1 & 0 \end{bmatrix}$ | $\frac{1}{2}\begin{bmatrix} 0 & 0 & 1 \\ 0 & 1 & 0 \\ 0 & 0 & x \\ 1 & 0 & 0 \end{bmatrix}$ |
| F | $\frac{1}{2}\begin{bmatrix} 0 & 0 & 1 \\ 0 & 0 & x \\ 1 & 0 & 0 \\ 0 & 1 & 0 \end{bmatrix}$ | $\frac{1}{2}\begin{bmatrix} 0 & 0 & 1 \\ 0 & 0 & x \\ 0 & 1 & 0 \\ 1 & 0 & 0 \end{bmatrix}$ |

TABLE 20

| Set | Codebook 1 | Codebook 2 |
|---|---|---|
| A-1 | $\frac{1}{2}\begin{bmatrix} 1 & 0 & 0 \\ 0 & 1 & 0 \\ 0 & 0 & 1 \\ 0 & 0 & 1 \end{bmatrix}$ | $\frac{1}{2}\begin{bmatrix} 0 & 1 & 0 \\ 1 & 0 & 0 \\ 0 & 0 & 1 \\ 0 & 0 & -1 \end{bmatrix}$ |
| A-2 | $\frac{1}{2}\begin{bmatrix} 1 & 0 & 0 \\ 0 & 1 & 0 \\ 0 & 0 & 1 \\ 0 & 0 & -1 \end{bmatrix}$ | $\frac{1}{2}\begin{bmatrix} 0 & 1 & 0 \\ 1 & 0 & 0 \\ 0 & 0 & 1 \\ 0 & 0 & 1 \end{bmatrix}$ |
| A-3 | $\frac{1}{2}\begin{bmatrix} 1 & 0 & 0 \\ 0 & 1 & 0 \\ 0 & 0 & 1 \\ 0 & 0 & j \end{bmatrix}$ | $\frac{1}{2}\begin{bmatrix} 0 & 1 & 0 \\ 1 & 0 & 0 \\ 0 & 0 & 1 \\ 0 & 0 & -j \end{bmatrix}$ |
| A-4 | $\frac{1}{2}\begin{bmatrix} 1 & 0 & 0 \\ 0 & 1 & 0 \\ 0 & 0 & 1 \\ 0 & 0 & -j \end{bmatrix}$ | $\frac{1}{2}\begin{bmatrix} 0 & 1 & 0 \\ 1 & 0 & 0 \\ 0 & 0 & 1 \\ 0 & 0 & j \end{bmatrix}$ |

TABLE 21

| Set | Codebook 1 | Codebook 2 |
|---|---|---|
| B-1 | $\frac{1}{2}\begin{bmatrix} 1 & 0 & 0 \\ 0 & 0 & 1 \\ 0 & 1 & 0 \\ 0 & 0 & 1 \end{bmatrix}$ | $\frac{1}{2}\begin{bmatrix} 0 & 1 & 0 \\ 0 & 0 & 1 \\ 1 & 0 & 0 \\ 0 & 0 & -1 \end{bmatrix}$ |
| B-2 | $\frac{1}{2}\begin{bmatrix} 1 & 0 & 0 \\ 0 & 0 & 1 \\ 0 & 1 & 0 \\ 0 & 0 & -1 \end{bmatrix}$ | $\frac{1}{2}\begin{bmatrix} 0 & 1 & 0 \\ 0 & 0 & 1 \\ 1 & 0 & 0 \\ 0 & 0 & 1 \end{bmatrix}$ |
| B-3 | $\frac{1}{2}\begin{bmatrix} 1 & 0 & 0 \\ 0 & 0 & 1 \\ 0 & 1 & 0 \\ 0 & 0 & j \end{bmatrix}$ | $\frac{1}{2}\begin{bmatrix} 0 & 1 & 0 \\ 0 & 0 & 1 \\ 1 & 0 & 0 \\ 0 & 0 & -j \end{bmatrix}$ |
| B-4 | $\frac{1}{2}\begin{bmatrix} 1 & 0 & 0 \\ 0 & 0 & 1 \\ 0 & 1 & 0 \\ 0 & 0 & -j \end{bmatrix}$ | $\frac{1}{2}\begin{bmatrix} 0 & 1 & 0 \\ 0 & 0 & 1 \\ 1 & 0 & 0 \\ 0 & 0 & j \end{bmatrix}$ |

TABLE 22

| Set | Codebook 1 | Codebook 2 |
|---|---|---|
| C-1 | $\frac{1}{2}\begin{bmatrix} 1 & 0 & 0 \\ 0 & 0 & 1 \\ 0 & 0 & 1 \\ 0 & 1 & 0 \end{bmatrix}$ | $\frac{1}{2}\begin{bmatrix} 0 & 1 & 0 \\ 0 & 0 & 1 \\ 0 & 0 & -1 \\ 1 & 0 & 0 \end{bmatrix}$ |
| C-2 | $\frac{1}{2}\begin{bmatrix} 1 & 0 & 0 \\ 0 & 0 & 1 \\ 0 & 0 & -1 \\ 0 & 1 & 0 \end{bmatrix}$ | $\frac{1}{2}\begin{bmatrix} 0 & 1 & 0 \\ 0 & 0 & 1 \\ 0 & 0 & 1 \\ 1 & 0 & 0 \end{bmatrix}$ |
| C-3 | $\frac{1}{2}\begin{bmatrix} 1 & 0 & 0 \\ 0 & 0 & 1 \\ 0 & 0 & j \\ 0 & 1 & 0 \end{bmatrix}$ | $\frac{1}{2}\begin{bmatrix} 0 & 1 & 0 \\ 0 & 0 & 1 \\ 0 & 0 & -j \\ 1 & 0 & 0 \end{bmatrix}$ |
| C-4 | $\frac{1}{2}\begin{bmatrix} 1 & 0 & 0 \\ 0 & 0 & 1 \\ 0 & 0 & -j \\ 0 & 1 & 0 \end{bmatrix}$ | $\frac{1}{2}\begin{bmatrix} 0 & 1 & 0 \\ 0 & 0 & 1 \\ 0 & 0 & j \\ 1 & 0 & 0 \end{bmatrix}$ |

TABLE 23

| Set | Codebook 1 | Codebook 2 |
|---|---|---|
| D-1 | $\frac{1}{2}\begin{bmatrix} 0 & 0 & 1 \\ 1 & 0 & 0 \\ 0 & 1 & 0 \\ 0 & 0 & 1 \end{bmatrix}$ | $\frac{1}{2}\begin{bmatrix} 0 & 0 & 1 \\ 0 & 1 & 0 \\ 1 & 0 & 0 \\ 0 & 0 & -1 \end{bmatrix}$ |
| D-2 | $\frac{1}{2}\begin{bmatrix} 0 & 0 & 1 \\ 1 & 0 & 0 \\ 0 & 1 & 0 \\ 0 & 0 & -1 \end{bmatrix}$ | $\frac{1}{2}\begin{bmatrix} 0 & 0 & 1 \\ 0 & 1 & 0 \\ 1 & 0 & 0 \\ 0 & 0 & 1 \end{bmatrix}$ |
| D-3 | $\frac{1}{2}\begin{bmatrix} 0 & 0 & 1 \\ 1 & 0 & 0 \\ 0 & 1 & 0 \\ 0 & 0 & j \end{bmatrix}$ | $\frac{1}{2}\begin{bmatrix} 0 & 0 & 1 \\ 0 & 1 & 0 \\ 1 & 0 & 0 \\ 0 & 0 & -j \end{bmatrix}$ |
| D-4 | $\frac{1}{2}\begin{bmatrix} 0 & 0 & 1 \\ 1 & 0 & 0 \\ 0 & 1 & 0 \\ 0 & 0 & -j \end{bmatrix}$ | $\frac{1}{2}\begin{bmatrix} 0 & 0 & 1 \\ 0 & 1 & 0 \\ 1 & 0 & 0 \\ 0 & 0 & j \end{bmatrix}$ |

TABLE 24

| Set | Codebook 1 | Codebook 2 |
|---|---|---|
| E-1 | $\frac{1}{2}\begin{bmatrix} 0 & 0 & 1 \\ 1 & 0 & 0 \\ 0 & 0 & 1 \\ 0 & 1 & 0 \end{bmatrix}$ | $\frac{1}{2}\begin{bmatrix} 0 & 0 & 1 \\ 0 & 1 & 0 \\ 0 & 0 & -1 \\ 1 & 0 & 0 \end{bmatrix}$ |
| E-2 | $\frac{1}{2}\begin{bmatrix} 0 & 0 & 1 \\ 1 & 0 & 0 \\ 0 & 0 & -1 \\ 0 & 1 & 0 \end{bmatrix}$ | $\frac{1}{2}\begin{bmatrix} 0 & 0 & 1 \\ 0 & 1 & 0 \\ 0 & 0 & 1 \\ 1 & 0 & 0 \end{bmatrix}$ |
| E-3 | $\frac{1}{2}\begin{bmatrix} 0 & 0 & 1 \\ 1 & 0 & 0 \\ 0 & 0 & j \\ 0 & 1 & 0 \end{bmatrix}$ | $\frac{1}{2}\begin{bmatrix} 0 & 0 & 1 \\ 0 & 1 & 0 \\ 0 & 0 & -j \\ 1 & 0 & 0 \end{bmatrix}$ |
| E-4 | $\frac{1}{2}\begin{bmatrix} 0 & 0 & 1 \\ 1 & 0 & 0 \\ 0 & 0 & -j \\ 0 & 1 & 0 \end{bmatrix}$ | $\frac{1}{2}\begin{bmatrix} 0 & 0 & 1 \\ 0 & 1 & 0 \\ 0 & 0 & j \\ 1 & 0 & 0 \end{bmatrix}$ |

TABLE 25

| Set | Codebook 1 | Codebook 2 |
|---|---|---|
| F-1 | $\frac{1}{2}\begin{bmatrix} 0 & 0 & 1 \\ 0 & 0 & 1 \\ 1 & 0 & 0 \\ 0 & 1 & 0 \end{bmatrix}$ | $\frac{1}{2}\begin{bmatrix} 0 & 0 & 1 \\ 0 & 0 & -1 \\ 0 & 1 & 0 \\ 1 & 0 & 0 \end{bmatrix}$ |
| F-2 | $\frac{1}{2}\begin{bmatrix} 0 & 0 & 1 \\ 0 & 0 & -1 \\ 1 & 0 & 0 \\ 0 & 1 & 0 \end{bmatrix}$ | $\frac{1}{2}\begin{bmatrix} 0 & 0 & 1 \\ 0 & 0 & 1 \\ 0 & 1 & 0 \\ 1 & 0 & 0 \end{bmatrix}$ |
| F-3 | $\frac{1}{2}\begin{bmatrix} 0 & 0 & 1 \\ 0 & 0 & j \\ 1 & 0 & 0 \\ 0 & 1 & 0 \end{bmatrix}$ | $\frac{1}{2}\begin{bmatrix} 0 & 0 & 1 \\ 0 & 0 & -j \\ 0 & 1 & 0 \\ 1 & 0 & 0 \end{bmatrix}$ |

TABLE 25-continued

| Set | Codebook 1 | Codebook 2 |
|---|---|---|
| F-4 | $\frac{1}{2}\begin{bmatrix} 0 & 0 & 1 \\ 0 & 0 & -j \\ 1 & 0 & 0 \\ 0 & 1 & 0 \end{bmatrix}$ | $\frac{1}{2}\begin{bmatrix} 0 & 0 & 1 \\ 0 & 0 & j \\ 0 & 1 & 0 \\ 1 & 0 & 0 \end{bmatrix}$ |

Among the codebook sets A to F, it is assumed that a codebook set configured with $x \in \{1, -1\}$ is denoted by a set A, and a codebook set configured with $x \in \{j, -j\}$ is denoted by a set B. That is, the set A includes {A-1 or A-2}, {B-1 or B-2}, {C-1 or C-2}, {D-1 or D-2}, {E-1 or E-2}, {F-1 or F-2}, and the set B includes {A-3 or A-4}, {B-3 or B-4}, {C-3 or C-4}, {D-3 or D-4}, {E-3 or E-4}, {F-3 or F-4}.

Codebooks included in the set A may be selected from '1' or '2' of each of the codebook sets A to F. Therefore, 64 codebook sets having 12 elements can be configured from the set A. Codebooks included in the set B may be selected from '3' or '4' of each of the codebook sets A to F, and 64 codebook sets having 12 elements can be configured from the set B.

Table 26 shows examples of the codebook set which has 12 elements and which can be configured from the set A.

TABLE 26

| case | codebook set (see Tables 21~25) | case | codebook set (see Tables 21~25) |
|---|---|---|---|
| 1 | A-1, B-1, C-1, D-1, E-1, F-1 | 2 | A-1, B-1, C-1, D-1, E-1, F-2 |
| 3 | A-1, B-1, C-1, D-1, E-2, F-1 | 4 | A-1, B-1, C-1, D-1, E-2, F-2 |
| 5 | A-1, B-1, C-1, D-2, E-1, F-1 | 6 | A-1, B-1, C-1, D-2, E-1, F-2 |
| 7 | A-1, B-1, C-1, D-2, E-2, F-1 | 8 | A-1, B-1, C-1, D-2, E-2, F-2 |
| 9 | A-1, B-1, C-2, D-1, E-1, F-1 | 10 | A-1, B-1, C-2, D-1, E-1, F-2 |
| 11 | A-1, B-1, C-2, D-1, E-2, F-1 | 12 | A-1, B-1, C-2, D-1, E-2, F-2 |
| 13 | A-1, B-1, C-2, D-2, E-1, F-1 | 14 | A-1, B-1, C-2, D-2, E-1, F-2 |
| 15 | A-1, B-1, C-2, D-2, E-2, F-1 | 16 | A-1, B-1, C-2, D-2, E-2, F-2 |
| 17 | A-1, B-2, C-1, D-1, E-1, F-1 | 18 | A-1, B-2, C-1, D-1, E-1, F-2 |
| 19 | A-1, B-2, C-1, D-1, E-2, F-1 | 20 | A-1, B-2, C-1, D-1, E-2, F-2 |
| 21 | A-1, B-2, C-1, D-2, E-1, F-1 | 22 | A-1, B-2, C-1, D-2, E-1, F-2 |
| 23 | A-1, B-2, C-1, D-2, E-2, F-1 | 24 | A-1, B-2, C-1, D-2, E-2, F-2 |
| 25 | A-1, B-2, C-2, D-1, E-1, F-1 | 26 | A-1, B-2, C-2, D-1, E-1, F-2 |
| 27 | A-1, B-2, C-2, D-1, E-2, F-1 | 28 | A-1, B-2, C-2, D-1, E-2, F-2 |
| 29 | A-1, B-2, C-2, D-2, E-1, F-1 | 30 | A-1, B-2, C-2, D-2, E-1, F-2 |
| 31 | A-1, B-2, C-2, D-2, E-2, F-1 | 32 | A-1, B-2, C-2, D-2, E-2, F-2 |
| 33 | A-2, B-1, C-1, D-1, E-1, F-1 | 34 | A-2, B-1, C-1, D-1, E-1, F-2 |
| 35 | A-2, B-1, C-1, D-1, E-2, F-1 | 36 | A-2, B-1, C-1, D-1, E-2, F-2 |
| 37 | A-2, B-1, C-1, D-2, E-1, F-1 | 38 | A-2, B-1, C-1, D-2, E-1, F-2 |
| 39 | A-2, B-1, C-1, D-2, E-2, F-1 | 40 | A-2, B-1, C-1, D-2, E-2, F-2 |
| 41 | A-2, B-1, C-2, D-1, E-1, F-1 | 42 | A-2, B-1, C-2, D-1, E-1, F-2 |
| 43 | A-2, B-1, C-2, D-1, E-2, F-1 | 44 | A-2, B-1, C-2, D-1, E-2, F-2 |
| 45 | A-2, B-1, C-2, D-2, E-1, F-1 | 46 | A-2, B-1, C-2, D-2, E-1, F-2 |
| 47 | A-2, B-1, C-2, D-2, E-2, F-1 | 48 | A-2, B-1, C-2, D-2, E-2, F-2 |
| 49 | A-2, B-2, C-1, D-1, E-1, F-1 | 50 | A-2, B-2, C-1, D-1, E-1, F-2 |
| 51 | A-2, B-2, C-1, D-1, E-2, F-1 | 52 | A-2, B-2, C-1, D-1, E-2, F-2 |
| 53 | A-2, B-2, C-1, D-2, E-1, F-1 | 54 | A-2, B-2, C-1, D-2, E-1, F-2 |
| 55 | A-2, B-2, C-1, D-2, E-2, F-1 | 56 | A-2, B-2, C-1, D-2, E-2, F-2 |
| 57 | A-2, B-2, C-2, D-1, E-1, F-1 | 58 | A-2, B-2, C-2, D-1, E-1, F-2 |
| 59 | A-2, B-2, C-2, D-1, E-2, F-1 | 60 | A-2, B-2, C-2, D-1, E-2, F-2 |
| 61 | A-2, B-2, C-2, D-2, E-1, F-1 | 62 | A-2, B-2, C-2, D-2, E-1, F-2 |
| 63 | A-2, B-2, C-2, D-2, E-2, F-1 | 64 | A-2, B-2, C-2, D-2, E-2, F-2 |

A codebook may be configured by using some sets from the codebook sets A to F of Table 19. For example, the codebook sets A, B, E, and F may be used. This is for exemplary purposes only, and thus there is no restriction on the number of some selected sets and the type of the selected set.

Among the codebook sets A, B, E, and F, it is assumed that a codebook set configured with $x \in \{1, -1\}$ is denoted by a set A', and a codebook set configured with $x \in \{j, -j\}$ is denoted by a set B'. That is, the set A' includes {A-1 or A-2}, {B-1 or B-2}, {E-1 or E-2}, {F-1 or F-2}, and the set B' includes {A-3 or A-4}, {B-3 or B-4}, {E-3 or E-4}, {F-3 or F-4}.

Codebooks included in the set A' may be selected from '1' or '2' of each of the codebook sets A, B, E, and F, and 16 codebook sets having 8 elements can be configured from the set A'. Codebooks included in the set B' may be selected from '3' or '4' of each of the codebook sets A, B, E, and F, and 16 codebook sets having 8 elements can be configured from the set B'.

Table 27 shows examples of the codebook set which has 8 elements and which can be configured from the set A'.

TABLE 27

| case | codebook set (see Tables 21~25) | case | codebook set (see Tables 21~25) |
|---|---|---|---|
| 1 | A-1, B-1, E-1, F-1 | 2 | A-1, B-1, E-1, F-2 |
| 3 | A-1, B-1, E-2, F-1 | 4 | A-1, B-1, E-2, F-2 |
| 5 | A-1, B-2, E-1, F-1 | 6 | A-1, B-2, E-1, F-2 |
| 7 | A-1, B-2, E-2, F-1 | 8 | A-1, B-2, E-2, F-2 |
| 9 | A-2, B-1, E-1, F-1 | 10 | A-2, B-1, E-1, F-2 |
| 11 | A-2, B-1, E-2, F-1 | 12 | A-2, B-1, E-2, F-2 |
| 13 | A-2, B-2, E-1, F-1 | 14 | A-2, B-2, E-1, F-2 |
| 15 | A-2, B-2, E-2, F-1 | 16 | A-2, B-2, E-2, F-2 |

The codebook sets A, B, C, and D can be used from the codebook sets A to F of Table 19. This is for exemplary purposes only, and thus there is no restriction on the number of some selected sets and the type of the selected set.

Among the codebook sets A, B, C, and D, it is assumed that a codebook set configured with $x \in \{1, -1\}$ is denoted by a set A", and a codebook set configured with $x \in \{j, -j\}$ is denoted by a set B". That is, the set A" includes {A-1 or A-2}, {B-1 or B-2}, {C-1 or C-2}, {D-1 or D-2}, and the set B" includes {A-3 or A-4}, {B-3 or B-4}, {C-3 or C-4}, {D-3 or D-4}.

Codebooks included in the set A" may be selected from '1' or '2' of each of the codebook sets A, B, C, and D, and 16 codebook sets having 8 elements can be configured from the set A". Codebooks included in the set B" may be selected from '3' or '4' of each of the codebook sets A, B, C, and D, and 16 codebook sets having 8 elements can be configured from the set B".

Table 28 shows examples of the codebook set which has 8 elements and which can be configured from the set A".

TABLE 28

| case | codebook set (see Tables 21~25) | case | codebook set (see Tables 21~25) |
|---|---|---|---|
| 1 | A-1, B-1, C-1, D-1 | 2 | A-1, B-1, C-1, D-2 |
| 3 | A-1, B-1, C-2, D-1 | 4 | A-1, B-1, C-2, D-2 |
| 5 | A-1, B-2, C-1, D-1 | 6 | A-1, B-2, C-1, D-2 |
| 7 | A-1, B-2, C-2, D-1 | 8 | A-1, B-2, C-2, D-2 |
| 9 | A-2, B-1, C-1, D-1 | 10 | A-2, B-1, C-1, D-2 |
| 11 | A-2, B-1, C-2, D-1 | 12 | A-2, B-1, C-2, D-2 |
| 13 | A-2, B-2, C-1, D-1 | 14 | A-2, B-2, C-1, D-2 |
| 15 | A-2, B-2, C-2, D-1 | 16 | A-2, B-2, C-2, D-2 |

As such, any four codebook sets may be selected from the 6 codebook sets A to F of Table 19. The number of cases of any four codebook sets selected from the 6 codebook sets A to F is 6c4=15. A codebook set having 8 elements can be configured from a set selected from '1' or '2' of a codebook set of $x \in \{1, -1\}$ among the selected any four codebook sets. Alternatively, a codebook sets having 8 elements can be configured from a set selected from '3' or '4' of a codebook sets of $x \in \{j, -j\}$ among the selected any four codebook sets.

A codebook can be configured by using two sets among the codebook sets A to F of Table 19. For example, the codebook sets A and F can be used. This is for exemplary purposes only, and thus there is no restriction on the number of some selected sets and the type of the selected set.

Between the codebook sets A and F, it is assumed that a codebook set configured with $x \in \{1, -1\}$ is denoted by a set A''', and a codebook set configured with $x \in \{j, -j\}$ is denoted by a set B'''. That is, the set A''' includes {A-1 or A-2}, {F-1 or F-2}, and the set B''' includes {A-3 or A-4}, {F-3 or F-4}.

Codebooks included in the set A''' may be selected from '1' or '2' of each of the codebook sets A and F, and 16 codebook sets having 4 elements can be configured from the set A'''. Codebooks included in the set B''' may be selected from '3' or '4' of each of the codebook sets A and F, and 16 codebook sets having 4 elements can be configured from the set B'''.

Table 29 shows examples of the codebook set which has 4 elements and which can be configured from the set A'''.

TABLE 29

| case | codebook set (see Tables 21~25) | case | codebook set (see Tables 21~25) |
|---|---|---|---|
| 1 | A-1, F-1 | 2 | A-1, F-2 |
| 3 | A-2, F-1 | 4 | A-2, F-2 |

Although it is shown herein that a second element of the codebook set having 4 elements is $x \in \{1, -1\}$, the second element may also be configured with $x \in \{j, -j\}$.

Meanwhile, when configuring the codebook having 12 elements, any two codebook sets may be selected from Table 19, and a second element of the selected codebook set may be configured with $x \in \{j, -1, -j\}$.

Table 30 shows an example of a codebook when a second element of a selected codebook set is configured with $x \in \{j, -1, -j\}$. This is case where the codebook sets A and F of Table 19 are selected.

TABLE 30

$$\frac{1}{2}\begin{bmatrix} 1 & 0 & 0 \\ 0 & 1 & 0 \\ 0 & 0 & 1 \\ 0 & 0 & j \end{bmatrix} \frac{1}{2}\begin{bmatrix} 1 & 0 & 0 \\ 0 & 1 & 0 \\ 0 & 0 & 1 \\ 0 & 0 & -1 \end{bmatrix} \frac{1}{2}\begin{bmatrix} 1 & 0 & 0 \\ 0 & 1 & 0 \\ 0 & 0 & 1 \\ 0 & 0 & -j \end{bmatrix} \frac{1}{2}\begin{bmatrix} 0 & 1 & 0 \\ 1 & 0 & 0 \\ 0 & 0 & 1 \\ 0 & 0 & j \end{bmatrix} \frac{1}{2}\begin{bmatrix} 0 & 1 & 0 \\ 1 & 0 & 0 \\ 0 & 0 & 1 \\ 0 & 0 & -1 \end{bmatrix} \frac{1}{2}\begin{bmatrix} 0 & 1 & 0 \\ 1 & 0 & 0 \\ 0 & 0 & 1 \\ 0 & 0 & -j \end{bmatrix}$$

$$\frac{1}{2}\begin{bmatrix} 0 & 0 & 1 \\ 0 & 0 & j \\ 1 & 0 & 0 \\ 0 & 1 & 0 \end{bmatrix} \frac{1}{2}\begin{bmatrix} 0 & 0 & 1 \\ 0 & 0 & -1 \\ 1 & 0 & 0 \\ 0 & 1 & 0 \end{bmatrix} \frac{1}{2}\begin{bmatrix} 0 & 0 & 1 \\ 0 & 0 & -j \\ 1 & 0 & 0 \\ 0 & 1 & 0 \end{bmatrix} \frac{1}{2}\begin{bmatrix} 0 & 0 & 1 \\ 0 & 0 & j \\ 0 & 1 & 0 \\ 1 & 0 & 0 \end{bmatrix} \frac{1}{2}\begin{bmatrix} 0 & 0 & 1 \\ 0 & 0 & -1 \\ 0 & 1 & 0 \\ 1 & 0 & 0 \end{bmatrix} \frac{1}{2}\begin{bmatrix} 0 & 0 & 1 \\ 0 & 0 & -j \\ 0 & 1 & 0 \\ 1 & 0 & 0 \end{bmatrix}$$

A codebook set can be configured in various manners in a UE or a BS. The UE can configure the codebook set. When the UE can use codebooks of different types and characteristics, the UE can select and use a specific codebook set. In this case, the UE can report the selected codebook set to the BS. When configuring the codebook sets of different types or characteristics, a system may use all codebook sets or may selectively use only the specific codebook set. In case of using only the specific codebook set, a codebook set to be used has to be approved between the BS and the UE before applying the codebook set to be used. For this, the UE can select a group of codebook sets desired to be used and report it to the BS. The BS can approve the codebook set selected by the UE. Alternatively, the BS can report the group of the codebook sets to be used to the UE. It can be achieved through specific signaling when the UE reports the group of the selected codebook sets to the BS, or when the BS approves the codebook set selected by the UE, or when the BS reports the group of the codebook sets to be used to the UE. For example, it can be achieved by using higher layer signaling such as RRC signaling, or specific signaling can be achieved through a physical downlink control channel (PDCCH).

The codebook sets of different types or characteristics may be a codebook set (e.g., a house holder codebook) defined for downlink transmission, a CMF codebook capable of increasing spatial diversity despite having a slightly high cubic metric (CM), a CMP codebook capable of ensuring a low CM. The codebook set of different types or characteristics may be used together with several types of codebook sets. For example, the CMF codebook and the CMP codebook can be combined and used.

Table 31 shows an example of a codebook set configured by combining the CMF codebook and the CMP codebook.

TABLE 31

| codebook set | CMF(12 elements) + CMP(12 elements) |
|---|---|
| | CMF(12 elements) + CMP(10 elements) |
| | CMF(12 elements) + CMP(8 elements) |
| | CMF(12 elements) + CMP(4 elements) |
| | CMF(10 elements) + CMP(12 elements) |
| | CMF(8 elements) + CMP(12 elements) |
| | CMF(4 elements) + CMP(12 elements) |

The number of elements included in the CMF codebook and the CMP codebook is for exemplary purposes only, and there is no restriction on the number of elements included in each codebook.

Table 32 shows an example of a codebook set including 12 CMF precoding matrices having a size of 12.

TABLE 32

$$\frac{1}{\sqrt{6}}\begin{bmatrix}1 & 1 & 0\\1 & 0 & 1\\1 & -1 & 0\\1 & 0 & -1\end{bmatrix}\times\Lambda \quad \frac{1}{\sqrt{6}}\begin{bmatrix}1 & 1 & 0\\1 & 0 & 1\\j & -j & 0\\-j & 0 & j\end{bmatrix}\times\Lambda \quad \frac{1}{\sqrt{6}}\begin{bmatrix}1 & 1 & 0\\1 & 0 & 1\\-1 & 1 & 0\\-1 & 0 & 1\end{bmatrix}\times\Lambda \quad \frac{1}{\sqrt{6}}\begin{bmatrix}1 & 1 & 0\\-j & 0 & 1\\j & -j & 0\\1 & 0 & -j\end{bmatrix}\times\Lambda$$

$$\frac{1}{\sqrt{6}}\begin{bmatrix}1 & 1 & 0\\j & -j & 0\\1 & 0 & 1\\-j & 0 & j\end{bmatrix}\times\Lambda \quad \frac{1}{\sqrt{6}}\begin{bmatrix}1 & 1 & 0\\j & -j & 0\\j & 0 & 1\\-1 & 0 & -j\end{bmatrix}\times\Lambda \quad \frac{1}{\sqrt{6}}\begin{bmatrix}1 & 1 & 0\\j & -j & 0\\-1 & 0 & 1\\j & 0 & j\end{bmatrix}\times\Lambda \quad \frac{1}{\sqrt{6}}\begin{bmatrix}1 & 1 & 0\\-j & j & 0\\-1 & 0 & 1\\-j & 0 & -j\end{bmatrix}\times\Lambda$$

$$\frac{1}{\sqrt{6}}\begin{bmatrix}1 & 1 & 0\\-1 & 0 & 1\\1 & 0 & 1\\-1 & 1 & 0\end{bmatrix}\times\Lambda \quad \frac{1}{\sqrt{6}}\begin{bmatrix}1 & 1 & 0\\-1 & 0 & 1\\j & 0 & j\\j & -j & 0\end{bmatrix}\times\Lambda \quad \frac{1}{\sqrt{6}}\begin{bmatrix}1 & 1 & 0\\-1 & 0 & 1\\-1 & 0 & -1\\1 & -1 & 0\end{bmatrix}\times\Lambda \quad \frac{1}{\sqrt{6}}\begin{bmatrix}1 & 1 & 0\\-1 & 0 & 1\\-j & 0 & -j\\-j & j & 0\end{bmatrix}\times\Lambda$$

Herein, $$\Lambda = \begin{bmatrix}1/\sqrt{2} & 0 & 0\\0 & 1 & 0\\0 & 0 & 1\end{bmatrix}$$

is a factor for normalizing a column vector for the CMF precoding matrix. The CMF precoding matrix can ensure a CM of 4.

It is assumed that a first codeword is mapped to a first layer, and a second codeword is mapped to a second layer and a third layer. In this case, the first layer is mapped to a first column, the second layer is mapped to a second column, and the third layer is mapped to a third column.

Unlike the aforementioned example, an antenna selection vector may be used in the second column and the third column. Herein, the codebook sets A to F represent a switching pattern between antenna selection codebooks. In a column having two non-zero element, a first element and a second element may have any phase. In the codebook set, a first column is configured with an orthogonal vector set. For example, a value of '1' may be always mapped to a first element of the first column, and 1 or −1 (or j or −j) may be mapped to a second element. If the second element is denoted by x, it can be expressed by x∈{1, −1} or x∈{j, −j}.

Table 33 shows an example of a codebook set in case of x∈{1, −1} or x∈{j, −j}.

TABLE 33

|   | A | B | C | D | E | F |
|---|---|---|---|---|---|---|
| (1) x = 1 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ |
| (2) x = −1 | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |
| (3) x = j | $\frac{1}{2}\begin{bmatrix} 1 & 0 & 0 \\ j & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ j & 0 & 0 \\ 0 & 0 & 1 \end{bmatrix}$ | $\frac{1}{2}\begin{bmatrix} 1 & 0 & 0 \\ 0 & 1 & 0 \\ 0 & 0 & 1 \\ j & 0 & 0 \end{bmatrix}$ | $\frac{1}{2}\begin{bmatrix} 0 & 1 & 0 \\ 1 & 0 & 0 \\ j & 0 & 0 \\ 0 & 0 & 1 \end{bmatrix}$ | $\frac{1}{2}\begin{bmatrix} 0 & 1 & 0 \\ 1 & 0 & 0 \\ 0 & 0 & 1 \\ j & 0 & 0 \end{bmatrix}$ | $\frac{1}{2}\begin{bmatrix} 0 & 1 & 0 \\ 0 & 0 & 1 \\ 1 & 0 & 0 \\ j & 0 & 0 \end{bmatrix}$ |
| (4) x = −j | $\frac{1}{2}\begin{bmatrix} 1 & 0 & 0 \\ -j & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ -j & 0 & 0 \\ 0 & 0 & 1 \end{bmatrix}$ | $\frac{1}{2}\begin{bmatrix} 1 & 0 & 0 \\ 0 & 1 & 0 \\ 0 & 0 & 1 \\ -j & 0 & 0 \end{bmatrix}$ | $\frac{1}{2}\begin{bmatrix} 0 & 1 & 0 \\ 1 & 0 & 0 \\ -j & 0 & 0 \\ 0 & 0 & 1 \end{bmatrix}$ | $\frac{1}{2}\begin{bmatrix} 0 & 1 & 0 \\ 1 & 0 & 0 \\ 0 & 0 & 1 \\ -j & 0 & 0 \end{bmatrix}$ | $\frac{1}{2}\begin{bmatrix} 0 & 1 & 0 \\ 0 & 0 & 1 \\ 1 & 0 & 0 \\ -j & 0 & 0 \end{bmatrix}$ |

Referring to Table 33, A to F denote groups each having a plurality of elements depending on a value of x. Each group may be composed of 4 elements when a value x is a QPSK value, and may be configured of 2 elements when the value x is a BPSK value. By using these groups, a codebook set having 8, 12, 16, and 20 elements can be configured.

(1) First, a method of configuring a codebook set having 8 elements will be described.

A. Two groups are selected from the groups A, B, C, D, E, and F of Table 33. Each of the selected groups can be configured with QPSK.

In the following tables, A1 denotes a matrix when x=1 in the group A of Table 33, A2 denotes a matrix when x=−1 in the group A of Table 33, and A3 denotes a matrix when x=j in the group A of Table 33, and A4 denotes a matrix when x=−j in the group A of Table 33. The same is also applied to the groups B, C, D, E, and F.

Table 34 shows examples of a codebook set having 8 elements by selecting two groups.

TABLE 34

| case | codebook set (see Table 33) | case | codebook set (see Table 33) |
|---|---|---|---|
| 1 | A1, A2, A3, A4, B1, B2, B3, B4 | 2 | A1, A2, A3, A4, C1, C2, C3, C4 |
| 3 | A1, A2, A3, A4, D1, D2, D3, D4 | 4 | A1, A2, A3, A4, E1, E2, E3, E4 |
| 5 | A1, A2, A3, A4, F1, F2, F3, F4 | 6 | B1, B2, B3, B4, C1, C2, C3, C4 |
| 7 | B1, B2, B3, B4, D1, D2, D3, D4 | 8 | B1, B2, B3, B4, E1, E2, E3, E4 |
| 9 | B1, B2, B3, B4, F1, F2, F3, F4 | 10 | C1, C2, C3, C4, D1, D2, D3, D4 |
| 11 | C1, C2, C3, C4, E1, E2, E3, E4 | 12 | C1, C2, C3, C4, F1, F2, F3, F4 |
| 13 | D1, D2, D3, D4, E1, E2, E3, E4 | 14 | D1, D2, D3, D4, F1, F2, F3, F4 |
| 15 | E1, E2, E3, E4, F1, F2, F3, F4 | | |

B. In another method of configuring a codebook set having 8 elements, three groups are selected from the groups A, B, C, D, E, and F of Table 33. One of the selected groups may be configured with QPSK, and the remaining two groups may be configured with BPSK.

Table 35 shows examples of a codebook set having 8 elements by selecting three groups.

TABLE 35

| case | codebook set (see Table 33) | case | codebook set (see Table 33) |
|---|---|---|---|
| 1 | A1, A2, A3, A4, B1, B2, C1, C2 | 2 | A1, A2, A3, A4, B1, B2, C3, C4 |
| 3 | A1, A2, A3, A4, B3, B4, C1, C2 | 4 | A1, A2, A3, A4, B3, B4, C3, C4 |
| 5 | A1, A2, A3, A4, B1, B2, D1, D2 | 6 | A1, A2, A3, A4, B1, B2, D3, D4 |
| 7 | A1, A2, A3, A4, B3, B4, D1, D2 | 8 | A1, A2, A3, A4, B3, B4, D3, D4 |
| 9 | A1, A2, A3, A4, B1, B2, E1, E2 | 10 | A1, A2, A3, A4, B1, B2, E3, E4 |

TABLE 35-continued

| case | codebook set (see Table 33) | case | codebook set (see Table 33) |
|---|---|---|---|
| 11 | A1, A2, A3, A4, B3, B4, E1, E2 | 12 | A1, A2, A3, A4, B3, B4, E3, E4 |
| 13 | A1, A2, A3, A4, B1, B2, F1, F2 | 14 | A1, A2, A3, A4, B1, B2, F3, F4 |
| 15 | A1, A2, A3, A4, B3, B4, F1, F2 | 16 | A1, A2, A3, A4, B3, B4, F3, F4 |
| 17 | A1, A2, A3, A4, C1, C2, D1, D2 | 18 | A1, A2, A3, A4, C1, C2, D3, D4 |
| 19 | A1, A2, A3, A4, C3, C4, D1, D2 | 20 | A1, A2, A3, A4, C3, C4, D3, D4 |
| 21 | A1, A2, A3, A4, C1, C2, E1, E2 | 22 | A1, A2, A3, A4, C1, C2, E3, E4 |
| 23 | A1, A2, A3, A4, C3, C4, E1, E2 | 24 | A1, A2, A3, A4, C3, C4, E3, E4 |
| 25 | A1, A2, A3, A4, C1, C2, F1, F2 | 26 | A1, A2, A3, A4, C1, C2, F3, F4 |
| 27 | A1, A2, A3, A4, C3, C4, F1, F2 | 28 | A1, A2, A3, A4, C3, C4, F3, F4 |
| 29 | A1, A2, A3, A4, D1, D2, E1, E2 | 30 | A1, A2, A3, A4, D1, D2, E3, E4 |
| 31 | A1, A2, A3, A4, D3, D4, E1, E2 | 32 | A1, A2, A3, A4, D3, D4, E3, E4 |
| 33 | A1, A2, A3, A4, D1, D2, F1, F2 | 34 | A1, A2, A3, A4, D1, D2, F3, F4 |
| 35 | A1, A2, A3, A4, D3, D4, F1, F2 | 36 | A1, A2, A3, A4, D3, D4, F3, F4 |
| 37 | A1, A2, A3, A4, E1, E2, F1, F2 | 38 | A1, A2, A3, A4, E1, E2, F3, F4 |
| 39 | A1, A2, A3, A4, E3, E4, F1, F2 | 40 | A1, A2, A3, A4, E3, E4, F3, F4 |
| 41 | A1, A2, B1, B2, B3, B4, C1, C2 | 42 | A1, A2, B1, B2, B3, B4, C3, C4 |
| 43 | A3, A4, B1, B2, B3, B4, C1, C2 | 44 | A3, A4, B1, B2, B3, B4, C3, C4 |
| 45 | A1, A2, B1, B2, B3, B4, D1, D2 | 46 | A1, A2, B1, B2, B3, B4, D3, D4 |
| 47 | A3, A4, B1, B2, B3, B4, D1, D2 | 48 | A3, A4, B1, B2, B3, B4, D3, D4 |
| 49 | A1, A2, B1, B2, B3, B4, E1, E2 | 50 | A1, A2, B1, B2, B3, B4, E3, E4 |
| 51 | A3, A4, B1, B2, B3, B4, E1, E2 | 52 | A3, A4, B1, B2, B3, B4, E3, E4 |
| 53 | A1, A2, B1, B2, B3, B4, F1, F2 | 54 | A1, A2, B1, B2, B3, B4, F3, F4 |
| 55 | A3, A4, B1, B2, B3, B4, F1, F2 | 56 | A3, A4, B1, B2, B3, B4, F3, F4 |
| 57 | B1, B2, B3, B4, C1, C2, D1, D2 | 58 | B1, B2, B3, B4, C1, C2, D3, D4 |
| 59 | B1, B2, B3, B4, C3, C4, D1, D2 | 60 | B1, B2, B3, B4, C3, C4, D3, D4 |
| 61 | B1, B2, B3, B4, C1, C2, E1, E2 | 62 | B1, B2, B3, B4, C1, C2, E3, E4 |
| 63 | B1, B2, B3, B4, C3, C4, E1, E2 | 64 | B1, B2, B3, B4, C3, C4, E3, E4 |
| 65 | B1, B2, B3, B4, C1, C2, F1, F2 | 66 | B1, B2, B3, B4, C1, C2, F3, F4 |
| 67 | B1, B2, B3, B4, C3, C4, F1, F2 | 68 | B1, B2, B3, B4, C3, C4, F3, F4 |
| 69 | B1, B2, B3, B4, D1, D2, E1, E2 | 70 | B1, B2, B3, B4, D1, D2, E3, E4 |
| 71 | B1, B2, B3, B4, D3, D4, E1, E2 | 72 | B1, B2, B3, B4, D3, D4, E3, E4 |
| 73 | B1, B2, B3, B4, D1, D2, F1, F2 | 74 | B1, B2, B3, B4, D1, D2, F3, F4 |
| 75 | B1, B2, B3, B4, D3, D4, F1, F2 | 76 | B1, B2, B3, B4, D3, D4, F3, F4 |
| 77 | B1, B2, B3, B4, E1, E2, F1, F2 | 78 | B1, B2, B3, B4, E1, E2, F3, F4 |
| 79 | B1, B2, B3, B4, E3, E4, F1, F2 | 80 | B1, B2, B3, B4, E3, E4, F3, F4 |
| 81 | A1, A2, B1, B2, C1, C2, C3, C4 | 82 | A1, A2, B3, B4, C1, C2, C3, C4 |
| 83 | A3, A4, B1, B2, C1, C2, C3, C4 | 84 | A3, A4, B3, B4, C1, C2, C3, C4 |
| 85 | A1, A2, C1, C2, C3, C4, D1, D2 | 86 | A1, A2, C1, C2, C3, C4, D3, D4 |
| 87 | A3, A4, C1, C2, C3, C4, D1, D2 | 88 | A3, A4, C1, C2, C3, C4, D3, D4 |
| 89 | A1, A2, C1, C2, C3, C4, E1, E2 | 90 | A1, A2, C1, C2, C3, C4, E3, E4 |
| 91 | A3, A4, C1, C2, C3, C4, E1, E2 | 92 | A3, A4, C1, C2, C3, C4, E3, E4 |
| 93 | A1, A2, C1, C2, C3, C4, F1, F2 | 94 | A1, A2, C1, C2, C3, C4, F3, F4 |
| 95 | A3, A4, C1, C2, C3, C4, F1, F2 | 96 | A3, A4, C1, C2, C3, C4, F3, F4 |
| 97 | B1, B2, C1, C2, C3, C4, D1, D2 | 98 | B1, B2, C1, C2, C3, C4, D3, D4 |
| 99 | B3, B4, C1, C2, C3, C4, D1, D2 | 100 | B3, B4, C1, C2, C3, C4, D3, D4 |
| 101 | B1, B2, C1, C2, C3, C4, E1, E2 | 102 | B1, B2, C1, C2, C3, C4, E3, E4 |
| 103 | B3, B4, C1, C2, C3, C4, E1, 2E | 104 | B3, B4, C1, C2, C3, C4, E3, E4 |
| 105 | B1, B2, C1, C2, C3, C4, F1, F2 | 106 | B1, B2, C1, C2, C3, C4, F3, F4 |
| 107 | B3, B4, C1, C2, C3, C4, F1, F2 | 108 | B3, B4, C1, C2, C3, C4, F3, F4 |
| 109 | C1, C2, C3, C4, D1, D2, E1, E2 | 110 | C1, C2, C3, C4, D1, D2, E3, E4 |
| 111 | C1, C2, C3, C4, D3, D4, E1, E2 | 112 | C1, C2, C3, C4, D3, D4, E3, E4 |
| 113 | C1, C2, C3, C4, D1, D2, F1, F2 | 114 | C1, C2, C3, C4, D1, D2, F3, F4 |
| 115 | C1, C2, C3, C4, D3, D4, F1, F2 | 116 | C1, C2, C3, C4, D3, D4, F3, F4 |
| 117 | C1, C2, C3, C4, E1, E2, F1, F2 | 118 | C1, C2, C3, C4, E1, E2, F3, F4 |
| 119 | C1, C2, C3, C4, E3, E4, F1, F2 | 120 | C1, C2, C3, C4, E3, E4, F3, F4 |
| 121 | A1, A2, B1, B2, D1, D2, D3, D4 | 122 | A1, A2, B3, B4, D1, D2, D3, D4 |
| 123 | A3, A4, B1, B2, D1, D2, D3, D4 | 124 | A3, A4, B3, B4, D1, D2, D3, D4 |
| 125 | A1, A2, C1, C2, D1, D2, D3, D4 | 126 | A1, A2, C3, C4, D1, D2, D3, D4 |
| 127 | A3, A4, C1, C2, D1, D2, D3, D4 | 128 | A3, A4, C3, C4, D1, D2, D3, D4 |
| 129 | A1, A2, D1, D2, D3, D4, E1, E2 | 130 | A1, A2, D1, D2, D3, D4, E3, E4 |
| 131 | A3, A4, D1, D2, D3, D4, E1, E2 | 132 | A3, A4, D1, D2, D3, D4, E3, E4 |
| 133 | A1, A2, D1, D2, D3, D4, F1, F2 | 134 | A1, A2, D1, D2, D3, D4, F3, F4 |
| 135 | A3, A4, D1, D2, D3, D4, F1, F2 | 136 | A3, A4, D1, D2, D3, D4, F3, F4 |
| 137 | B1, B2, C1, C2, D1, D2, D3, D4 | 138 | B1, B2, C3, C4, D1, D2, D3, D4 |
| 139 | B3, B4, C1, C2, D1, D2, D3, D4 | 140 | B3, B4, C3, C4, D1, D2, D3, D4 |
| 141 | B1, B2, D1, D2, D3, D4, E1, E2 | 142 | B1, B2, D1, D2, D3, D4, E3, E4 |
| 143 | B3, B4, D1, D2, D3, D4, E1, E2 | 144 | B3, B4, D1, D2, D3, D4, E3, E4 |
| 145 | B1, B2, D1, D2, D3, D4, F1, F2 | 146 | B1, B2, D1, D2, D3, D4, F3, F4 |
| 147 | B3, B4, D1, D2, D3, D4, F1, F2 | 148 | B3, B4, D1, D2, D3, D4, F3, F4 |
| 149 | C1, C2, D1, D2, D3, D4, E1, E2 | 150 | C1, C2, D1, D2, D3, D4, E3, E4 |
| 151 | C3, C4, D1, D2, D3, D4, E1, E2 | 152 | C3, C4, D1, D2, D3, D4, E3, E4 |
| 153 | C1, C2, D1, D2, D3, D4, F1, F2 | 154 | C1, C2, D1, D2, D3, D4, F3, F4 |
| 155 | C3, C4, D1, D2, D3, D4, F1, F2 | 156 | C3, C4, D1, D2, D3, D4, F3, F4 |
| 157 | D1, D2, D3, D4, E1, E2, F1, F2 | 158 | D1, D2, D3, D4, E1, E2, F3, F4 |
| 159 | D1, D2, D3, D4, E3, E4, F1, F2 | 160 | D1, D2, D3, D4, E3, E4, F3, F4 |
| 161 | A1, A2, B1, B2, E1, E2, E3, E4 | 162 | A1, A2, B3, B4, E1, E2, E3, E4 |
| 163 | A3, A4, B1, B2, E1, E2, E3, E4 | 164 | A3, A4, B3, B4, E1, E2, E3, E4 |

TABLE 35-continued

| case | codebook set (see Table 33) | case | codebook set (see Table 33) |
| --- | --- | --- | --- |
| 165 | A1, A2, C1, C2, E1, E2, E3, E4 | 166 | A1, A2, C3, C4, E1, E2, E3, E4 |
| 167 | A3, A4, C1, C2, E1, E2, E3, E4 | 168 | A3, A4, C3, C4, E1, E2, E3, E4 |
| 169 | A1, A2, D1, D2, E1, E2, E3, E4 | 170 | A1, A2, D3, D4, E1, E2, E3, E4 |
| 171 | A3, A4, D1, D2, E1, E2, E3, E4 | 172 | A3, A4, D3, D4, E1, E2, E3, E4 |
| 173 | A1, A2, E1, E2, E3, E4, F1, F2 | 174 | A1, A2, E1, E2, E3, E4, F3, F4 |
| 175 | A3, A4, E1, E2, E3, E4, F1, F2 | 176 | A3, A4, E1, E2, E3, E4, F3, F4 |
| 177 | B1, B2, C1, C2, E1, E2, E3, E4 | 178 | B1, B2, C3, C4, E1, E2, E3, E4 |
| 179 | B3, B4, C1, C2, E1, E2, E3, E4 | 180 | B3, B4, C3, C4, E1, E2, E3, E4 |
| 181 | B1, B2, D1, D2, E1, E2, E3, E4 | 182 | B1, B2, D3, D4, E1, E2, E3, E4 |
| 183 | B3, B4, D1, D2, E1, E2, E3, E4 | 184 | B3, B4, D3, D4, E1, E2, E3, E4 |
| 185 | B1, B2, E1, E2, E3, E4, F1, F2 | 186 | B1, B2, E1, E2, E3, E4, F3, F4 |
| 187 | B3, B4, E1, E2, E3, E4, F1, F2 | 188 | B3, B4, E1, E2, E3, E4, F3, F4 |
| 189 | C1, C2, D1, D2, E1, E2, E3, E4 | 190 | C1, C2, D3, D4, E1, E2, E3, E4 |
| 191 | C3, C4, D1, D2, E1, E2, E3, E4 | 192 | C3, C4, D3, D4, E1, E2, E3, E4 |
| 193 | C1, C2, E1, E2, E3, E4, F1, F2 | 194 | C1, C2, E1, E2, E3, E4, F3, F4 |
| 195 | C3, C4, E1, E2, E3, E4, F1, F2 | 196 | C3, C4, E1, E2, E3, E4, F3, F4 |
| 197 | D1, D2, E1, E2, E3, E4, F1, F2 | 198 | D1, D2, E1, E2, E3, E4, F3, F4 |
| 199 | D3, D4, E1, E2, E3, E4, F1, F2 | 200 | D3, D4, E1, E2, E3, E4, F3, F4 |
| 201 | A1, A2, B1, B2, F1, F2, F3, F4 | 202 | A1, A2, B3, B4, F1, F2, F3, F4 |
| 203 | A3, A4, B1, B2, F1, F2, F3, F4 | 204 | A3, A4, B3, B4, F1, F2, F3, F4 |
| 205 | A1, A2, C1, C2, F1, F2, F3, F4 | 206 | A1, A2, C3, C4, F1, F2, F3, F4 |
| 207 | A3, A4, C1, C2, F1, F2, F3, F4 | 208 | A3, A4, C3, C4, F1, F2, F3, F4 |
| 209 | A1, A2, D1, D2, F1, F2, F3, F4 | 210 | A1, A2, D3, D4, F1, F2, F3, F4 |
| 211 | A3, A4, D1, D2, F1, F2, F3, F4 | 212 | A3, A4, D3, D4, F1, F2, F3, F4 |
| 213 | A1, A2, E1, E2, F1, F2, F3, F4 | 214 | A1, A2, E3, E4, F1, F2, F3, F4 |
| 215 | A3, A4, E1, E2, F1, F2, F3, F4 | 216 | A3, A4, E3, E4, F1, F2, F3, F4 |
| 217 | B1, B2, C1, C2, F1, F2, F3, F4 | 218 | B1, B2, C3, C4, F1, F2, F3, F4 |
| 219 | B3, B4, C1, C2, F1, F2, F3, F4 | 220 | B3, B4, C3, C4, F1, F2, F3, F4 |
| 221 | B1, B2, D1, D2, F1, F2, F3, F4 | 222 | B1, B2, D3, D4, F1, F2, F3, F4 |
| 223 | B3, B4, D1, D2, F1, F2, F3, F4 | 224 | B3, B4, D3, D4, F1, F2, F3, F4 |
| 225 | B1, B2, E1, E2, F1, F2, F3, F4 | 226 | B1, B2, E3, E4, F1, F2, F3, F4 |
| 227 | B3, B4, E1, E2, F1, F2, F3, F4 | 228 | B3, B4, E3, E4, F1, F2, F3, F4 |
| 229 | C1, C2, D1, D2, F1, F2, F3, F4 | 230 | C1, C2, D3, D4, F1, F2, F3, F4 |
| 231 | C3, C4, D1, D2, F1, F2, F3, F4 | 232 | C3, C4, D3, D4, F1, F2, F3, F4 |
| 233 | C1, C2, E1, E2, F1, F2, F3, F4 | 234 | C1, C2, E3, E4, F1, F2, F3, F4 |
| 235 | C3, C4, E1, E2, F1, F2, F3, F4 | 236 | C3, C4, E3, E4, F1, F2, F3, F4 |
| 237 | D1, D2, E1, E2, F1, F2, F3, F4 | 238 | D1, D2, E3, E4, F1, F2, F3, F4 |
| 239 | D3, D4, E1, E2, F1, F2, F3, F4 | 240 | D3, D4, E3, E4, F1, F2, F3, F4 |

C. In another method of configuring a codebook set having 8 elements, four groups are selected from the groups A, B, C, D, E, and F of Table 33. Each of the selected group may be configured with BPSK.

D. In another method of configuring a codebook set having 8 elements, among the groups A, B, C, D, E, and F of Table 33, four groups may be configured with BPSK, and the remaining two groups may be configured with '1'.

(2) Now, a method of configuring a codebook set having 12 elements will be described.

A. Three groups are selected from the groups A, B, C, D, E, and F of Table 33. Each of the selected group may be configured with QPSK.

Table 36 below shows examples of a codebook set having 12 elements by selecting three groups.

TABLE 36

| case | codebook set (see Table 33) |
| --- | --- |
| 1 | A1, A2, A3, A4, B1, B2, B3, B4, C1, C2, C3, C4 |
| 2 | A1, A2, A3, A4, B1, B2, B3, B4, D1, D2, D3, D4 |
| 3 | A1, A2, A3, A4, B1, B2, B3, B4, E1, E2, E3, E4 |
| 4 | A1, A2, A3, A4, B1, B2, B3, B4, F1, F2, F3, F4 |
| 5 | A1, A2, A3, A4, C1, C2, C3, C4, D1, D2, D3, D4 |
| 6 | A1, A2, A3, A4, C1, C2, C3, C4, E1, E2, E3, E4 |
| 7 | A1, A2, A3, A4, C1, C2, C3, C4, F1, F2, F3, F4 |
| 8 | A1, A2, A3, A4, D1, D2, D3, D4, E1, E2, E3, E4 |
| 9 | A1, A2, A3, A4, D1, D2, D3, D4, F1, F2, F3, F4 |

TABLE 36-continued

| case | codebook set (see Table 33) |
| --- | --- |
| 10 | A1, A2, A3, A4, E1, E2, E3, E4, F1, F2, F3, F4 |
| 11 | B1, B2, B3, B4, C1, C2, C3, C4, D1, D2, D3, D4 |
| 12 | B1, B2, B3, B4, C1, C2, C3, C4, E1, E2, E3, E4 |
| 13 | B1, B2, B3, B4, C1, C2, C3, C4, F1, F2, F3, F4 |
| 14 | B1, B2, B3, B4, D1, D2, D3, D4, E1, E2, E3, E4 |
| 15 | B1, B2, B3, B4, D1, D2, D3, D4, F1, F2, F3, F4 |
| 16 | B1, B2, B3, B4, E1, E2, E3, E4, F1, F2, F3, F4 |
| 17 | C1, C2, C3, C4, D1, D2, D3, D4, E1, E2, E3, E4 |
| 18 | C1, C2, C3, C4, D1, D2, D3, D4, F1, F2, F3, F4 |
| 19 | C1, C2, C3, C4, E1, E2, E3, E4, F1, F2, F3, F4 |
| 20 | D1, D2, D3, D4, E1, E2, E3, E4, F1, F2, F3, F4 |

B. In another method of configuring a codebook set having 12 elements, four groups are selected from the groups A, B, C, D, E, and F of Table 33. Among the selected four groups, two groups may be configured with QPSK, and the remaining two groups may be configured with BPSK.

Table 37 shows examples of a codebook set having 12 elements by selecting four groups.

TABLE 37

| case | codebook set | case | codebook set |
|---|---|---|---|
| 1 | A1, A2, A3, A4, B1, B2, B3, B4, C1, C2, D1, D2 | 2 | A1, A2, A3, A4, B1, B2, B3, B4, C1, C2, D3, D4 |
| 3 | A1, A2, A3, A4, B1, B2, B3, B4, C3, C4, D1, D2 | 4 | A1, A2, A3, A4, B1, B2, B3, B4, C3, C4, D3, D4 |
| 5 | A1, A2, A3, A4, B1, B2, C1, C2, C3, C4, D1, D2 | 6 | A1, A2, A3, A4, B1, B2, C1, C2, C3, C4, D3, D4 |
| 7 | A1, A2, A3, A4, B3, B4, C1, C2, C3, C4, D1, D2 | 8 | A1, A2, A3, A4, B3, B4, C1, C2, C3, C4, D3, D4 |
| 9 | A1, A2, A3, A4, B1, B2, C1, C2, D1, D2, D3, D4 | 10 | A1, A2, A3, A4, B1, B2, C3, C4, D1, D2, D3, D4 |
| 11 | A1, A2, A3, A4, B3, B4, C1, C2, D1, D2, D3, D4 | 12 | A1, A2, A3, A4, B3, B4, C3, C4, D1, D2, D3, D4 |
| 13 | A1, A2, B1, B2, B3, B4, C1, C2, C3, C4, D1, D2 | 14 | A1, A2, B1, B2, B3, B4, C1, C2, C3, C4, D3, D4 |
| 15 | A3, A4, B1, B2, B3, B4, C1, C2, C3, C4, D1, D2 | 16 | A3, A4, B1, B2, B3, B4, C1, C2, C3, C4, D3, D4 |
| 17 | A1, A2, B1, B2, B3, B4, C1, C2, D1, D2, D3, D4 | 18 | A1, A2, B1, B2, B3, B4, C3, C4, D1, D2, D3, D4 |
| 19 | A3, A4, B1, B2, B3, B4, C1, C2, D1, D2, D3, D4 | 20 | A3, A4, B1, B2, B3, B4, C3, C4, D1, D2, D3, D4 |
| 21 | A1, A2, B1, B2, C1, C2, C3, C4, D1, D2, D3, D4 | 22 | A1, A2, B3, B4, C1, C2, C3, C4, D1, D2, D3, D4 |
| 23 | A3, A4, B1, B2, C1, C2, C3, C4, D1, D2, D3, D4 | 24 | A3, A4, B3, B4, C1, C2, C3, C4, D1, D2, D3, D4 |
| 25 | A1, A2, A3, A4, B1, B2, B3, B4, C1, C2, E1, E2 | 26 | A1, A2, A3, A4, B1, B2, B3, B4, C1, C2, E3, E4 |
| 27 | A1, A2, A3, A4, B1, B2, B3, B4, C3, C4, E1, E2 | 28 | A1, A2, A3, A4, B1, B2, B3, B4, C3, C4, E3, E4 |
| 29 | A1, A2, A3, A4, B1, B2, C1, C2, C3, C4, E1, E2 | 30 | A1, A2, A3, A4, B1, B2, C1, C2, C3, C4, E3, E4 |
| 31 | A1, A2, A3, A4, B3, B4, C1, C2, C3, C4, E1, E2 | 32 | A1, A2, A3, A4, B3, B4, C1, C2, C3, C4, E3, E4 |
| 33 | A1, A2, A3, A4, B1, B2, C1, C2, E1, E2, E3, E4 | 34 | A1, A2, A3, A4, B1, B2, C3, C4, E1, E2, E3, E4 |
| 35 | A1, A2, A3, A4, B3, B4, C1, C2, E1, E2, E3, E4 | 36 | A1, A2, A3, A4, B3, B4, C3, C4, E1, E2, E3, E4 |
| 37 | A1, A2, B1, B2, B3, B4, C1, C2, C3, C4, E1, E2 | 38 | A1, A2, B1, B2, B3, B4, C1, C2, C3, C4, E3, E4 |
| 39 | A3, A4, B1, B2, B3, B4, C1, C2, C3, C4, E1, E2 | 40 | A3, A4, B1, B2, B3, B4, C1, C2, C3, C4, E3, E4 |
| 41 | A1, A2, B1, B2, B3, B4, C1, C2, E1, E2, E3, E4 | 42 | A1, A2, B1, B2, B3, B4, C3, C4, E1, E2, E3, E4 |
| 43 | A3, A4, B1, B2, B3, B4, C1, C2, E1, E2, E3, E4 | 44 | A3, A4, B1, B2, B3, B4, C3, C4, E1, E2, E3, E4 |
| 45 | A1, A2, B1, B2, C1, C2, C3, C4, E1, E2, E3, E4 | 46 | A1, A2, B3, B4, C1, C2, C3, C4, E1, E2, E3, E4 |
| 47 | A3, A4, B1, B2, C1, C2, C3, C4, E1, E2, E3, E4 | 48 | A3, A4, B3, B4, C1, C2, C3, C4, E1, E2, E3, E4 |
| 49 | A1, A2, A3, A4, B1, B2, B3, B4, C1, C2, F1, F2 | 50 | A1, A2, A3, A4, B1, B2, B3, B4, C1, C2, F3, F4 |
| 51 | A1, A2, A3, A4, B1, B2, B3, B4, C3, C4, F1, F2 | 52 | A1, A2, A3, A4, B1, B2, B3, B4, C3, C4, F3, F4 |
| 53 | A1, A2, A3, A4, B1, B2, C1, C2, C3, C4, F1, F2 | 54 | A1, A2, A3, A4, B1, B2, C1, C2, C3, C4, F3, F4 |
| 55 | A1, A2, A3, A4, B3, B4, C1, C2, C3, C4, F1, F2 | 56 | A1, A2, A3, A4, B3, B4, C1, C2, C3, C4, F3, F4 |
| 57 | A1, A2, A3, A4, B1, B2, C1, C2, F1, F2, F3, F4 | 58 | A1, A2, A3, A4, B1, B2, C3, C4, F1, F2, F3, F4 |
| 59 | A1, A2, A3, A4, B3, B4, C1, C2, F1, F2, F3, F4 | 60 | A1, A2, A3, A4, B3, B4, C3, C4, F1, F2, F3, F4 |
| 61 | A1, A2, B1, B2, B3, B4, C1, C2, C3, C4, F1, F2 | 62 | A1, A2, B1, B2, B3, B4, C1, C2, C3, C4, F3, F4 |
| 63 | A3, A4, B1, B2, B3, B4, C1, C2, C3, C4, F1, F2 | 64 | A3, A4, B1, B2, B3, B4, C1, C2, C3, C4, F3, F4 |
| 65 | A1, A2, B1, B2, B3, B4, C1, C2, F1, F2, F3, F4 | 66 | A1, A2, B1, B2, B3, B4, C3, C4, F1, F2, F3, F4 |
| 67 | A3, A4, B1, B2, B3, B4, C1, C2, F1, F2, F3, F4 | 68 | A3, A4, B1, B2, B3, B4, C3, C4, F1, F2, F3, F4 |
| 69 | A1, A2, B1, B2, C1, C2, C3, C4, F1, F2, F3, F4 | 70 | A1, A2, B3, B4, C1, C2, C3, C4, F1, F2, F3, F4 |
| 71 | A3, A4, B1, B2, C1, C2, C3, C4, F1, F2, F3, F4 | 72 | A3, A4, B3, B4, C1, C2, C3, C4, F1, F2, F3, F4 |
| 73 | A1, A2, A3, A4, C1, C2, C3, C4, D1, D2, E1, E2 | 74 | A1, A2, A3, A4, C1, C2, C3, C4, D1, D2, E3, E4 |
| 75 | A1, A2, A3, A4, C1, C2, C3, C4, D3, D4, E1, E2 | 76 | A1, A2, A3, A4, C1, C2, C3, C4, D3, D4, E3, E4 |
| 77 | A1, A2, A3, A4, C1, C2, D1, D2, D3, D4, E1, E2 | 78 | A1, A2, A3, A4, C1, C2, D1, D2, D3, D4, E3, E4 |
| 79 | A1, A2, A3, A4, C3, C4, D1, D2, D3, D4, E1, E2 | 80 | A1, A2, A3, A4, C3, C4, D1, D2, D3, D4, E3, E4 |
| 81 | A1, A2, A3, A4, C1, C2, D1, D2, E1, E2, E3, E4 | 82 | A1, A2, A3, A4, C1, C2, D3, D4, E1, E2, E3, E4 |
| 83 | A1, A2, A3, A4, C3, C4, D1, D2, E1, E2, E3, E4 | 84 | A1, A2, A3, A4, C3, C4, D3, D4, E1, E2, E3, E4 |
| 85 | A1, A2, C1, C2, C3, C4, D1, D2, D3, D4, E1, E2 | 86 | A1, A2, C1, C2, C3, C4, D1, D2, D3, D4, E3, E4 |
| 87 | A3, A4, C1, C2, C3, C4, D1, D2, D3, D4, E1, E2 | 88 | A3, A4, C1, C2, C3, C4, D1, D2, D3, D4, E3, E4 |
| 89 | A1, A2, C1, C2, C3, C4, D1, D2, E1, E2, E3, E4 | 90 | A1, A2, C1, C2, C3, C4, D3, D4, E1, E2, E3, E4 |
| 91 | A3, A4, C1, C2, C3, C4, D1, D2, E1, E2, E3, E4 | 92 | A3, A4, C1, C2, C3, C4, D3, D4, E1, E2, E3, E4 |
| 93 | A1, A2, C1, C2, D1, D2, D3, D4, E1, E2, E3, E4 | 94 | A1, A2, C3, C4, D1, D2, D3, D4, E1, E2, E3, E4 |
| 95 | A3, A4, C1, C2, D1, D2, D3, D4, E1, E2, E3, E4 | 96 | A3, A4, C3, C4, D1, D2, D3, D4, E1, E2, E3, E4 |
| 97 | A1, A2, A3, A4, C1, C2, C3, C4, D1, D2, F1, F2 | 98 | A1, A2, A3, A4, C1, C2, C3, C4, D1, D2, F3, F4 |
| 99 | A1, A2, A3, A4, C1, C2, C3, C4, D3, D4, F1, F2 | 100 | A1, A2, A3, A4, C1, C2, C3, C4, D3, D4, F3, F4 |
| 101 | A1, A2, A3, A4, C1, C2, D1, D2, D3, D4, F1, F2 | 102 | A1, A2, A3, A4, C1, C2, D1, D2, D3, D4, F3, F4 |
| 103 | A1, A2, A3, A4, C3, C4, D1, D2, D3, D4, F1, F2 | 104 | A1, A2, A3, A4, C3, C4, D1, D2, D3, D4, F3, F4 |
| 105 | A1, A2, A3, A4, C1, C2, D1, D2, F1, F2, F3, F4 | 106 | A1, A2, A3, A4, C1, C2, D3, D4, F1, F2, F3, F4 |
| 107 | A1, A2, A3, A4, C1, C2, D3, D4, F1, F2, F3, F4 | 108 | A1, A2, A3, A4, C3, C4, D3, D4, F1, F2, F3, F4 |
| 109 | A1, A2, C1, C2, C3, C4, D1, D2, D3, D4, F1, F2 | 110 | A1, A2, C1, C2, C3, C4, D1, D2, D3, D4, F3, F4 |
| 111 | A3, A4, C1, C2, C3, C4, D1, D2, D3, D4, F1, F2 | 112 | A3, A4, C1, C2, C3, C4, D1, D2, D3, D4, F3, F4 |
| 113 | A1, A2, C1, C2, C3, C4, D1, D2, F1, F2, F3, F4 | 114 | A1, A2, C1, C2, C3, C4, D3, D4, F1, F2, F3, F4 |
| 115 | A3, A4, C1, C2, C3, C4, D1, D2, F1, F2, F3, F4 | 116 | A3, A4, C1, C2, C3, C4, D3, D4, F1, F2, F3, F4 |
| 117 | A1, A2, C1, C2, D1, D2, D3, D4, F1, F2, F3, F4 | 118 | A1, A2, C3, C4, D1, D2, D3, D4, F1, F2, F3, F4 |
| 119 | A3, A4, C1, C2, D1, D2, D3, D4, F1, F2, F3, F4 | 120 | A3, A4, C3, C4, D1, D2, D3, D4, F1, F2, F3, F4 |
| 121 | A1, A2, A3, A4, C1, C2, C3, C4, E1, E2, F1, F2 | 122 | A1, A2, A3, A4, C1, C2, C3, C4, E1, E2, F3, F4 |
| 123 | A1, A2, A3, A4, C1, C2, C3, C4, E3, E4, F1, F2 | 124 | A1, A2, A3, A4, C1, C2, C3, C4, E3, E4, F3, F4 |
| 125 | A1, A2, A3, A4, C1, C2, E1, E2, E3, E4, F1, F2 | 126 | A1, A2, A3, A4, C1, C2, E1, E2, E3, E4, F3, F4 |
| 127 | A1, A2, A3, A4, C3, C4, E1, E2, E3, E4, F1, F2 | 128 | A1, A2, A3, A4, C3, C4, E1, E2, E3, E4, F3, F4 |
| 129 | A1, A2, A3, A4, C1, C2, E1, E2, F1, F2, F3, F4 | 130 | A1, A2, A3, A4, C1, C2, E3, E4, F1, F2, F3, F4 |
| 131 | A1, A2, A3, A4, C3, C4, E1, E2, F1, F2, F3, F4 | 132 | A1, A2, A3, A4, C3, C4, E3, E4, F1, F2, F3, F4 |
| 133 | A1, A2, C1, C2, C3, C4, E1, E2, E3, E4, F1, F2 | 134 | A1, A2, C1, C2, C3, C4, E1, E2, E3, E4, F3, F4 |
| 135 | A3, A4, C1, C2, C3, C4, E1, E2, E3, E4, F1, F2 | 136 | A3, A4, C1, C2, C3, C4, E1, E2, E3, E4, F3, F4 |
| 137 | A1, A2, C1, C2, C3, C4, E1, E2, F1, F2, F3, F4 | 138 | A1, A2, C1, C2, C3, C4, E1, E2, F1, F2, F3, F4 |
| 139 | A3, A4, C1, C2, C3, C4, E1, E2, F1, F2, F3, F4 | 140 | A3, A4, C1, C2, C3, C4, E3, E4, F1, F2, F3, F4 |
| 141 | A1, A2, C1, C2, E1, E2, E3, E4, F1, F2, F3, F4 | 142 | A1, A2, C3, C4, E1, E2, E3, E4, F1, F2, F3, F4 |
| 143 | A3, A4, C1, C2, E1, E2, E3, E4, F1, F2, F3, F4 | 144 | A3, A4, C3, C4, E1, E2, E3, E4, F1, F2, F3, F4 |
| 145 | A1, A2, A3, A4, D1, D2, D3, D4, E1, E2, F1, F2 | 146 | A1, A2, A3, A4, D1, D2, D3, D4, E1, E2, F3, F4 |
| 147 | A1, A2, A3, A4, D1, D2, D3, D4, E3, E4, F1, F2 | 148 | A1, A2, A3, A4, D1, D2, D3, D4, E3, E4, F3, F4 |
| 149 | A1, A2, A3, A4, D1, D2, E1, E2, E3, E4, F1, F2 | 150 | A1, A2, A3, A4, D1, D2, E1, E2, E3, E4, F3, F4 |
| 151 | A1, A2, A3, A4, D3, D4, E1, E2, E3, E4, F1, F2 | 152 | A1, A2, A3, A4, D3, D4, E1, E2, E3, E4, F3, F4 |
| 153 | A1, A2, A3, A4, D1, D2, E1, E2, F1, F2, F3, F4 | 154 | A1, A2, A3, A4, D1, D2, E3, E4, F1, F2, F3, F4 |
| 155 | A1, A2, A3, A4, D3, D4, E1, E2, F1, F2, F3, F4 | 156 | A1, A2, A3, A4, D3, D4, E3, E4, F1, F2, F3, F4 |

TABLE 37-continued

| case | codebook set | case | codebook set |
|---|---|---|---|
| 157 | A1, A2, D1, D2, D3, D4, E1, E2, E3, E4, F1, F2 | 158 | A1, A2, D1, D2, D3, D4, E1, E2, E3, E4, F3, F4 |
| 159 | A3, A4, D1, D2, D3, D4, E1, E2, E3, E4, F1, F2 | 160 | A3, A4, D1, D2, D3, D4, E1, E2, E3, E4, F3, F4 |
| 161 | A1, A2, D1, D2, D3, D4, E1, E2, F1, F2, F3, F4 | 162 | A1, A2, D1, D2, D3, D4, E3, E4, F1, F2, F3, F4 |
| 163 | A3, A4, D1, D2, D3, D4, E1, E2, F1, F2, F3, F4, | 164 | A3, A4, D1, D2, D3, D4, E3, E4, F1, F2, F3, F4 |
| 165 | A1, A2, D1, D2, E1, E2, E3, E4, F1, F2, F3, F4 | 166 | A1, A2, D3, D4, E1, E2, E3, E4, F1, F2, F3, F4 |
| 167 | A3, A4, D1, D2, E1, E2, E3, E4, F1, F2, F3, F4 | 168 | A3, A4, D3, D4, E1, E2, E3, E4, F1, F2, F3, F4 |
| 169 | B1, B2, B3, B4, C1, C2, C3, C4, D1, D2, E1, E2 | 170 | B1, B2, B3, B4, C1, C2, C3, C4, D1, D2, E3, E4 |
| 171 | B1, B2, B3, B4, C1, C2, C3, C4, D3, D4, E1, E2 | 172 | B1, B2, B3, B4, C1, C2, C3, C4, D3, D4, E3, E4 |
| 173 | B1, B2, B3, B4, C1, C2, D1, D2, D3, D4, E1, E2 | 174 | B1, B2, B3, B4, C1, C2, D1, D2, D3, D4, E3, E4 |
| 175 | B1, B2, B3, B4, C3, C4, D1, D2, D3, D4, E1, E2 | 176 | B1, B2, B3, B4, C3, C4, D1, D2, D3, D4, E3, E4 |
| 177 | B1, B2, B3, B4, C1, C2, D1, D2, E1, E2, E3, E4 | 178 | B1, B2, B3, B4, C1, C2, D3, D4, E1, E2, E3, E4 |
| 179 | B1, B2, B3, B4, C3, C4, D1, D2, E1, E2, E3, E4 | 180 | B1, B2, B3, B4, C3, C4, D3, D4, E1, E2, E3, E4 |
| 181 | B1, B2, C1, C2, C3, C4, D1, D2, D3, D4, E1, E2 | 182 | B1, B2, C1, C2, C3, C4, D1, D2, D3, D4, E3, E4 |
| 183 | B3, B4, C1, C2, C3, C4, D1, D2, D3, D4, E1, E2 | 184 | B3, B4, C1, C2, C3, C4, D1, D2, D3, D4, E3, E4 |
| 185 | B1, B2, C1, C2, C3, C4, D1, D2, E1, E2, E3, E4 | 186 | B1, B2, C1, C2, C3, C4, D3, D4, E1, E2, E3, E4 |
| 187 | B3, B4, C1, C2, C3, C4, D1, D2, E1, E2, E3, E4 | 188 | B3, B4, C1, C2, C3, C4, D3, D4, E1, E2, E3, E4 |
| 189 | B1, B2, C1, C2, D1, D2, D3, D4, E1, E2, E3, E4 | 190 | B1, B2, C3, C4, D1, D2, D3, D4, E1, E2, E3, E4 |
| 191 | B3, B4, C1, C2, D1, D2, D3, D4, E1, E2, E3, E4 | 192 | B3, B4, C3, C4, D1, D2, D3, D4, E1, E2, E3, E4 |
| 193 | B1, B2, B3, B4, C1, C2, C3, C4, D1, D2, F1, F2 | 194 | B1, B2, B3, B4, C1, C2, C3, C4, D1, D2, F3, F4 |
| 195 | B1, B2, B3, B4, C1, C2, C3, C4, D3, D4, F1, F2 | 196 | B1, B2, B3, B4, C1, C2, C3, C4, D3, D4, F3, F4 |
| 197 | B1, B2, B3, B4, C1, C2, D1, D2, D3, D4, F1, F2 | 198 | B1, B2, B3, B4, C1, C2, D1, D2, D3, D4, F3, F4 |
| 199 | B1, B2, B3, B4, C3, C4, D1, D2, D3, D4, F1, F2 | 200 | B1, B2, B3, B4, C3, C4, D1, D2, D3, D4, F3, F4 |
| 201 | B1, B2, B3, B4, C1, C2, D1, D2, F1, F2, F3, F4 | 202 | B1, B2, B3, B4, C1, C2, D3, D4, F1, F2, F3, F4 |
| 203 | B1, B2, B3, B4, C3, C4, D1, D2, F1, F2, F3, F4 | 204 | B1, B2, B3, B4, C3, C4, D3, D4, F1, F2, F3, F4 |
| 205 | B1, B2, C1, C2, C3, C4, D1, D2, D3, D4, F1, F2 | 206 | B1, B2, C1, C2, C3, C4, D1, D2, D3, D4, F3, F4 |
| 207 | B3, B4, C1, C2, C3, C4, D1, D2, D3, D4, F1, F2 | 208 | B3, B4, C1, C2, C3, C4, D1, D2, D3, D4, F3, F4 |
| 209 | B1, B2, C1, C2, C3, C4, D1, D2, F1, F2, F3, F4, | 210 | B1, B2, C1, C2, C3, C4, D3, D4, F1, F2, F3, F4, |
| 211 | B3, B4, C1, C2, C3, C4, D1, D2, F1, F2, F3, F4, | 212 | B3, B4, C1, C2, C3, C4, D3, D4, F1, F2, F3, F4 |
| 213 | B1, B2, C1, C2, D1, D2, D3, D4, F1, F2, F3, F4, | 214 | B1, B2, C3, C4, D1, D2, D3, D4, F1, F2, F3, F4 |
| 215 | B3, B4, C1, C2, D1, D2, D3, D4, F1, F2, F3, F4, | 216 | B3, B4, C3, C4, D1, D2, D3, D4, F1, F2, F3, F4 |
| 217 | B1, B2, B3, B4, C1, C2, C3, C4, E1, E2, F1, F2 | 218 | B1, B2, B3, B4, C1, C2, C3, C4, E1, E2, F3, F4 |
| 219 | B1, B2, B3, B4, C1, C2, C3, C4, E3, E4, F1, F2 | 220 | B1, B2, B3, B4, C1, C2, C3, C4, E3, E4, F3, F4 |
| 221 | B1, B2, B3, B4, C1, C2, E1, E2, E3, E4, F1, F2 | 222 | B1, B2, B3, B4, C1, C2, E1, E2, E3, E4, F3, F4 |
| 223 | B1, B2, B3, B4, C3, C4, E1, E2, E3, E4, F1, F2 | 224 | B1, B2, B3, B4, C3, C4, E1, E2, E3, E4, F3, F4 |
| 225 | B1, B2, B3, B4, C1, C2, E1, E2, F1, F2, F3, F4 | 226 | B1, B2, B3, B4, C1, C2, E3, E4, F1, F2, F3, F4 |
| 227 | B1, B2, B3, B4, C3, C4, E1, E2, F1, F2, F3, F4, | 228 | B1, B2, B3, B4, C3, C4, E3, E4, F1, F2, F3, F4 |
| 229 | B1, B2, C1, C2, C3, C4, E1, E2, E3, E4, F1, F2 | 230 | B1, B2, C1, C2, C3, C4, E1, E2, E3, E4, F3, F4 |
| 231 | B3, B4, C1, C2, C3, C4, E1, E2, E3, E4, F1, F2 | 232 | B3, B4, C1, C2, C3, C4, E1, E2, E3, E4, F3, F4 |
| 233 | B1, B2, C1, C2, C3, C4, E1, E2, F1, F2, F3, F4 | 234 | B1, B2, C1, C2, C3, C4, E3, E4, F1, F2, F3, F4 |
| 235 | B3, B4, C1, C2, C3, C4, E1, E2, F1, F2, F3, F4, | 236 | B3, B4, C1, C2, C3, C4, E3, E4, F1, F2, F3, F4 |
| 237 | B1, B2, C1, C2, E1, E2, E3, E4, F1, F2, F3, F4 | 238 | B1, B2, C3, C4, E1, E2, E3, E4, F1, F2, F3, F4 |
| 239 | B3, B4, C1, C2, E1, E2, E3, E4, F1, F2, F3, F4 | 240 | B3, B4, C3, C4, E1, E2, E3, E4, F1, F2, F3, F4 |
| 241 | B1, B2, B3, B4, D1, D2, D3, D4, E1, E2, F1, F2 | 242 | B1, B2, B3, B4, D1, D2, D3, D4, E1, E2, F3, F4 |
| 243 | B1, B2, B3, B4, D1, D2, D3, D4, E3, E4, F1, F2 | 244 | B1, B2, B3, B4, D1, D2, D3, D4, E3, E4, F3, F4 |
| 245 | B1, B2, B3, B4, D1, D2, E1, E2, E3, E4, F1, F2 | 246 | B1, B2, B3, B4, D1, D2, E1, E2, E3, E4, F3, F4 |
| 247 | B1, B2, B3, B4, D3, D4, E1, E2, E3, E4, F1, F2 | 248 | B1, B2, B3, B4, D3, D4, E1, E2, E3, E4, F3, F4 |
| 249 | B1, B2, B3, B4, D1, D2, E1, E2, F1, F2, F3, F4 | 250 | B1, B2, B3, B4, D1, D2, E3, E4, F1, F2, F3, F4 |
| 251 | B1, B2, B3, B4, D3, D4, E1, E2, F1, F2, F3, F4 | 252 | B1, B2, B3, B4, D3, D4, E3, E4, F1, F2, F3, F4 |
| 253 | B1, B2, D1, D2, D3, D4, E1, E2, E3, E4, F1, F2 | 254 | B1, B2, D1, D2, D3, D4, E1, E2, E3, E4, F3, F4 |
| 255 | B3, B4, D1, D2, D3, D4, E1, E2, E3, E4, F1, F2 | 256 | B3, B4, D1, D2, D3, D4, E1, E2, E3, E4, F3, F4 |
| 257 | B1, B2, D1, D2, D3, D4, E1, E2, F1, F2, F3, F4, | 258 | B1, B2, D1, D2, D3, D4, E3, E4, F1, F2, F3, F4 |
| 259 | B3, B4, D1, D2, D3, D4, E1, E2, F1, F2, F3, F4 | 260 | B3, B4, D1, D2, D3, D4, E1, E2, F1, F4, R1, R2, R3, R4 |
| 261 | B1, B2, D1, D2, E1, E2, E3, E4, F1, F2, F3, F4 | 262 | B1, B2, D3, D4, E1, E2, E3, E4, F1, F2, F3, F4 |
| 263 | B3, B4, D1, D2, E1, E2, E3, E4, F1, F2, F3, F4 | 264 | B3, B4, D3, D4, E1, E2, E3, E4, F1, F2, F3, F4 |
| 265 | C1, C2, C3, C4, D1, D2, D3, D4, E1, E2, F1, F2 | 266 | C1, C2, C3, C4, D1, D2, D3, D4, E1, E2, F3, F4 |
| 267 | C1, C2, C3, C4, D1, D2, D3, D4, E3, E4, F1, F2 | 268 | C1, C2, C3, C4, D1, D2, D3, D4, E3, E4, F3, F4 |
| 269 | C1, C2, C3, C4, D1, D2, E1, E2, E3, E4, F1, F2 | 270 | C1, C2, C3, C4, D1, D2, E1, E2, E3, E4, F3, F4 |
| 271 | C1, C2, C3, C4, D3, D4, E1, E2, E3, E4, F1, F2 | 272 | C1, C2, C3, C4, D3, D4, E1, E2, E3, E4, F3, F4 |
| 273 | C1, C2, C3, C4, D1, D2, E1, E2, F1, F2, F3, F4 | 274 | C1, C2, C3, C4, D1, D2, E3, E4, F1, F2, F3, F4 |
| 275 | C1, C2, C3, C4, D3, D4, E1, E2, F1, F2, F3, F4 | 276 | C1, C2, C3, C4, D3, D4, E3, E4, F1, F2, F3, F4 |
| 277 | C1, C2, D1, D2, D3, D4, E1, E2, E3, E4, F1, F2 | 278 | C1, C2, D1, D2, D3, D4, E1, E2, E3, E4, F3, F4 |
| 279 | C3, C4, D1, D2, D3, D4, E1, E2, E3, E4, F1, F2 | 280 | C3, C4, D1, D2, D3, D4, E1, E2, E3, E4, F3, F4 |
| 281 | C1, C2, D1, D2, D3, D4, E1, E2, F1, F2, F3, F4 | 282 | C1, C2, D1, D2, D3, D4, E3, E4, F1, F2, F3, F4 |
| 283 | C3, C4, D1, D2, D3, D4, E1, E2, F1, F2, F3, F4 | 284 | C3, C4, D1, D2, D3, D4, E3, E4, F1, F2, F3, F4 |
| 285 | C1, C2, D1, D2, E1, E2, E3, E4, F1, F2, F3, F4 | 286 | C1, C2, D3, D4, E1, E2, E3, E4, F1, F2, F3, F4 |
| 287 | C3, C4, D1, D2, E1, E2, E3, E4, F1, F2, F3, F4 | 288 | C3, C4, D3, D4, E1, E2, E3, E4, F1, F2, F3, F4 |
| 289 | A1, A2, A3, A4, B1, B2, B3, B4, D1, D2, E1, E2 | 290 | A1, A2, A3, Q4, B1, B2, B3, B4, D1, D2, E3, E4 |
| 291 | A1, A2, A3, A4, B1, B2, B3, B4, D3, D4, E1, E2 | 292 | A1, A2, A3, A4, B1, B2, B3, B4, D3, D4, E3, E4 |
| 293 | A1, A2, A3, A4, B1, B2, D1, D2, D3, D4, E1, E2 | 294 | A1, A2, A3, A4, B1, B2, D1, D2, D3, D4, E3, E4 |
| 295 | A1, A2, A3, A4, B3, B4, D1, D2, D3, D4, E1, E2 | 296 | A1, A2, A3, A4, B3, B4, D1, D2, D3, D4, E3, E4 |
| 297 | A1, A2, A3, A4, B1, B2, D1, D2, E1, E2, E3, E4 | 298 | A1, A2, A3, A4, B1, B2, D3, D4, E1, E2, E3, E4 |
| 299 | A1, A2, A3, A4, B3, B4, D1, D2, E1, E2, E3, E4 | 300 | A1, A2, A3, A4, B3, B4, D3, D4, E1, E2, E3, E4 |
| 301 | A1, A2, B1, B2, B3, B4, D1, D2, D3, D4, E1, E2 | 302 | A1, A2, B1, B2, B3, B4, D1, D2, D3, D4, E3, E4 |
| 303 | A3, A4, B1, B2, B3, B4, D1, D2, D3, D4, E1, E2 | 304 | A3, A4, B1, B2, B3, B4, D1, D2, D3, D4, E3, E4 |
| 305 | A1, A2, B1, B2, B3, B4, D1, D2, E1, E2, E3, E4 | 306 | A1, A2, B1, B2, B3, B4, D3, D4, E1, E2, E3, E4 |
| 307 | A3, A4, B1, B1, B2, B4, D1, D2, E1, E2, E3, E4 | 308 | A3, A4, B1, B2, B3, B4, D3, D4, E1, E2, E3, E4 |
| 309 | A1, A2, B1, B2, D1, D2, D3, D4, E1, E2, E3, E4 | 310 | A1, A2, B3, B4, D1, D2, D3, D4, E1, E2, E3, E4 |
| 311 | A3, A4, B1, B2, D1, D2, D3, D4, E1, E2, E3, E4 | 312 | A3, A4, B3, B4, D1, D2, D3, D4, E1, E2, E3, E4 |

TABLE 37-continued

| case | codebook set | case | codebook set |
|---|---|---|---|
| 313 | A1, A2, A3, A4, B1, B2, B3, B4, D1, D2, F1, F2 | 314 | A1, A2, A3, A4, B1, B2, B3, B4, D1, D2, F3, F4 |
| 315 | A1, A2, A3, A4, B1, B2, B3, B4, D3, D4, F1, F2 | 316 | A1, A2, A3, A4, B1, B2, B3, B4, D3, D4, F3, F4 |
| 317 | A1, A2, A3, A4, B1, B2, D1, D2, D3, D4, F1, F2 | 318 | A1, A2, A3, A4, B1, B2, D1, D2, D3, D4, F3, F4 |
| 319 | A1, A2, A3, A4, B3, B4, D1, D2, D3, D4, F1, F2 | 320 | A1, A2, A3, A4, B3, B4, D1, D2, D3, D4, F3, F4 |
| 321 | A1, A2, A3, A4, B1, B2, D1, D2, F1, F2, F3, F4 | 322 | A1, A2, A3, A4, B1, B2, D3, D4, F1, F2, F3, F4 |
| 323 | A1, A2, A3, A4, B3, B4, D1, D2, F1, F2, F3, F4 | 324 | A1, A2, A3, A4, B3, B4, D3, D4, F1, F2, F3, F4 |
| 325 | A1, A2, B1, B2, B3, B4, D1, D2, D3, D4, F1, F2 | 326 | A1, A2, B1, B2, B3, B4, D1, D2, D3, D4, F3, F4 |
| 327 | A3, A4, B1, B2, B3, B4, D1, D2, D3, D4, F1, F2 | 328 | A3, A4, B1, B2, B3, B4, D1, D2, D3, D4, F3, F4 |
| 329 | A1, A2, B1, B2, B3, B4, D1, D2, F1, F2, F3, F4 | 330 | A1, A2, B1, B2, B3, B4, D3, D4, F1, F2, F3, F4 |
| 331 | A3, A4, B1, B2, B3, B4, D1, D2, F1, F2, F3, F4 | 332 | A3, A4, B1, B2, B3, B4, D3, D4, F1, F2, F3, F4 |
| 333 | A1, A2, B1, B2, D1, D2, D3, D4, F1, F2, F3, F4 | 334 | A1, A2, B3, B4, D1, D2, D3, D4, F1, F2, F3, F4 |
| 335 | A3, A4, B1, B2, D1, D2, D3, D4, F1, F2, F3, F4 | 336 | A3, A4, B3, B4, D1, D2, D3, D4, F1, F2, F3, F4 |
| 337 | A1, A2, A3, A4, B1, B2, B3, B4, E1, E2, F1, F2 | 338 | A1, A2, A3, A4, B1, B2, B3, B4, E1, E2, F3, F4 |
| 339 | A1, A2, A3, A4, B1, B2, B3, B4, E3, E4, F1, F2 | 340 | A1, A2, A3, A4, B1, B2, B3, B4, E3, E4, F3, F4 |
| 341 | A1, A2, A3, A4, B1, B2, E1, E2, E3, E4, F1, F2 | 342 | A1, A2, A3, A4, B1, B2, E1, E2, E3, E4, F3, F4 |
| 343 | A1, A2, A3, A4, B3, B4, E1, E2, E3, E4, F1, F2 | 344 | A1, A2, A3, A4, B3, B4, E1, E2, E3, E4, F3, F4 |
| 345 | A1, A2, A3, A4, B1, B2, E1, E2, F1, F2, F3, F4 | 346 | A1, A2, A3, A4, B1, B2, E3, E4, F1, F2, F3, F4 |
| 347 | A1, A2, A3, A4, B3, B4, E1, E2, F1, F2, F3, F4 | 348 | A1, A2, A3, A4, B3, B4, E3, E4, F1, F2, F3, F4 |
| 349 | A1, A2, B1, B2, B3, B4, E1, E2, E3, E4, F1, F2 | 350 | A1, A2, B1, B2, B3, B4, E1, E2, E3, E4, F3, F4 |
| 351 | A3, A4, B1, B2, B3, B4, E1, E2, E3, E4, F1, F2 | 352 | A3, A4, B1, B2, B3, B4, E1, E2, E3, E4, F3, F4 |
| 353 | A1, A2, B1, B2, B3, B4, E1, E2, F1, F2, F3, F4 | 354 | A1, A2, B1, B2, B3, B4, E3, E4, F1, F2, F3, F4 |
| 355 | A3, A4, B1, B2, B3, B4, E1, E2, F1, F2, F3, F4 | 356 | A3, A4, B1, B2, B3, B4, E3, E4, F1, F2, F3, F4 |
| 357 | A1, A2, B1, B2, E1, E2, E3, E4, F1, F2, F3, F4 | 358 | A1, A2, B3, B4, E1, E2, E3, E4, F1, F2, F3, F4 |
| 359 | A3, A4, B1, B2, E1, E2, E3, E4, F1, F2, F3, F4 | 360 | A3, A4, B3, B4, E1, E2, E3, E4, F1, F2, F3, F4 |

C. In another method of configuring a codebook set having 12 elements, 5 groups are selected from the groups from the groups A, B, C, D, E, and F of Table 33. Among the selected 5 groups, one group may be configured with QPSK, and the remaining four groups may be configured with BPSK.

D. In another method of configuring a codebook set having 12 elements, all of the 5 groups A, B, C, D, E, and F of Table 33 may be configured with BPSK.

Table 38 below shows examples of a codebook set having 12 elements when the all 6 groups are configured with BPSK.

TABLE 38

| case | codebook set | case | codebook set |
|---|---|---|---|
| 1 | A1, A2.B1, B2, C1, C2, D1, D2, E1, E2, F1, F2 | 2 | A1, A2, B1, B2, C1, C2, D1, D2, E1, E2, F3, F4 |
| 3 | A1, A2, B1, B2, C1, C2, D1, D2, E3, E4, F1, F2 | 4 | A1, A2, B1, B2, C1, C2, D1, D2, E3, E4, F3, F4 |
| 5 | A1, A2, B1, B2, C1, C2, D3, D4, E1, E2, F1, F2 | 6 | A1, A2, B1, B2, C1, C2, D3, D4, E1, E2, F3, F4 |
| 7 | A1, A2, B1, B2, C1, C2, D3, D4, E3, E4, F1, F2 | 8 | A1, A2, B1, B2, C1, C2, D3, D4, E3, E4, F3, F4 |
| 9 | A1, A2, B1, B2, C3, C4, D1, D2, E1, E2, F1, F2 | 10 | A1, A2, B1, B2, C3, C4, D1, D2, E1, E2, F3, F4 |
| 11 | A1, A2, B1, B2, C3, C4, D1, D2, E3, E4, F1, F2 | 12 | A1, A2, B1, B2, C3, C4, D1, D2, E3, E4, F3, F4 |
| 13 | A1, A2, B1, B2, C3, C4, D3, D4, E1, E2, F1, F2 | 14 | A1, A2, B1, B2, C3, C4, D3, D4, E1, E2, F3, F4 |
| 15 | A1, A2, B1, B2, C3, C4, D3, D4, E3, E4, F1, F2 | 16 | A1, A2, B1, B2, C3, C4, D3, D4, E3, E4, F3, F4 |
| 17 | A1, A2, B3, B4, C1, C2, D1, D2, E1, E2, F1, F2 | 18 | A1, A2, B3, B4, C1, C2, D1, D2, E1, E2, F3, F4 |
| 19 | A1, A2, B3, B4, C1, C2, D1, D2, E3, E4, F1, F2 | 20 | A1, A2, B3, B4, C1, C2, D1, D2, E3, E4, F3, F4 |
| 21 | A1, A2, B3, B4, C1, C2, D3, D4, E1, E2, F1, F2 | 22 | A1, A2, B3, B4, C1, C2, D3, D4, E1, E2, F3, F4 |
| 23 | A1, A2, B3, B4, C1, C2, D3, D4, E3, E4, F1, F2 | 24 | A1, A2, B3, B4, C1, C2, D3, D4, E3, E4, F3, F4 |
| 25 | A1, A2, B3, B4, C3, C4, D1, D2, E1, E2, F1, F2 | 26 | A1, A2, B3, B4, C3, C4, D1, D2, E1, E2, F3, F4 |
| 27 | A1, A2, B3, B4, C3, C4, D1, D2, E3, E4, F1, F2 | 28 | A1, A2, B3, B4, C3, C4, D1, D2, E3, E4, F3, F4 |
| 29 | A1, A2, B3, B4, C3, C4, D3, D4, E1, E2, F1, F2 | 30 | A1, A2, B3, B4, C3, C4, D3, D4, E1, E2, F3, F4 |
| 31 | A1, A2, B3, B4, C3, C4, D3, D4, E3, E4, F1, F2 | 32 | A1, A2, B3, B4, C3, C4, D3, D4, E3, E4, F3, F4 |
| 33 | A3, A4, B1, B2, C1, C2, D1, D2, E1, E2, F1, F2 | 34 | A3, A4, B1, B2, C1, C2, D1, D2, E1, E2, F3, F4 |
| 35 | A3, A4, B1, B2, C1, C2, D1, D2, E3, E4, F1, F2 | 36 | A3, A4, B1, B2, C1, C2, D1, D2, E3, E4, F3, F4 |
| 37 | A3, A4, B1, B2, C1, C2, D3, D4, E1, E2, F1, F2 | 38 | A3, A4, B1, B2, C1, C2, D3, D4, E1, E2, F3, F4 |
| 39 | A3, A4, B1, B2, C1, C2, D3, D4, E3, E4, F1, F2 | 40 | A3, A4, B1, B2, C1, C2, D3, D4, E3, E4, F3, F4 |
| 41 | A3, A4, B1, B2, C3, C4, D1, D2, E1, E2, F1, F2 | 42 | A3, A4, B1, B2, C3, C4, D1, D2, E1, E2, F3, F4 |
| 43 | A3, A4, B1, B2, C3, C4, D1, D2, E3, E4, F1, F2 | 44 | A3, A4, B1, B2, C3, C4, D1, D2, E3, E4, F3, F4 |
| 45 | A3, A4, B1, B2, C3, C4, D3, D4, E1, E2, F1, F2 | 46 | A3, A4, B1, B2, C3, C4, D3, D4, E1, E2, F3, F4 |
| 47 | A3, A4, B1, B2, C3, C4, D3, D4, E3, E4, F1, F2 | 48 | A3, A4, B1, B2, C3, C4, D3, D4, E3, E4, F3, F4 |
| 49 | A3, A4, B3, B4, C1, C2, D1, D2, E1, E2, F1, F2 | 50 | A3, A4, B3, B4, C1, C2, D1, D2, E1, E2, F3, F4 |
| 51 | A3, A4, B3, B4, C1, C2, D1, D2, E3, E4, F1, F2 | 52 | A3, A4, B3, B4, C1, C2, D1, D2, E3, E4, F3, F4 |
| 53 | A3, A4, B3, B4, C1, C2, D3, D4, E1, E2, F1, F2 | 54 | A3, A4, B3, B4, C1, C2, D3, D4, E1, E2, F3, F4 |
| 55 | A3, A4, B3, B4, C1, C2, D3, D4, E3, E4, F1, F2 | 56 | A3, A4, B3, B4, C1, C2, D3, D4, E3, E4, F3, F4 |
| 57 | A3, A4, B3, B4, C3, C4, D1, D2, E1, E2, F1, F2 | 58 | A3, A4, B3, B4, C3, C4, D1, D2, E1, E2, F3, F4 |
| 59 | A3, A4, B3, B4, C3, C4, D1, D2, E3, E4, F1, F2 | 60 | A3, A4, B3, B4, C3, C4, D1, D2, E3, E4, F3, F4 |
| 61 | A3, A4, B3, B4, C3, C4, D3, D4, E1, E2, F1, F2 | 62 | A3, A4, B3, B4, C3, C4, D3, D4, E1, E2, F3, F4 |
| 63 | A3, A4, B3, B4, C3, C4, D3, D4, E3, E4, F1, F2 | 64 | A3, A4, B3, B4, C3, C4, D3, D4, E3, E4, F3, F4 |

(3) Now, a method of configuring a codebook set having 16 elements will be described.

A. In the method of configuring the codebook set having 16 elements, four groups are selected from the groups A, B, C, D, E, and F of Table 33. Each of the selected groups may be configured with QPSK.

Table 39 below shows examples of a codebook set having 16 elements by selecting four groups.

TABLE 39

| case | codebook set | case | codebook set |
|---|---|---|---|
| 1 | A1, A2, A3, A4, B1, B2, B3, B4, C1, C2, C3, C4, D1, D2, D3, D4 | 2 | A1, A2, A3, A4, B1, B2, B3, B4, C1, C2, C3, C4, E1, E2, E3, E4 |
| 3 | A1, A2, A3, A4, B1, B2, B3, B4, D1, D2, D3, D4, F1, F2, F3, F4 | 4 | A1, A2, A3, A4, B1, B2, B3, B4, D1, D2, D3, D4, E1, E2, E3, E4 |
| 5 | A1, A2, A3, A4, B1, B2, B3, B4, D1, D2, D3, D4, F1, F2, F3, F4 | 6 | A1, A2, A3, A4, B1, B2, B3, B4, E1, E2, E3, E4, F1, F2, F3, F4 |
| 7 | A1, A2, A3, A4, C1, C2, C3, C4, D1, D2, D3, D4, E1, E2, E3, E4 | 8 | A1, A2, A3, A4, C1, C2, C3, C4, D1, D2, D3, D4, F1, F2, F3, F4 |
| 9 | A1, A2, A3, A4, C1, C2, C3, C4, E1, E2, E3, E4, F1, F2, F3, F4 | 10 | A1, A2, A3, A4, D1, D2, D3, D4, E1, E2, E3, E4, F1, F2, F3, F4 |
| 11 | B1, B2, B3, B4, C1, C2, C3, C4, D1, D2, D3, D4, E1, E2, E3, E4 | 12 | B1, B2, B3, B4, C1, C2, C3, C4, D1, D2, D3, D4, F1, F2, F3, F4 |
| 13 | B1, B2, B3, B4, C1, C2, C3, C4, E1, E2, E3, E4, F1, F2, F3, F4 | 14 | B1, B2, B3, B4, D1, D2, D3, D4, E1, E2, E3, E4, F1, F2, F3, F4 |
| 15 | C1, C2, C3, C4, D1, D2, D3, D4, E1, E2, E3, E4, F1, F2, F3, F4 | | |

B. In another method of configuring a codebook set having 16 element, 5 groups are selected from the groups A, B, C, D, E, and F of Table 33. Among the selected 5 groups, three groups may be configured with QPSK, and the remaining two groups may be configured with BPSK.

Table 40 below shows examples of a codebook set configured in this method.

TABLE 40

| case | codebook set | case | codebook set |
|---|---|---|---|
| 1 | A1, A2, A3, A4, B1, B2, B3, B4, C1, C2, C3, C4, D1, D2, E1, E2 | 2 | A1, A2, A3, A4, B1, B2, B3, B4, C1, C2, C3, C4, D1, D2, E3, E4 |
| 3 | A1, A2, A3, A4, B1, B2, B3, B4, C1, C2, C3, C4, D3, D4, E1, E2 | 4 | A1, A2, A3, A4, B1, B2, B3, B4, C1, C2, C3, C4, D3, D4, E3, E4 |
| 5 | A1, A2, A3, A4, B1, B2, B3, B4, C1, C2, D1, D2, D3, D4, E1, E2 | 6 | A1, A2, A3, A4, B1, B2, B3, B4, C1, C2, D1, D2, D3, D4, E3, E4 |
| 7 | A1, A2, A3, A4, B1, B2, B3, B4, C3, C4, D1, D2, D3, D4, E1, E2 | 8 | A1, A2, A3, A4, B1, B2, B3, B4, C3, C4, D1, D2, D3, D4, E3, E4 |
| 9 | A1, A2, A3, A4, B1, B2, C1, C2, C3, C4, D1, D2, D3, D4, E1, E2 | 10 | A1, A2, A3, A4, B1, B2, C1, C2, C3, C4, D1, D2, D3, D4, E3, E4 |
| 11 | A1, A2, A3, A4, B3, B4, C1, C2, C3, C4, D1, D2, D3, D4, E1, E2 | 12 | A1, A2, A3, A4, B3, B4, C1, C2, C3, C4, D1, D2, D3, D4, E3, E4 |
| 13 | A1, A2, B1, B2, B3, B4, C1, C2, C3, C4, D1, D2, D3, D4, E1, E2 | 14 | A1, A2, B1, B2, B3, B4, C1, C2, C3, C4, D1, D2, D3, D4, E3, E4 |
| 15 | A3, A4, B1, B2, B3, B4, C1, C2, C3, C4, D1, D2, D3, D4, E1, E2 | 16 | A3, A4, B1, B2, B3, B4, C1, C2, C3, C4, D1, D2, D3, D4, E3, E4 |
| 17 | A1, A2, A3, A4, B1, B2, B3, B4, C1, C2, D1, D2, E1, E2, E3, E4 | 18 | A1, A2, A3, A4, B1, B2, B3, B4, C1, C2, D3, D4, E1, E2, E3, E4 |
| 19 | A1, A2, A3, A4, B1, B2, B3, B4, C3, C4, D1, D2, E1, E2, E3, E4 | 20 | A1, A2, A3, A4, B1, B2, B3, B4, C3, C4, D3, D4, E1, E2, E3, E4 |
| 21 | A1, A2, A3, A4, B1, B2, C1, C2, C3, C4, D1, D2, E1, E2, E3, E4 | 22 | A1, A2, A3, A4, B1, B2, C1, C2, C3, C4, D3, D4, E1, E2, E3, E4 |
| 23 | A1, A2, A3, A4, B3, B4, C1, C2, C3, C4, D1, D2, E1, E2, E3, E4 | 24 | A1, A2, A3, A4, B3, B4, C1, C2, C3, C4, D3, D4, E1, E2, E3, E4 |
| 25 | A1, A2, B1, B2, B3, B4, C1, C2, C3, C4, D1, D2, E1, E2, E3, E4 | 26 | A1, A2, B1, B2, B3, B4, C1, C2, C3, C4, D3, D4, E1, E2, E3, E4 |
| 27 | A3, A4, B1, B2, B3, B4, C1, C2, C3, C4, D1, D2, E1, E2, E3, E4 | 28 | A3, A4, B1, B2, B3, B4, C1, C2, C3, C4, D3, D4, E1, E2, E3, E4 |
| 29 | A1, A2, A3, A4, B1, B2, C1, C2, D1, D2, D3, D4, E1, E2, E3, E4 | 30 | A1, A2, A3, A4, B1, B2, C3, C4, D1, D2, D3, D4, E1, E2, E3, E4 |
| 31 | A1, A2, A3, A4, B3, B4, C1, C2, C3, C4, D1, D2, E1, E2, E3, E4 | 32 | A1, A2, A3, A4, B3, B4, C1, C2, C3, C4, D3, D4, E1, E2, E3, E4 |
| 33 | A1, A2, B1, B2, B3, B4, C1, C2, D1, D2, D3, D4, E1, E2, E3, E4 | 34 | A1, A2, B1, B2, B3, B4, C3, C4, D1, D2, D3, D4, E1, E2, E3, E4 |

TABLE 40-continued

| case | codebook set | case | codebook set |
|---|---|---|---|
| 35 | A3, A4, B1, B2, B3, B4, C1, C2, D1, D2, D3, D4, E1, E2, E3, E4 | 36 | A3, A4, B1, B2, B3, B4, C3, C4, D1, D2, D3, D4, E1, E2, E3, E4 |
| 37 | A1, A2, B1, B2, C1, C2, C3, C4, D1, D2, D3, D4, E1, E2, E3, E4 | 38 | A1, A2, B3, B4, C1, C2, C3, C4, D1, D2, D3, D4, E1, E2, E3, E4 |
| 39 | A3, A4, B1, B2, C1, C2, C3, C4, D1, D2, D3, D4, E1, E2, E3, E4 | 40 | A3, A4, B3, B4, C1, C2, C3, C4, D1, D2, D3, D4, E1, E2, E3, E4 |
| 41 | A1, A2, A3, A4, B1, B2, B3, B4, C1, C2, C3, C4, D1, D2, F1, F2 | 42 | A1, A2, A3, A4, B1, B2, B3, B4, C1, C2, C3, C4, D1, D2, F3, F4 |
| 43 | A1, A2, A3, A4, B1, B2, B3, B4, C1, C2, C3, C4, D3, D4, F1, F2 | 44 | A1, A2, A3, A4, B1, B2, B3, B4, C1, C2, C3, C4, D3, D4, F3, F4 |
| 45 | A1, A2, A3, A4, B1, B2, B3, B4, C1, C2, D1, D2, D3, D4, F1, F2 | 46 | A1, A2, A3, A4, B1, B2, B3, B4, C1, C2, D1, D2, D3, D4, F3, F4 |
| 47 | A1, A2, A3, A4, B1, B2, B3, B4, C3, C4, D1, D2, D3, D4, F1, F2 | 48 | A1, A2, A3, A4, B1, B2, B3, B4, C3, C4, D1, D2, D3, D4, F3, F4 |
| 49 | A1, A2, A3, A4, B1, B2, C1, C2, C3, C4, D1, D2, D3, D4, F1, F2 | 50 | A1, A2, A3, A4, B1, B2, C1, C2, C3, C4, D1, D2, D3, D4, F3, F4 |
| 51 | A1, A2, A3, A4, B3, B4, C1, C2, C3, C4, D1, D2, D3, D4, F1, F2 | 52 | A1, A2, A3, A4, B3, B4, C1, C2, C3, C4, D1, D2, D3, D4, F3, F4 |
| 53 | A1, A2, B1, B2, B3, B4, C1, C2, C3, C4, D1, D2, D3, D4, F1, F2 | 54 | A1, A2, B1, B2, B3, B4, C1, C2, C3, C4, D1, D2, D3, D4, F3, F4 |
| 55 | A3, A4, B1, B2, B3, B4, C1, C2, C3, C4, D1, D2, D3, D4, F1, F2 | 56 | A3, A4, B1, B2, B3, B4, C1, C2, C3, C4, D1, D2, D3, D4, F3, F4 |
| 57 | A1, A2, A3, A4, B1, B2, B3, B4, C1, C2, D1, D2, F1, F2, F3, F4 | 58 | A1, A2, A3, A4, B1, B2, B3, B4, C1, C2, D3, D4, F1, F2, F3, F4 |
| 59 | A1, A2, A3, A4, B1, B2, B3, B4, C3, C4, D1, D2, F1, F2, F3, F4 | 60 | A1, A2, A3, A4, B1, B2, B3, B4, C3, C4, D3, D4, F1, F2, F3, F4 |
| 61 | A1, A2, A3, A4, B1, B2, C1, C2, C3, C4, D1, D2, F1, F2, F3, F4 | 62 | A1, A2, A3, A4, B1, B2, C1, C2, C3, C4, D3, D4, F1, F2, F3, F4 |
| 63 | A1, A2, A3, A4, B3, B4, C1, C2, C3, C4, D1, D2, F1, F2, F3, F4 | 64 | A1, A2, A3, A4, B3, B4, C1, C2, C3, C4, D3, D4, F1, F2, F3, F4 |
| 65 | A1, A2, B1, B2, B3, B4, C1, C2, C3, C4, D1, D2, F1, F2, F3, F4, | 66 | A1, A2, B1, B2, B3, B4, C1, C2, C3, C4, D3, D4, F1, F2, F3, F4 |
| 67 | A3, A4, B1, B2, B3, B4, C1, C2, C3, C4, D1, D2, F1, F2, F3, F4 | 68 | A3, A4, B1, B2, B3, B4, C1, C2, C3, C4, D3, D4, F1, F2, F3, F4 |
| 69 | A1, A2, A3, A4, B1, B2, C1, C2, D1, D2, D3, D4, F1, F2, F3, F4 | 70 | A1, A2, A3, A4, B1, B2, C3, C4, D1, D2, D3, D4, F1, F2, F3, F4 |
| 71 | A1, A2, A3, A4, B3, B4, C1, C2, D1, D2, D3, D4, F1, F2, F3, F4 | 72 | A1, A2, A3, A4, B3, B4, C3, C4, D1, D2, D3, D4, F1, F2, F3, F4 |
| 73 | A1, A2, B1, B2, B3, B4, C1, C2, D1, D2, D3, D4, F1, F2, F3, F4 | 74 | A1, A2, B1, B2, B3, B4, C3, C4, D1, D2, D3, D4, F1, F2, F3, F4 |
| 75 | A3, A4, B1, B2, B3, B4, C1, C2, D1, D2, D3, D4, F1, F2, F3, F4 | 76 | A3, A4, B1, B2, B3, B4, C3, C4, D1, D2, D3, D4, F1, F2, F3, F4 |
| 77 | A1, A2, B1, B2, C1, C2, C3, C4, D1, D2, D3, D4, F1, F2, F3, F4 | 78 | A1, A2, B3, B4, C1, C2, C3, C4, D1, D2, D3, D4, F1, F2, F3, F4 |
| 79 | A3, A4, B1, B2, C1, C2, C3, C4, D1, D2, D3, D4, F1, F2, F3, F4 | 80 | A3, A4, B3, B4, C1, C2, C3, C4, D1, D2, D3, D4, F1, F2, F3, F4 |
| 81 | A1, A2, A3, A4, B1, B2, B3, B4, C1, C2, C3, C4, E1, E2, F1, F2 | 82 | A1, A2, A3, A4, B1, B2, B3, B4, C1, C2, C3, C4, E1, E2, F3, F4 |
| 83 | A1, A2, A3, A4, B1, B2, B3, B4, C1, C2, C3, C4, E3, E4, F1, F2 | 84 | A1, A2, A3, A4, B1, B2, B3, B4, C1, C2, C3, C4, E3, E4, F3, F4 |
| 85 | A1, A2, A3, A4, B1, B2, B3, B4, C1, C2, E1, E2, E3, E4, F1, F2 | 86 | A1, A2, A3, A4, B1, B2, B3, B4, C1, C2, E1, E2, E3, E4, F3, F4 |
| 87 | A1, A2, A3, A4, B1, B2, B3, B4, C3, C4, E1, E2, E3, E4, F1, F2 | 88 | A1, A2, A3, A4, B1, B2, B3, B4, C3, C4, E1, E2, E3, E4, F3, F4 |
| 89 | A1, A2, A3, A4, B1, B2, C1, C2, C3, C4, E1, E2, E3, E4, F1, F2 | 90 | A1, A2, A3, A4, B1, B2, C1, C2, C3, C4, E1, E2, E3, E4, F3, F4 |
| 91 | A1, A2, A3, A4, B3, B4, C1, C2, C3, C4, E1, E2, E3, E4, F1, F2 | 92 | A1, A2, A3, A4, B3, B4, C1, C2, C3, C4, E1, E2, E3, E4, F3, F4 |
| 93 | A1, A2, B1, B2, B3, B4, C1, C2, C3, C4, E1, E2, E3, E4, F1, F2 | 94 | A1, A2, B1, B2, B3, B4, C1, C2, C3, C4, E1, E2, E3, E4, F3, F4 |
| 95 | A3, A4, B1, B2, B3, B4, C1, C2, C3, C4, E1, E2, E3, E4, F1, F2 | 96 | A3, A4, B1, B2, B3, B4, C1, C2, C3, C4, E1, E2, E3, E4, F3, F4 |
| 97 | A1, A2, A3, A4, B1, B2, B3, B4, C1, C2, E1, E2, F1, F2, F3, F4 | 98 | A1, A2, A3, A4, B1, B2, B3, B4, C1, C2, E3, E4, F1, F2, F3, F4 |
| 99 | A1, A2, A3, A4, B1, B2, B3, B4, C3, C4, E1, E2, F1, F2, F3, F4 | 100 | A1, A2, A3, A4, B1, B2, B3, B4, C3, C4, E3, E4, F1, F2, F3, F4 |
| 101 | A1, A2, A3, A4, B1, B2, C1, C2, C3, C4, E1, E2, F1, F2, F3, F4 | 102 | A1, A2, A3, A4, B1, B2, C1, C2, C3, C4, E3, E4, F1, F2, F3, F4 |
| 103 | A1, A2, A3, A4, B3, B4, C1, C2, C3, C4, E1, E2, F1, F2, F3, F4 | 104 | A1, A2, A3, A4, B3, B4, C1, C2, C3, C4, E3, E4, F1, F2, F3, F4 |
| 105 | A1, A2, B1, B2, B3, B4, C1, C2, C3, C4, E1, E2, F1, F2, F3, F4 | 106 | A1, A2, B1, B2, B3, B4, C1, C2, C3, C4, E3, E4, F1, F2, F3, F4 |
| 107 | A3, A4, B1, B2, B3, B4, C1, C2, C3, C4, E1, E2, F1, F2, F3, F4 | 108 | A3, A4, B1, B2, B3, B4, C1, C2, C3, C4, E3, E4, F1, F2, F3, F4 |
| 109 | A1, A2, A3, A4, B1, B2, C1, C2, E1, E2, E3, E4, F1, F2, F3, F4 | 110 | A1, A2, A3, A4, B1, B2, C3, C4, E1, E2, E3, E4, F1, F2, F3, F4 |
| 111 | A1, A2, A3, A4, B3, B4, C1, C2, E1, E2, E3, E4, F1, F2, F3, F4 | 112 | A1, A2, A3, A4, B3, B4, C3, C4, E1, E2, E3, E4, F1, F2, F3, F4 |

TABLE 40-continued

| case | codebook set | case | codebook set |
|---|---|---|---|
| 113 | A1, A2, B1, B2, B3, B4, C1, C2, E1, E2, E3, E4, F1, F2, F3F, 4 | 114 | A1, A2, B1, B2, B3, B4, C3, C4, E1, E2, E3, E4, F1, F2, F3, F4 |
| 115 | A3, A4, B1, B2, B3, B4, C1, C2, E1, E2, E3, E4, F1, F2, F3, F4 | 116 | A3, A4, B1, B2, B3, B4, C3, C4, E1, E2, E3, E4, F1, F2, F3, F4 |
| 117 | A1, A2, B1, B2, C1, C2, C3, C4, E1, E2, E3, E4, F1, F2, F3, F4 | 118 | A1, A2, B3, B4, C1, C2, C3, C4, E1, E2, E3, E4, F1, F2, F3, F4 |
| 119 | A3, A4, B1, B2, C1, C2, C3, C4, E1, E2, E3, E4, F1, F2, F3, F4 | 120 | A3, A4, B3, B4, C1, C2, C3, C4, E1, E2, E3, E4, F1, F2, F3, F4 |
| 121 | A1, A2, A3, A4, B1, B2, B3, B4, D1, D2, D3, D4, E1, E2, F1, F2 | 122 | A1, A2, A3, A4, B1, B2, B3, B4, D1, D2, D3, D4, E1, E2, F3, F4 |
| 123 | A1, A2, A3, A4, B1, B2, B3, B4, D1, D2, D3, D4, E3, E4, F1, F2 | 124 | A1, A2, A3, A4, B1, B2, B3, B4, D1, D2, D3, D4, E3, E4, F3, F4 |
| 125 | A1, A2, A3, A4, B1, B2, B3, B4, D1, D2, E1, E2, E3, E4, F1, F2, 34 | 126 | A1, A2, A3, A4, B1, B2, B3, B4, D1, D2, E1, E2, E3, E4, F3, F4 |
| 127 | A1, A2, A3, A4, B1, B2, B3, B4, D3, D4, E1, E2, E3, E4, F1, F2 | 128 | A1, A2, A3, A4, B1, B2, B3, B4, D3, D4, E1, E2, E3, E4, F3, F4 |
| 129 | A1, A2, A3, A4, B1, B2, D1, D2, D3, D4, E1, E2, E3, E4, F1, F2 | 130 | A1, A2, A3, A4, B1, B2, D1, D2, D3, D4, E1, E2, E3, E4, F3, F4 |
| 131 | A1, A2, A3, A4, B3, B4, D1, D2, D3, D4, E1, E2, E3, E4, F1, F2 | 132 | A1, A2, A3, A4, B3, B4, D1, D2, D3, D4, E1, E2, E3, E4, F1, F2 |
| 133 | A1, A2, B1, B2, B3, B4, D1, D2, D3, D4, E1, E2, E3, E4, F1, F2 | 134 | A1, A2, B1, B2, B3, B4, D1, D2, D3, D4, E1, E2, E3, E4, F3, F4 |
| 135 | A3, A4, B1, B2, B3, B4, D1, D2, D3, D4, E1, E2, E3, E4, F1, F2 | 136 | A3, A4, B1, B2, B3, B4, D1, D2, D3, D4, E1, E2, E3, E4, F3, F4 |
| 137 | A1, A2, A3, A4, B1, B2, B3, B4, D1, D2, E1, E2, F1, F2, F3, F4 | 138 | A1, A2, A3, A4, B1, B2, B3, B4, D1, D2, E3, E4, F1, F2, F3, F4 |
| 139 | A1, A2, A3, A4, B1, B2, B3, B4, D3, D4, E1, E2, F1, F2, F3, F4 | 140 | A1, A2, A3, A4, B1, B2, B3, B4, D3, D4, E3, E4, F1, F2, F3, F4 |
| 141 | A1, A2, A3, A4, B1, B2, D1, D2, D3, D4, E1, E2, F1, F2, F3, F4 | 142 | A1, A2, A3, A4, B1, B2, D1, D2, D3, D4, E3, E4, F1, F2, F3, F4 |
| 143 | A1, A2, A3, A4, B3, B4, D1, D2, D3, D4, E1, E2, F1, F2, F3, F4 | 144 | A1, A2, A3, A4, B3, B4, D1, D2, D3, D4, E3, E4, F1, F2, F3, F4 |
| 145 | A1, A2, B1, B2, B3, B4, D1, D2, D3, D4, E1, E2, F1, F2, F3, F4 | 146 | A1, A2, B1, B2, B3, B4, D1, D2, D3, D4, E3, E4, F1, F2, F3, F4 |
| 147 | A3, A4, B1, B2, B3, B4, D1, D2, D3, D4, E1, E2, F1, F2, F3, F4 | 148 | A3, A4, B1, B2, B3, B4, D1, D2, D3, D4, E3, E4, F1, F2, F3, F4 |
| 149 | A1, A2, A3, A4, B1, B2, D1, D2, E1, E2, E3, E4, F1, F2, F3, F4 | 150 | A1, A2, A3, A4, B1, B2, D3, D4, E1, E2, E3, E4, F1, F2, F3, F4 |
| 151 | A1, A2, A3, A4, B3, B4, D1, D2, E1, E2, E3, E4, F1, F2, F3, F4 | 152 | A1, A2, A3, A4, B3, B4, D3, D4, E1, E2, E3, E4, F1, F2, F3, F4 |
| 153 | A1, A2, B1, B2, B3, B4, D1, D2, E1, E2, E3, E4, F1, F2, F3, F4 | 154 | A1, A2, B1, B2, B3, B4, D3, D4, E1, E2, E3, E4, F1, F2, F3, F4 |
| 155 | A3, A4, B1, B2, B3, B4, D1, D2, E1, E2, E3, E4, F1, F2, F3, F4 | 156 | A3, A4, B1, B2, B3, B4, D3, D4, E1, E2, E3, E4, F1, F2, F3, F4 |
| 157 | A1, A2, B1, B2, D1, D2, D3, D4, E1, E2, E3, E4, F1, F2, F3, F4 | 158 | A1, A2, B3, B4, D1, D2, D3, D4, E1, E2, E3, E4, F1, F2, F3, F4 |
| 159 | A3, A4, B1, B2, D1, D2, D3, D4, E1, E2, E3, E4, F1, F2, F3, F4 | 160 | A3, A4, B3, B4, D1, D2, D3, D4, E1, E2, E3, E4, F1, F2, F3, F4 |
| 161 | A1, A2, A3, A4, C1, C2, C3, C4, D1, D2, D3, D4, E1, E2, F1, F2 | 162 | A1, A2, A3, A4, C1, C2, C3, C4, D1, D2, D3, D4, E1, E2, F3, F4 |
| 163 | A1, A2, A3, A4, C1, C2, C3, C4, D1, D2, D3, D4, E3, E4, F1, F2 | 164 | A1, A2, A3, A4, C1, C2, C3, C4, D1, D2, D3, D4, E3, E4, F3, F4 |
| 165 | A1, A2, A3, A4, C1, C2, C3, C4, D1, D2, E1, E2, E3, E4, F1, F2 | 166 | A1, A2, A3, A4, C1, C2, C3, C4, D1, D2, E1, E2, E3, E4, F3, F4 |
| 167 | A1, A2, A3, A4, C1, C2, C3, C4, D3, D4, E1, E2, E3, E4, F1, F2 | 168 | A1, A2, A3, A4, C1, C2, C3, C4, D3, D4, E1, E2, E3, E4, F3, F4 |
| 169 | A1, A2, A3, A4, C1, C2, D1, D2, D3, D4, E1, E2, E3, E4, F1, F2 | 170 | A1, A2, A3, A4, C1, C2, D1, D2, D3, D4, E1, E2, E3, E4, F3, F4 |
| 171 | A1, A2, A3, A4, C3, C4, D1, D2, D3, D4, E1, E2, E3, E4, F1, F2 | 172 | A1, A2, A3, A4, C3, C4, D1, D2, D3, D4, E1, E2, E3, E4, F3, F4 |
| 173 | A1, A2, C1, C2, C3, C4, D1, D2, D3, D4, E1, E2, E3, E4, F1, F2 | 174 | A1, A2, C1, C2, C3, C4, D1, D2, D3, D4, E1, E2, E3, E4, F3, F4 |
| 175 | A3, A4, C1, C2, C3, C4, D1, D2, D3, D4, E1, E2, E3, E4, F1, F2 | 176 | A3, A4, C1, C2, C3, C4, D1, D2, D3, D4, E1, E2, E3, E4, F3, F4 |
| 177 | A1, A2, A3, A4, C1, C2, C3, C4, D1, D2, E1, E2, F1, F2, F3, F4 | 178 | A1, A2, A3, A4, C1, C2, C3, C4, D1, D2, E3, E4, F1, F2, F3, F4 |
| 179 | A1, A2, A3, A4, C1, C2, C3, C4, D3, D4, E1, E2, F1, F2, F3, F4 | 180 | A1, A2, A3, A4, C1, C2, C3, C4, D3, D4, E3, E4, F1, F2, F3, F4 |
| 181 | A1, A2, A3, A4, C1, C2, D1, D2, D3, D4, E1, E2, F1, F2, F3, F4 | 182 | A1, A2, A3, A4, C1, C2, D1, D2, D3, D4, E3, E4, F1, F2, F3, F4 |
| 183 | A1, A2, A3, A4, C3, C4, D1, D2, D3, D4, E1, E2, F1, F2, F3, F4 | 184 | A1, A2, A3, A4, C3, C4, D1, D2, D3, D4, E3, E4, F1, F2, F3, F4 |
| 185 | A1, A2, C1, C2, C3, C4, D1, D2, D3, D4, E1, E2, F1, F2, F3, F4 | 186 | A1, A2, C1, C2, C3, C4, D1, D2, D3, D4, E3, E4, F1, F2, F3, F4 |
| 187 | A3, A4, C1, C2, C3, C4, D1, D2, D3, D4, E1, E2, F1, F2, F3, F4 | 188 | A3, A4, C1, C2, C3, C4, D1, D2, D3, D4, E3, E4, F1, F2, F3, F4 |
| 189 | A1, A2, A3, A4, C1, C2, D1, D2, E1, E2, E3, E4, F1, F2, F3, F4 | 190 | A1, A2, A3, A4, C1, C2, D3, D4, E1, E2, E3, E4, F1, F2, F3, F4 |

TABLE 40-continued

| case | codebook set | case | codebook set |
|---|---|---|---|
| 191 | A1, A2, A3, A4, C3, C4, D1, D2, E1, E2, E3, E4, F1, F2, F3, F4 | 192 | A1, A2, A3, A4, C3, C4, D3, D4, E1, E2, E3, E4, F1, F2, F3, F4 |
| 193 | A1, A2, C1, C2, C3, C4, D1, D2, E1, E2, E3, E4, F1, F2, F3, F4 | 194 | A1, A2, C1, C2, C3, C4, D3, D4, E1, E2, E3, E4, F1, F2, F3, F4 |
| 195 | A3, A4, C1, C2, C3, C4, D1, D2, E1, E2, E3, E4, F1, F2, F3, F4 | 196 | A3, A4, C1, C2, C3, C4, D3, D4, E1, E2, E3, E4, F1, F2, F3, F4 |
| 197 | A1, A2, C1, C2, D1, D2, D3, D4, E1, E2, E3, E4, F1, F2, F3, F4 | 198 | A1, A2, C3, C4, D1, D2, D3, D4, E1, E2, E3, E4, F1, F2, F3, F4 |
| 199 | A3, A4, C1, C2, D1, D2, D3, D4, E1, E2, E3, E4, F1, F2, F3, F4 | 200 | A3, A4, C3, C4, D1, D2, D3, D4, E1, E2, E3, E4, F1, F2, F3, F4 |
| 201 | B1, B2, B3, B4, C1, C2, C3, C4, D1, D2, D3, D4, E1, E2, F1, F2 | 202 | B1, B2, B3, B4, C1, C2, C3, C4, D1, D2, D3, D4, E1, E2, F3, F4 |
| 203 | B1, B2, B3, B4, C1, C2, C3, C4, D1, D2, D3, D4, E3, E4, F1, F2 | 204 | B1, B2, B3, B4, C1, C2, C3, C4, D1, D2, D3, D4, E3, E4, F3, F4 |
| 205 | B1, B2, B3, B4, C1, C2, C3, C4, D1, D2, E1, E2, E3, E4, F1, F2 | 206 | B1, B2, B3, B4, C1, C2, C3, C4, D1, D2, E1, E2, E3, E4, F3, F4 |
| 207 | B1, B2, B3, B4, C1, C2, C3, C4, D3, D4, E1, E2, E3, E4, F1, F2 | 208 | B1, B2, B3, B4, C1, C2, C3, C4, D3, D4, E1, E2, E3, E4, F3, F4 |
| 209 | B1, B2, B3, B4, C1, C2, D1, D2, D3, D4, E1, E2, E3, E4, F1, F2 | 210 | B1, B2, B3, B4, C1, C2, D1, D2, D3, D4, E1, E2, E3, E4, F3, F4 |
| 211 | B1, B2, B3, B4, C3, C4, D1, D2, D3, D4, E1, E2, E3, E4, F1, F2 | 212 | B1, B2, B3, B4, C3, C4, D1, D2, D3, D4, E1, E2, E3, E4, F3, F4 |
| 213 | B1, B2, C1, C2, C3, C4, D1, D2, D3, D4, E1, E2, E3, E4, F1, F2 | 214 | B1, B2, C1, C2, C3, C4, D1, D2, D3, D4, E1, E2, E3, E4, F3, F4 |
| 215 | B3, B4, C1, C2, C3, C4, D1, D2, D3, D4, E1, E2, E3, E4, F1, F2 | 216 | B3, B4, C1, C2, C3, C4, D1, D2, D3, D4, E1, E2, E3, E4, F3, F4 |
| 217 | B1, B2, B3, B4, C1, C2, C3, C4, D1, D2, E1, E2, F1, F2, F3, F4 | 218 | B1, B2, B3, B4, C1, C2, C3, C4, D1, D2, E3, E4, F1, F2, F3, F4 |
| 219 | B1, B2, B3, B4, C1, C2, C3, C4, D3, D4, E1, E2, F1, F2, F3, F4 | 220 | B1, B2, B3, B4, C1, C2, C3, C4, D3, D4, E3, E4, F1, F2, F3, F4 |
| 221 | B1, B2, B3, B4, C1, C2, D1, D2, D3, D4, E1, E2, F1, F2, F3, F4 | 222 | B1, B2, B3, B4, C1, C2, D1, D2, D3, D4, E3, E4, F1, F2, F3, F4 |
| 223 | B1, B2, B3, B4, C3, C4, D1, D2, D3, D4, E1, E2, F1, F2, F3, F4 | 224 | B1, B2, B3, B4, C3, C4, D1, D2, D3, D4, E3, E4, F1, F2, F3, F4 |
| 225 | B1, B2, C1, C2, C3, C4, D1, D2, D3, D4, E1, E2, F1, F2, F3, F4 | 226 | B1, B2, C1, C2, C3, C4, D1, D2, D3, D4, E3, E4, F1, F2, F3, F4 |
| 227 | B3, B4, C1, C2, C3, C4, D1, D2, D3, D4, E1, E2, F1, F2, F3, F4 | 228 | B3, B4, C1, C2, C3, C4, D1, D2, D3, D4, E3, E4, F1, F2, F3, F4 |
| 229 | B1, B2, B3, B4, C1, C2, D1, D2, E1, E2, E3, E4, F1, F2, F3, F4 | 230 | B1, B2, B3, B4, C1, C2, D3, D4, E1, E2, E3, E4, F1, F2, F3, F4 |
| 231 | B1, B2, B3, B4, C3, C4, D1, D2, E1, E2, E3, E4, F1, F2, F3, F4 | 232 | B1, B2, B3, B4, C3, C4, D3, D4, E1, E2, E3, E4, F1, F2, F3, F4 |
| 233 | B1, B2, C1, C2, C3, C4, D1, D2, E1, E2, E3, E4, F1, F2, F3, F4 | 234 | B1, B2, C1, C2, C3, C4, D3, D4, E1, E2, E3, E4, F1, F2, F3, F4 |
| 235 | B3, B4, C1, C2, C3, C4, D1, D2, E1, E2, E3, E4, F1, F2, F3, F4 | 236 | B3, B4, C1, C2, C3, C4, D3, D4, E1, E2, E3, E4, F1, F2, F3, F4 |
| 237 | B1, B2, C1, C2, D1, D2, D3, D4, E1, E2, E3, E4, F1, F2, F3, F4 | 238 | B1, B2, C3, C4, D1, D2, D3, D4, E1, E2, E3, E4, F1, F2, F3, F4 |
| 239 | B3, B4, C1, C2, D1, D2, D3, D4, E1, E2, E3, E4, F1, F2, F3, F4 | 240 | B3, B4, C3, C4, D1, D2, D3, D4, E1, E2, E3, E4, F1, F2, F3, F4 |

C. Among the groups A, B, C, D, E, and F of Table 33, two groups may be configured with QPSK, and the remaining four groups may be configured with BPSK.

Table 41 below shows examples of a codebook set configured in this method.

TABLE 41

| case | codebook set | case | codebook set |
|---|---|---|---|
| 1 | A1, A2, A3, A4, B1, B2, B3, B4, C1, C2, D1, D2, E1, E2, F1, F2 | 2 | A1, A2, A3, A4, B1, B2, B3, B4, C1, C2, D1, D2, E1, E2, F3, F4 |
| 3 | A1, A2, A3, A4, B1, B2, B3, B4, C1, C2, D1, D2, E3, E4, F1, F2 | 4 | A1, A2, A3, A4, B1, B2, B3, B4, C1, C2, D1, D2, E3, E4, F3, F4 |
| 5 | A1, A2, A3, A4, B1, B2, B3, B4, C1, C2, D3, D4, E1, E2, F1, F2 | 6 | A1, A2, A3, A4, B1, B2, B3, B4, C1, C2, D3, D4, E1, E2, F3, F4 |
| 7 | A1, A2, A3, A4, B1, B2, B3, B4, C1, C2, D3, D4, E3, E4, F1, F2 | 8 | A1, A2, A3, A4, B1, B2, B3, B4, C1, C2, D3, D4, E3, E4, F3, F4 |
| 9 | A1, A2, A3, A4, B1, B2, B3, B4, C3, C4, D1, D2, E1, E2, F1, F2 | 10 | A1, A2, A3, A4, B1, B2, B3, B4, C3, C4, D1, D2, E1, E2, F3, F4 |
| 11 | A1, A2, A3, A4, B1, B2, B3, B4, C3, C4, D1, D2, E3, E4, F1, F2 | 12 | A1, A2, A3, A4, B1, B2, B3, B4, C3, C4, D1, D2, E3, E4, F3, F4 |
| 13 | A1, A2, A3, A4, B1, B2, B3, B4, C3, C4, D3, D4, E1, E2, F1, F2 | 14 | A1, A2, A3, A4, B1, B2, B3, B4, C3, C4, D3, D4, E1, E2, F3, F4 |

TABLE 41-continued

| case | codebook set | case | codebook set |
|---|---|---|---|
| 15 | A1, A2, A3, A4, B1, B2, B3, B4, C3, C4, D3, D4, E3, E4, F1, F2 | 16 | A1, A2, A3, A4, B1, B2, B3, B4, C3, C4, D3, D4, E3, E4, F3, F4 |
| 17 | A1, A2, A3, A4, B1, B2, C1, C2, C3, C4, D1, D2, E1, E2, F1, F2 | 18 | A1, A2, A3, A4, B1, B2, C1, C2, C3, C4, D1, D2, E1, E2, F3, F4 |
| 19 | A1, A2, A3, A4, B1, B2, C1, C2, C3, C4, D1, D2, E3, E4, F1, F2 | 20 | A1, A2, A3, A4, B1, B2, C1, C2, C3, C4, D1, D2, E3, E4, F3, F4 |
| 21 | A1, A2, A3, A4, B1, B2, C1, C2, C3, C4, D3, D4, E1, E2, F1, F2 | 22 | A1, A2, A3, A4, B1, B2, C1, C2, C3, C4, D3, D4, E1, E2, F3, F4 |
| 23 | A1, A2, A3, A4, B1, B2, C1, C2, C3, C4, D3, D4, E3, E4, F1, F2 | 24 | A1, A2, A3, A4, B1, B2, C1, C2, C3, C4, D3, D4, E3, E4, F3, F4 |
| 25 | A1, A2, A3, A4, B3, B4, C1, C2, C3, C4, D1, D2, E1, E2, F1, F2 | 26 | A1, A2, A3, A4, B3, B4, C1, C2, C3, C4, D1, D2, E1, E2, F3, F4 |
| 27 | A1, A2, A3, A4, B3, B4, C1, C2, C3, C4, D1, D2, E3, E4, F1, F2 | 28 | A1, A2, A3, A4, B3, B4, C1, C2, C3, C4, D1, D2, E3, E4, F3, F4 |
| 29 | A1, A2, A3, A4, B3, B4, C1, C2, C3, C4, D3, D4, E1, E2, F1, F2 | 30 | A1, A2, A3, A4, B3, B4, C1, C2, C3, C4, D3, D4, E1, E2, F3, F4 |
| 31 | A1, A2, A3, A4, B3, B4, C1, C2, C3, C4, D3, D4, E3, E4, F1, F2 | 32 | A1, A2, A3, A4, B3, B4, C1, C2, C3, C4, D3, D4, E3, E4, F3, F4 |
| 33 | A1, A2, A3, A4, B1, B2, C1, C2, D1, D2, D3, D4, E1, E2, F1, F2 | 34 | A1, A2, A3, A4, B1, B2, C1, C2, D1, D2, D3, D4, E1, E2, F3, F4 |
| 35 | A1, A2, A3, A4, B1, B2, C1, C2, D1, D2, D3, D4, E3, E4, F1, F2 | 36 | A1, A2, A3, A4, B1, B2, C1, C2, D1, D2, D3, D4, E3, E4, F3, F4 |
| 37 | A1, A2, A3, A4, B1, B2, C3, C4, D1, D2, D3, D4, E1, E2, F1, F2 | 38 | A1, A2, A3, A4, B1, B2, C3, C4, D1, D2, D3, D4, E1, E2, F3, F4 |
| 39 | A1, A2, A3, A4, B1, B2, C3, C4, D1, D2, D3, D4, E3, E4, F1, F2 | 40 | A1, A2, A3, A4, B1, B2, C3, C4, D1, D2, D3, D4, E3, E4, F3, F4 |
| 41 | A1, A2, A3, A4, B3, B4, C1, C2, D1, D2, D3, D4, E1, E2, F1, F2 | 42 | A1, A2, A3, A4, B3, B4, C1, C2, D1, D2, D3, D4, E1, E2, F3, F4 |
| 43 | A1, A2, A3, A4, B3, B4, C1, C2, D1, D2, D3, D4, E3, E4, F1, F2 | 44 | A1, A2, A3, A4, B3, B4, C1, C2, D1, D2, D3, D4, E3, E4, F3, F4 |
| 45 | A1, A2, A3, A4, B3, B4, C3, C4, D1, D2, D3, D4, E1, E2, F1, F2 | 46 | A1, A2, A3, A4, B3, B4, C3, C4, D1, D2, D3, D4, E1, E2, F3, F4 |
| 47 | A1, A2, A3, A4, B3, B4, C3, C4, D1, D2, D3, D4, E3, E4, F1, F2 | 48 | A1, A2, A3, A4, B3, B4, C3, C4, D1, D2, D3, D4, E3, E4, F3, F4 |
| 49 | A1, A2, A3, A4, B1, B2, C1, C2, D1, D2, E1, E2, E3, E4, F1, F2 | 50 | A1, A2, A3, A4, B1, B2, C1, C2, D1, D2, E1, E2, E3, E4, F3, F4 |
| 51 | A1, A2, A3, A4, B1, B2, C1, C2, D3, D4, E1, E2, E3, E4, F1, F2 | 52 | A1, A2, A3, A4, B1, B2, C1, C2, D3, D4, E1, E2, E3, E4, F3, F4 |
| 53 | A1, A2, A3, A4, B1, B2, C3, C4, D1, D2, E1, E2, E3, E4, F1, F2 | 54 | A1, A2, A3, A4, B1, B2, C3, C4, D1, D2, E1, E2, E3, E4, F3, F4 |
| 55 | A1, A2, A3, A4, B1, B2, C3, C4, D3, D4, E1, E2, E3, E4, F1, F2 | 56 | A1, A2, A3, A4, B1, B2, C3, C4, D3, D4, E1, E2, E3, E4, F3, F4 |
| 57 | A1, A2, A3, A4, B3, B4, C1, C2, D1, D2, E1, E2, E3, E4, F1, F2 | 58 | A1, A2, A3, A4, B3, B4, C1, C2, D1, D2, E1, E2, E3, E4, F3, F4 |
| 59 | A1, A2, A3, A4, B3, B4, C1, C2, D3, D4, E1, E2, E3, E4, F1, F2 | 60 | A1, A2, A3, A4, B3, B4, C1, C2, D3, D4, E1, E2, E3, E4, F3, F4 |
| 61 | A1, A2, A3, A4, B3, B4, C3, C4, D1, D2, E1, E2, E3, E4, F1, F2 | 62 | A1, A2, A3, A4, B3, B4, C3, C4, D1, D2, E1, E2, E3, E4, F3, F4 |
| 63 | A1, A2, A3, A4, B3, B4, C3, C4, D3, D4, E1, E2, E3, E4, F1, F2 | 64 | A1, A2, A3, A4, B3, B4, C3, C4, D3, D4, E1, E2, E3, E4, F3, F4 |
| 65 | A1, A2, A3, A4, B1, B2, C1, C2, D1, D2, E1, E2, F1, F2, F3, F4 | 66 | A1, A2, A3, A4, B1, B2, C1, C2, D1, D2, E3, E4, F1, F2, F3, F4 |
| 67 | A1, A2, A3, A4, B1, B2, C1, C2, D3, D4, E1, E2, F1, F2, F3, F4 | 68 | A1, A2, A3, A4, B1, B2, C1, C2, D3, D4, E3, E4, F1, F2, F3, F4 |
| 69 | A1, A2, A3, A4, B1, B2, C3, C4, D1, D2, E1, E2, F1, F2, F3, F4 | 70 | A1, A2, A3, A4, B1, B2, C3, C4, D1, D2, E3, E4, F1, F2, F3, F4 |
| 71 | A1, A2, A3, A4, B1, B2, C3, C4, D3, D4, E1, E2, F1, F2, F3, F4 | 72 | A1, A2, A3, A4, B1, B2, C3, C4, D3, D4, E3, E4, F1, F2, F3, F4 |
| 73 | A1, A2, A3, A4, B3, B4, C1, C2, D1, D2, E1, E2, F1, F2, F3, F4 | 74 | A1, A2, A3, A4, B3, B4, C1, C2, D1, D2, E3, E4, F1, F2, F3, F4 |
| 75 | A1, A2, A3, A4, B3, B4, C1, C2, D3, D4, E1, E2, F1, F2, F3, F4 | 76 | A1, A2, A3, A4, B3, B4, C1, C2, D3, D4, E3, E4, F1, F2, F3, F4 |
| 77 | A1, A2, A3, A4, B3, B4, C3, C4, D1, D2, E1, E2, F1, F2, F3, F4 | 78 | A1, A2, A3, A4, B3, B4, C3, C4, D1, D2, E3, E4, F1, F2, F3, F4 |
| 79 | A1, A2, A3, A4, B3, B4, C3, C4, D3, D4, E1, E2, F1, F2, F3, F4 | 80 | A1, A2, A3, A4, B3, B4, C3, C4, D3, D4, E3, E4, F1, F2, F3, F4 |
| 81 | A1, A2, B1, B2, B3, B4, C1, C2, C3, C4, D1, D2, E1, E2, F1, F2 | 82 | A1, A2, B1, B2, C1, C2, C3, C4, D1, D2, E1, E2, F3, F4 |
| 83 | A1, A2, B1, B2, C1, C2, C3, C4, D1, D2, E3, E4, F1, F2 | 84 | A1, A2, B1, B2, B3, B4, C1, C2, C3, C4, D1, D2, E3, E4, F3, F4 |
| 85 | A1, A2, B1, B2, B3, B4, C1, C2, C3, C4, D3, D4, E1, E2, F1, F2 | 86 | A1, A2, B1, B2, B3, B4, C1, C2, C3, C4, D3, D4, E1, E2, F3, F4 |
| 87 | A1, A2, B1, B2, B3, B4, C1, C2, C3, C4, D3, D4, E3, E4, F1, F2 | 88 | A1, A2, B1, B2, B3, B4, C1, C2, C3, C4, D3, D4, E3, E4, F3, F4 |
| 89 | A3, A4, B1, B2, B3, B4, C1, C2, C3, C4, D1, D2, E1, E2, F1, F2 | 90 | A3, A4, B1, B2, B3, B4, C1, C2, C3, C4, D1, D2, E1, E2, F3, F4 |
| 91 | A3, A4, B1, B2, B3, B4, C1, C2, C3, C4, D1, D2, E3, E4, F1, F2 | 92 | A3, A4, B1, B2, B3, B4, C1, C2, C3, C4, D1, D2, E3, E4, F3, F4 |

TABLE 41-continued

| case | codebook set | case | codebook set |
|---|---|---|---|
| 93 | A3, A4, B1, B2, B3, B4, C1, C2, C3, C4, D3, D4, E1, E2, F1, F2 | 94 | A3, A4, B1, B2, B3, B4, C1, C2, C3, C4, D3, D4, E1, E2, F3, F4 |
| 95 | A3, A4, B1, B2, B3, B4, C1, C2, C3, C4, D3, D4, E3, E4, F1, F2 | 96 | A3, A4, B1, B2, B3, B4, C1, C2, C3, C4, D3, D4, E3, E4, F3, F4 |
| 97 | A1, A2, B1, B2, B3, B4, C1, C2, D1, D2, D3, D4, E1, E2, F1, F2 | 98 | A1, A2, B1, B2, B3, B4, C1, C2, D1, D2, D3, D4, E1, E2, F3, F4 |
| 99 | A1, A2, B1, B2, B3, B4, C1, C2, D1, D2, D3, D4, E3, E4, F1, F2 | 100 | A1, A2, B1, B2, B3, B4, C1, C2, D1, D2, D3, D4, E3, E4, F3, F4 |
| 101 | A1, A2, B1, B2, B3, B4, C3, C4, D1, D2, D3, D4, E1, E2, F1, F2 | 102 | A1, A2, B1, B2, B3, B4, C3, C4, D1, D2, D3, D4, E1, E2, F3, F4 |
| 103 | A1, A2, B1, B2, B3, B4, C3, C4, D1, D2, D3, D4, E3, E4, F1, F2 | 104 | A1, A2, B1, B2, B3, B4, C3, C4, D1, D2, D3, D4, E3, E4, F3, F4 |
| 105 | A3, A4, B1, B2, B3, B4, C1, C2, D1, D2, D3, D4, E1, E2, F1, F2 | 106 | A3, A4, B1, B2, B3, B4, C1, C2, D1, D2, D3, D4, E1, E2, F3, F4 |
| 107 | A3, A4, B1, B2, B3, B4, C1, C2, D1, D2, D3, D4, E3, E4, F1, F2 | 108 | A3, A4, B1, B2, B3, B4, C1, C2, D1, D2, D3, D4, E3, E4, F3, F4 |
| 109 | A3, A4, B1, B2, B3, B4, C3, C4, D1, D2, D3, D4, E1, E2, F1, F2 | 110 | A3, A4, B1, B2, B3, B4, C1, C2, D1, D2, D3, D4, E1, E2, F3, F4 |
| 111 | A3, A4, B1, B2, B3, B4, C1, C2, D1, D2, D3, D4, E3, E4, F1, F2 | 112 | A3, A4, B1, B2, B3, B4, C1, C2, D1, D2, D3, D4, E3, E4, F3, F4 |
| 113 | A1, A2, B1, B2, B3, B4, C1, C2, D1, D2, E1, E2, E3, E4, F1, F2 | 114 | A1, A2, B1, B2, B3, B4, C1, C2, D1, D2, E1, E2, E3, E4, F3, F4 |
| 115 | A1, A2, B1, B2, B3, B4, C1, C2, D3, D4, E1, E2, E3, E4, F1, F2 | 116 | A1, A2, B1, B2, B3, B4, C1, C2, D3, D4, E1, E2, E3, E4, F3, F4 |
| 117 | A1, A2, B1, B2, B3, B4, C3, C4, D1, D2, E1, E2, E3, E4, F1, F2 | 118 | A1, A2, B1, B2, B3, B4, C3, C4, D1, D2, E1, E2, E3, E4, F3, F4 |
| 119 | A1, A2, B1, B2, B3, B4, C3, C4, D3, D4, E1, E2, E3, E4, F1, F2 | 120 | A1, A2, B1, B2, B3, B4, C3, C4, D3, D4, E1, E2, E3, E4, F3, F4 |
| 121 | A3, A4, B1, B2, B3, B4, C1, C2, D1, D2, E1, E2, E3, E4, F1, F2 | 122 | A3, A4, B1, B2, B3, B4, C1, C2, D1, D2, E1, E2, E3, E4, F3, F4 |
| 123 | A3, A4, B1, B2, B3, B4, C1, C2, D3, D4, E1, E2, E3, E4, F1, F2 | 1242 | A3, A4, B1, B2, B3, B4, C1, C2, D3, D4, E1, E2, E3, E4, F3, F4 |
| 125 | A3, A4, B1, B2, B3, B4, C3, C4, D1, D2, E1, E2, E3, E4, F1, F2 | 126 | A3, A4, B1, B2, B3, B4, C3, C4, D1, D2, E1, E2, E3, E4, F3, F4 |
| 127 | A3, A4, B1, B2, B3, B4, C3, C4, D3, D4, E1, E2, E3, E4, F1, F2 | 128 | A3, A4, B1, B2, B3, B4, C3, C4, D3, D4, E1, E2, E3, E4, F3, F4 |
| 129 | A1, A2, B1, B2, B3, B4, C1, C2, D1, D2, E1, E2, F1, F2, F3, F4 | 130 | A1, A2, B1, B2, B3, B4, C1, C2, D1, D2, E3, E4, F1, F2, F3, F4 |
| 131 | A1, A2, B1, B2, B3, B4, C1, C2, D3, D4, E1, E2, F1, F2, F3, F4 | 132 | A1, A2, B1, B2, B3, B4, C1, C2, D3, D4, E3, E4, F1, F2, F3, F4 |
| 133 | A1, A2, B1, B2, B3, B4, C3, C4, D1, D2, E1, E2, F1, F2, F3, F4 | 134 | A1, A2, B1, B2, B3, B4, C3, C4, D1, D2, E3, E4, F1, F2, F3, F4 |
| 135 | A1, A2, B1, B2, B3, B4, C3, C4, D3, D4, E1, E2, F1, F2, F3, F4 | 136 | A1, A2, B1, B2, B3, B4, C3, C4, D3, D4, E3, E4, F1, F2, F3, F4 |
| 137 | A3, A4, B1, B2, B3, B4, C1, C2, D1, D2, E1, E2, F1, F2, F3, F4 | 138 | A3, A4, B1, B2, B3, B4, C1, C2, D1, D2, E3, E4, F1, F2, F3, F4 |
| 139 | A3, A4, B1, B2, B3, B4, C1, C2, D3, D4, E1, E2, F1, F2, F3, F4 | 140 | A3, A4, B1, B2, B3, B4, C1, C2, D3, D4, E3, E4, F1, F2, F3, F4 |
| 141 | A3, A4, B1, B2, B3, B4, C3, C4, D1, D2, E1, E2, F1, F2, F3, F4 | 142 | A3, A4, B1, B2, B3, B4, C3, C4, D1, D2, E3, E4, F1, F2, F3, F4 |
| 143 | A3, A4, B1, B2, B3, B4, C3, C4, D3, D4, E1, E2, F1, F2, F3, F4 | 144 | A3, A4, B1, B2, B3, B4, C3, C4, D3, D4, E3, E4, F1, F2, F3, F4 |
| 145 | A1, A2, B1, B2, C1, C2, C3, C4, D1, D2, D3, D4, E1, E2, F1, F2 | 146 | A1, A2, B1, B2, C1, C2, C3, C4, D1, D2, D3, D4, E1, E2, F3, F4 |
| 147 | A1, A2, B1, B2, C1, C2, C3, C4, D1, D2, D3, D4, E3, E4, F1, F2 | 148 | A1, A2, B1, B2, C1, C2, C3, C4, D1, D2, D3, D4, E1, E2, F3, F4 |
| 149 | A1, A2, B3, B4, C1, C2, C3, C4, D1, D2, D3, D4, E1, E2, F1, F2 | 150 | A1, A2, B3, B4, C1, C2, C3, C4, D1, D2, D3, D4, E1, E2, F3, F4 |
| 151 | A1, A2, B3, B4, C1, C2, C3, C4, D1, D2, D3, D4, E3, E4, F1, F2 | 152 | A1, A2, B3, B4, C1, C2, C3, C4, D1, D2, D3, D4, E3, E4, F3, F4 |
| 153 | A3, A4, B1, B2, C1, C2, C3, C4, D1, D2, D3, D4, E1, E2, F1, F2 | 154 | A3, A4, B1, B2, C1, C2, C3, C4, D1, D2, D3, D4, E1, E2, F3, F4 |
| 155 | A3, A4, B1, B2, C1, C2, C3, C4, D1, D2, D3, D4, E3, E4, F1, F2 | 156 | A3, A4, B1, B2, C1, C2, C3, C4, D1, D2, D3, D4, E3, E4, F3, F4 |
| 157 | A3, A4, B3, B4, C1, C2, C3, C4, D1, D2, D3, D4, E1, E2, F1, F2 | 158 | A3, A4, B3, B4, C1, C2, C3, C4, D1, D2, D3, D4, E1, E2, F3, F4 |
| 159 | A3, A4, B3, B4, C1, C2, C3, C4, D1, D2, D3, D4, E3, E4, F1, F2 | 160 | A3, A4, B3, B4, C1, C2, C3, C4, D1, D2, D3, D4, E3, E4, F3, F4 |
| 161 | A1, A2, B1, B2, C1, C2, C3, C4, D1, D2, E1, E2, E3, E4, F1, F2 | 162 | A1, A2, B1, B2, C1, C2, C3, C4, D1, D2, E1, E2, E3, E4, F3, F4 |
| 163 | A1, A2, B1, B2, C1, C2, C3, C4, D3, D4, E1, E2, E3, E4, F1, F2 | 164 | A1, A2, B1, B2, C1, C2, C3, C4, D3, D4, E1, E2, E3, E4, F3, F4 |
| 165 | A1, A2, B3, B4, C1, C2, C3, C4, D1, D2, E1, E2, E3, E4, F1, F2 | 166 | A1, A2, B3, B4, C1, C2, C3, C4, D1, D2, E1, E2, E3, E4, F3, F4 |
| 167 | A1, A2, B3, B4, C1, C2, C3, C4, D3, D4, E1, E2, E3, E4, F1, F2 | 168 | A1, A2, B3, B4, C1, C2, C3, C4, D3, D4, E1, E2, E3, E4, F3, F4 |
| 169 | A3, A4, B1, B2, C1, C2, C3, C4, D1, D2, E1, E2, E3, E4, F1, F2 | 170 | A3, A4, B1, B2, C1, C2, C3, C4, D1, D2, E1, E2, E3, E4, F3, F4 |

TABLE 41-continued

| case | codebook set | case | codebook set |
|---|---|---|---|
| 171 | A3, A4, B1, B2, C1, C2, C3, C4, D3, D4, E1, E2, E3, E4, F1, F2 | 172 | A3, A4, B1, B2, C1, C2, C3, C4, D3, D4, E1, E2, E3, E4, F3, F4 |
| 173 | A3, A4, B3, B4, C1, C2, C3, C4, D1, D2, E1, E2, E3, E4, F1, F2 | 174 | A3, A4, B3, B4, C1, C2, C3, C4, D1, D2, E1, E2, E3, E4, F3, F4 |
| 175 | A3, A4, B3, B4, C1, C2, C3, C4, D3, D4, E1, E2, E3, E4, F1, F2 | 176 | A3, A4, B3, B4, C1, C2, C3, C4, D3, D4, E1, E2, E3, E4, F3, F4 |
| 177 | A1, A2, B1, B2, C1, C2, C3, C4, D1, D2, E1, E2, F1, F2, F3, F4 | 178 | A1, A2, B1, B2, C1, C2, C3, C4, D1, D2, E3, E4, F1, F2, F3, F4 |
| 179 | A1, A2, B1, B2, C1, C2, C3, C4, D3, D4, E1, E2, F1, F2, F3, F4 | 180 | A1, A2, B1, B2, C1, C2, C3, C4, D3, D4, E3, E4, F1, F2, F3, F4 |
| 181 | A1, A2, B3, B4, C1, C2, C3, C4, D1, D2, E1, E2, F1, F2, F3, F4 | 182 | A1, A2, B3, B4, C1, C2, C3, C4, D1, D2, E3, E4, F1, F2, F3, F4 |
| 183 | A1, A2, B3, B4, C1, C2, C3, C4, D3, D4, E1, E2, F1, F2, F3, F4 | 184 | A1, A2, B3, B4, C1, C2, C3, C4, D3, D4, E3, E4, F1, F2, F3, F4 |
| 185 | A3, A4, B1, B2, C1, C2, C3, C4, D1, D2, E1, E2, F1, F2, F3, F4 | 186 | A3, A4, B1, B2, C1, C2, C3, C4, D1, D2, E3, E4, F1, F2, F3, F4 |
| 187 | A3, A4, B1, B2, C1, C2, C3, C4, D3, D4, E1, E2, F1, F2, F3, F4 | 188 | A3, A4, B1, B2, C1, C2, C3, C4, D3, D4, E3, E4, F1, F2, F3, F4 |
| 189 | A3, A4, B3, B4, C1, C2, C3, C4, D1, D2, E1, E2, F1, F2, F3, F4 | 190 | A3, A4, B3, B4, C1, C2, C3, C4, D1, D2, E3, E4, F1, F2, F3, F4 |
| 191 | A3, A4, B3, B4, C1, C2, C3, C4, D3, D4, E1, E2, F1, F2, F3, F4 | 192 | A3, A4, B3, B4, C1, C2, C3, C4, D3, D4, E3, E4, F1, F2, F3, F4 |
| 193 | A1, A2, B1, B2, C1, C2, D1, D2, D3, D4, E1, E2, E3, E4, F1, F2 | 194 | A1, A2, B1, B2, C1, C2, D1, D2, D3, D4, E1, E2, E3, E4, F3, F4 |
| 195 | A1, A2, B1, B2, C3, C4, D1, D2, D3, D4, E1, E2, E3, E4, F1, F2 | 196 | A1, A2, B1, B2, C3, C4, D1, D2, D3, D4, E1, E2, E3, E4, F3, F4 |
| 197 | A1, A2, B3, B4, C1, C2, D1, D2, D3, D4, E1, E2, E3, E4, F1, F2 | 198 | A1, A2, B3, B4, C1, C2, D1, D2, D3, D4, E1, E2, E3, E4, F3, F4 |
| 199 | A1, A2, B3, B4, C3, C4, D1, D2, D3, D4, E1, E2, E3, E4, F1, F2 | 200 | A1, A2, B3, B4, C3, C4, D1, D2, D3, D4, E1, E2, E3, E4, F3, F4 |
| 201 | A3, A4, B1, B2, C1, C2, D1, D2, D3, D4, E1, E2, E3, E4, F1, F2 | 202 | A3, A4, B1, B2, C1, C2, D1, D2, D3, D4, E1, E2, E3, E4, F3, F4 |
| 203 | A3, A4, B1, B2, C3, C4, D1, D2, D3, D4, E1, E2, E3, E4, F1, F2 | 204 | A3, A4, B1, B2, C3, C4, D1, D2, D3, D4, E1, E2, E3, E4, F3, F4 |
| 205 | A3, A4, B3, B4, C1, C2, D1, D2, D3, D4, E1, E2, E3, E4, F1, F2 | 206 | A3, A4, B3, B4, C1, C2, D1, D2, D3, D4, E1, E2, E3, E4, F3, F4 |
| 207 | A3, A4, B3, B4, C3, C4, D1, D2, D3, D4, E1, E2, E3, E4, F1, F2 | 208 | A3, A4, B3, B4, C3, C4, D1, D2, D3, D4, E1, E2, E3, E4, F3, F4 |
| 209 | A1, A2, B1, B2, C1, C2, D1, D2, D3, D4, E1, E2, F1, F2, F3, F4 | 210 | A1, A2, B1, B2, C1, C2, D1, D2, D3, D4, E3, E4, F1, F2, F3, F4 |
| 211 | A1, A2, B1, B2, C3, C4, D1, D2, D3, D4, E1, E2, F1, F2, F3, F4 | 212 | A1, A2, B1, B2, C3, C4, D1, D2, D3, D4, E3, E4, F1, F2, F3, F4 |
| 213 | A1, A2, B3, B4, C1, C2, D1, D2, D3, D4, E1, E2, F1, F2, F3, F4 | 214 | A1, A2, B3, B4, C1, C2, D1, D2, D3, D4, E3, E4, F1, F2, F3, F4 |
| 215 | A1, A2, B3, B4, C3, C4, D1, D2, D3, D4, E1, E2, F1, F2, F3, F4 | 216 | A1, A2, B3, B4, C3, C4, D1, D2, D3, D4, E3, E4, F1, F2, F3, F4 |
| 217 | A3, A4, B1, B2, C1, C2, D1, D2, D3, D4, E1, E2, F1, F2, F3, F4 | 218 | A3, A4, B1, B2, C1, C2, D1, D2, D3, D4, E3, E4, F1, F2, F3, F4 |
| 219 | A3, A4, B1, B2, C3, C4, D1, D2, D3, D4, E1, E2, F1, F2, F3, F4 | 220 | A3, A4, B1, B2, C3, C4, D1, D2, D3, D4, E3, E4, F1, F2, F3, F4 |
| 221 | A3, A4, B3, B4, C1, C2, D1, D2, D3, D4, E1, E2, F1, F2, F3, F4 | 222 | A3, A4, B3, B4, C1, C2, D1, D2, D3, D4, E3, E4, F1, F2, F3, F4 |
| 223 | A3, A4, B3, B4, C3, C4, D1, D2, D3, D4, E1, E2, F1, F2, F3, F4 | 224 | A3, A4, B3, B4, C3, C4, D1, D2, D3, D4, E3, E4, F1, F2, F3, F4 |
| 225 | A1, A2, B1, B2, C1, C2, D1, D2, E1, E2, E3, E4, F1, F2, F3, F4 | 226 | A1, A2, B1, B2, C1, C2, D3, D4, E1, E2, E3, E4, F1, F2, F3, F4 |
| 227 | A1, A2, B1, B2, C3, C4, D1, D2, E1, E2, E3, E4, F1, F2, F3, F4 | 228 | A1, A2, B1, B2, C3, C4, D3, D4, E1, E2, E3, E4, F1, F2, F3, F4 |
| 229 | A1, A2, B3, B4, C1, C2, D1, D2, E1, E2, E3, E4, F1, F2, F3, F4 | 230 | A1, A2, B3, B4, C1, C2, D3, D4, E1, E2, E3, E4, F1, F2, F3, F4 |
| 231 | A1, A2, B3, B4, C3, C4, D1, D2, E1, E2, E3, E4, F1, F2, F3, F4 | 232 | A1, A2, B3, B4, C3, C4, D3, D4, E1, E2, E3, E4, F1, F2, F3, F4 |
| 233 | A3, A4, B1, B2, C1, C2, D1, D2, E1, E2, E3, E4, F1, F2, F3, F4 | 234 | A3, A4, B1, B2, C1, C2, D3, D4, E1, E2, E3, E4, F1, F2, F3, F4 |
| 235 | A3, A4, B1, B2, C3, C4, D1, D2, E1, E2, E3, E4, F1, F2, F3, F4 | 236 | A3, A4, B1, B2, C3, C4, D3, D4, E1, E2, E3, E4, F1, F2, F3, F4 |
| 237 | A3, A4, B3, B4, C1, C2, D1, D2, E1, E2, E3, E4, F1, F2, F3, F4 | 238 | A3, A4, B3, B4, C1, C2, D3, D4, E1, E2, E3, E4, F1, F2, F3, F4 |
| 239 | A3, A4, B3, B4, C3, C4, D1, D2, E1, E2, E3, E4, F1, F2, F3, F4 | 240 | A3, A4, B3, B4, C3, C4, D3, D4, E1, E2, E3, E4, F1, F2, F3, F4 |

(4) Now, a method of configuring a codebook set having 20 elements will be described.

A. In the method of configuring the codebook set having 20 elements, 5 groups are selected from the groups A, B, C, D, E, and F of Table 33. Each of the selected groups may be configured with QPSK.

Table 42 below shows examples of a codebook set having 20 elements by selecting 5 groups.

TABLE 42

| CASE | codebook set |
|---|---|
| 1 | A1, A2, A3, A4, B1, B2, B3, B4, C1, C2, C3, C4, D1, D2, D3, D4, E1, E2, E3, E4 |
| 2 | A1, A2, A3, A4, B1, B2, B3, B4, C1, C2, C3, C4, D1, D2, D3, D4, F1, F2, F3, F4 |
| 3 | A1, A2, A3, A4, B1, B2, B3, B4, C1, C2, C3, C4, E1, E2, E3, E4, F1, F2, F3, F4 |

TABLE 42-continued

| CASE | codebook set |
|---|---|
| 4 | A1, A2, A3, A4, B1, B2, B3, B4, D1, D2, D3, D4, E1, E2, E3, E4, F1, F2, F3, F4 |
| 5 | A1, A2, A3, A4, C1, C2, C3, C4, D1, D2, D3, D4, E1, E2, E3, E4, F1, F2, F3, F4 |
| 6 | B1, B2, B3, B4, C1, C2, C3, C4, D1, D2, D3, D4, E1, E2, E3, E4, F1, F2, F3, F4 |

B. In another method of configuring a codebook set having 20 elements, among the groups A, B, C, D, E, and F of Table 33, four groups may be configured with QPSK, and the remaining two groups may be configured with BPSK.

Table 43 below shows examples of a codebook set configured in this method.

TABLE 43

| CASE | codebook set | CASE | codebook set |
|---|---|---|---|
| 1 | A1, A2, A3, A4, B1, B2, B3, B4, C1, C2, C3, C4, D1, D2, D3, D4, E1, E2, F1, F2 | 2 | A1, A2, A3, A4, B1, B2, B3, B4, C1, C2, C3, C4, D1, D2, D3, D4, E1, E2, F3, F4 |
| 3 | A1, A2, A3, A4, B1, B2, B3, B4, C1, C2, C3, C4, D1, D2, D3, D4, E3, E4, F1, F2 | 4 | A1, A2, A3, A4, B1, B2, B3, B4, C1, C2, C3, C4, D1, D2, D3, D4, E3, E4, F3, F4 |
| 5 | A1, A2, A3, A4, B1, B2, B3, B4, C1, C2, C3, C4, D1, D2, E1, E2, E3, E4, F1, F2 | 6 | A1, A2, A3, A4, B1, B2, B3, B4, C1, C2, C3, C4, D1, D2, E1, E2, E3, E4, F3, F4 |
| 7 | A1, A2, A3, A4, B1, B2, B3, B4, C1, C2, C3, C4, D3, D4, E1, E2, E3, E4, F1, F2 | 8 | A1, A2, A3, A4, B1, B2, B3, B4, C1, C2, C3, C4, D3, D4, E1, E2, E3, E4, F3, F4 |
| 9 | A1, A2, A3, A4, B1, B2, B3, B4, C1, C2, D1, D2, D3, D4, E1, E2, E3, E4, F1, F2 | 10 | A1, A2, A3, A4, B1, B2, B3, B4, C1, C2, D1, D2, D3, D4, E1, E2, E3, E4, F3, F4 |
| 11 | A1, A2, A3, A4, B1, B2, B3, B4, C3, C4, D1, D2, D3, D4, E1, E2, E3, E4, F1, F2 | 12 | A1, A2, A3, A4, B1, B2, B3, B4, C3, C4, D1, D2, D3, D4, E1, E2, E3, E4, F3, F4 |
| 13 | A1, A2, A3, A4, B1, B2, C1, C2, C3, C4, D1, D2, D3, D4, E1, E2, E3, E4, F1, F2 | 14 | A1, A2, A3, A4, B1, B2, C1, C2, C3, C4, D1, D2, D3, D4, E1, E2, E3, E4, F3, F4 |
| 15 | A1, A2, A3, A4, B3, B4, C1, C2, C3, C4, D1, D2, D3, D4, E1, E2, E3, E4, F1, F2 | 16 | A1, A2, A3, A4, B3, B4, C1, C2, C3, C4, D1, D2, D3, D4, E1, E2, E3, E4, F3, F4 |
| 17 | A1, A2, B1, B2, B3, B4, C1, C2, C3, C4, D1, D2, D3, D4, E1, E2, E3, E4, F1, F2 | 18 | A1, A2, B1, B2, B3, B4, C1, C2, C3, C4, D1, D2, D3, D4, E1, E2, E3, E4, F3, F4 |
| 19 | A3, A4, B1, B2, B3, B4, C1, C2, C3, C4, D1, D2, D3, D4, E1, E2, E3, E4, F1, F2 | 20 | A3, A4, B1, B2, B3, B4, C1, C2, C3, C4, D1, D2, D3, D4, E1, E2, E3, E4, F3, F4 |
| 21 | A1, A2, A3, A4, B1, B2, B3, B4, C1, C2, C3, C4, D1, D2, E1, E2, F1, F2, F3, F4 | 22 | A1, A2, A3, A4, B1, B2, B3, B4, C1, C2, C3, C4, D1, D2, E3, E4, F1, F2, F3, F4 |
| 23 | A1, A2, A3, A4, B1, B2, B3, B4, C1, C2, C3, C4, D3, D4, E1, E2, F1, F2, F3, F4 | 24 | A1, A2, A3, A4, B1, B2, B3, B4, C1, C2, C3, C4, D3, D4, E3, E4, F1, F2, F3, F4 |
| 25 | A1, A2, A3, A4, B1, B2, B3, B4, C1, C2, D1, D2, D3, D4, E1, E2, F1, F2, F3, F4 | 26 | A1, A2, A3, A4, B1, B2, B3, B4, C1, C2, D1, D2, D3, D4, E3, E4, F1, F2, F3, F4 |
| 27 | A1, A2, A3, A4, B1, B2, B3, B4, C3, C4, D1, D2, D3, D4, E1, E2, F1, F2, F3, F4 | 28 | A1, A2, A3, A4, B1, B2, B3, B4, C3, C4, D1, D2, D3, D4, E3, E4, F1, F2, F3, F4 |
| 29 | A1, A2, A3, A4, B1, B2, C1, C2, C3, C4, D1, D2, D3, D4, E1, E2, F1, F2, F3, F4 | 30 | A1, A2, A3, A4, B1, B2, C1, C2, C3, C4, D1, D2, D3, D4, E3, E4, F1, F2, F3, F4 |
| 31 | A1, A2, A3, A4, B3, B4, C1, C2, C3, C4, D1, D2, D3, D4, E1, E2, F1, F2, F3, F4 | 32 | A1, A2, A3, A4, B3, B4, C1, C2, C3, C4, D1, D2, D3, D4, E3, E4, F1, F2, F3, F4 |
| 33 | A1, A2, B1, B2, B3, B4, C1, C2, C3, C4, D1, D2, D3, D4, E1, E2, F1, F2, F3, F4 | 34 | A1, A2, B1, B2, B3, B4, C1, C2, C3, C4, D1, D2, D3, D4, E3, E4, F1, F2, F3, F4 |
| 35 | A3, A4, B1, B2, B3, B4, C1, C2, C3, C4, D1, D2, D3, D4, E1, E2, F1, F2, F3, F4 | 36 | A3, A4, B1, B2, B3, B4, C1, C2, C3, C4, D1, D2, D3, D4, E4, E4, F1, F2, F3, F4 |
| 37 | A1, A2, A3, A4, B1, B2, B3, B4, C1, C2, D1, D2, E1, E2, E3, E4, F1, F2, F3, F4 | 38 | A1, A2, A3, A4, B1, B2, B3, B4, C1, C2, D3, D4, E1, E2, E3, E4, F1, F2, F3, F4 |
| 39 | A1, A2, A3, A4, B1, B2, B3, B4, C3, C4, D1, D2, E1, E2, E3, E4, F1, F2, F3, F4 | 40 | A1, A2, A3, A4, B1, B2, B3, B4, C3, C4, D3, D4, E1, E2, E3, E4, F1, F2, F3, F4 |
| 41 | A1, A2, A3, A4, B1, B2, C1, C2, C3, C4, D1, D2, E1, E2, E3, E4, F1, F2, F3, F4 | 42 | A1, A2, A3, A4, B1, B2, C1, C2, C3, C4, D3, D4, E1, E2, E3, E4, F1, F2, F3, F4 |
| 43 | A1, A2, A3, A4, B3, B4, C1, C2, C3, C4, D1, D2, E1, E2, E3, E4, F1, F2, F3, F4 | 44 | A1, A2, A3, A4, B3, B4, C1, C2, C3, C4, D3, D4, E1, E2, E3, E4, F1, F2, F3, F4 |
| 45 | A1, A2, B1, B2, B3, B4, C1, C2, C3, C4, D1, D2, E1, E2, E3, E4, F1, F2, F3, F4 | 46 | A1, A2, B1, B2, B3, B4, C1, C2, C3, C4, D3, D4, E1, E2, E3, E4, F1, F2, F3, F4 |
| 47 | A3, A4, B1, B2, B3, B4, C1, C2, C3, C4, D1, D2, E1, E2, E3, E4, F1, F2, F3, F4 | 48 | A3, A4, B1, B2, B3, B4, C1, C2, C3, C4, D3, D4, E1, E2, E3, E4, F1, F2, F3, F4 |
| 49 | A1, A2, A3, A4, B1, B2, C1, C2, D1, D2, D3, D4, E1, E2, E3, E4, F1, F2, F3, F4 | 50 | A1, A2, A3, A4, B1, B2, C3, C4, D1, D2, D3, D4, E1, E2, E3, E4, F1, F2, F3, F4 |
| 51 | A1, A2, A3, A4, B3, B4, C1, C2, D1, D2, D3, D4, E1, E2, E3, E4, F1, F2, F3, F4 | 52 | A1, A2, A3, A4, B3, B4, C3, C4, D1, D2, D3, D4, E1, E2, E3, E4, F1, F2, F3, F4 |
| 53 | A1, A2, B1, B2, B3, B4, C1, C2, D1, D2, D3, D4, E1, E2, E3, E4, F1, F2, F3, F4 | 54 | A1, A2, B1, B2, B3, B4, C3, C4, D1, D2, D3, D4, E1, E2, E3, E4, F1, F2, F3, F4 |

TABLE 43-continued

| CASE | codebook set | CASE | codebook set |
|---|---|---|---|
| 55 | A3, A4, B1, B2, B3, B4, C1, C2, D1, D2, D3, D4, E1, E2, E3, E4, F1, F2, F3, F4 | 56 | A3, A4, B1, B2, B3, B4, C3, C4, D1, D2, D3, D4, E1, E2, E3, E4, F1, F2, F3, F4 |
| 57 | A1, A2, B1, B2, C1, C2, C3, C4, D1, D2, D3, D4, E1, E2, E3, E4, F1, F2, F3, F4 | 58 | A1, A2, B3, B4, C1, C2, C3, C4, D1, D2, D3, D4, E1, E2, E3, E4, F1, F2, F3, F4 |
| 59 | A3, A4, B1, B2, C1, C2, C3, C4, D1, D2, D3, D4, E1, E2, E3, E4, F1, F2, F3, F4 | 60 | A3, A4, B3, B4, C1, C2, C3, C4, D1, D2, D3, D4, E1, E2, E3, E4, F1, F2, F3, F4 |

The present invention can be used when configuring a rank-3 precoding weight to have a PAPR of single-antenna transmission by using an antenna combination vector for combining two antennas and an antenna selection vector for selecting one antenna from four physical antennas.

A transmitter transmits a codeword through a physical antenna by performing encoding, modulation, layer mapping, DFT, precoding, resource mapping, and OFDM signal generation. An output of a precoder included in the transmitter is denoted by $X(i)=[x^{(0)}(i)\ x^{(1)}(i)\ x^{(2)}(i)]^T$, and an output of the precoder is denoted by $Y(i)=[y^{(0)}(i)\ y^{(1)}(i)\ y^{(2)}(i)\ y^{(3)}(i)]^T$. If a precoding weight of the precoder is denoted by $W(i)$, it can be expressed by $Y(i)=W(i) \cdot X(i)$. In this case, $W(i)$ can be expressed by Equation 18 below.

$$W(i)=C(i)P_k, i=0, 1, \ldots, M_{symb}^{ap}-1,$$
$$M_{symb}^{ap}=M_{symb}^{layer}$$
[Equation 18]

In Equation 18, $P_k=P_{3k}$ and k=mod(s,6), where k=1, ..., 6 and s is a symbol or slot index.

Herein, a permutation vector $P_{3k}$ can be expressed by Table 44 below.

TABLE 44

| (1) 1/2/3 | (2) 1/3/2 | (3) 2/1/3 |
|---|---|---|
| $P_{31} = \begin{bmatrix} 1 & 0 & 0 \\ 0 & 1 & 0 \\ 0 & 0 & 1 \end{bmatrix}$ | $P_{32} = \begin{bmatrix} 1 & 0 & 0 \\ 0 & 0 & 1 \\ 0 & 1 & 0 \end{bmatrix}$ | $P_{33} = \begin{bmatrix} 0 & 1 & 0 \\ 1 & 0 & 0 \\ 0 & 0 & 1 \end{bmatrix}$ |
| (4) 2/3/1 | (5) 3/1/2 | (6) 3/2/1 |
| $P_{34} = \begin{bmatrix} 0 & 1 & 0 \\ 0 & 0 & 1 \\ 1 & 0 & 0 \end{bmatrix}$ | $P_{35} = \begin{bmatrix} 0 & 0 & 1 \\ 1 & 0 & 0 \\ 0 & 1 & 0 \end{bmatrix}$ | $P_{36} = \begin{bmatrix} 0 & 0 & 1 \\ 0 & 1 & 0 \\ 1 & 0 & 0 \end{bmatrix}$ |

In addition, C(i) can be expressed by Table 45 below.

TABLE 45

$$C_{31} = \alpha \begin{bmatrix} a & 0 & 0 \\ be^{j\theta_k} & 0 & 0 \\ 0 & 1 & 0 \\ 0 & 0 & 1 \end{bmatrix} \quad C_{32} = \alpha \begin{bmatrix} a & 0 & 0 \\ 0 & 1 & 0 \\ be^{j\theta_k} & 0 & 0 \\ 0 & 0 & 1 \end{bmatrix}$$

$$C_{33} = \alpha \begin{bmatrix} a & 0 & 0 \\ 0 & 1 & 0 \\ 0 & 0 & 1 \\ be^{j\theta_k} & 0 & 0 \end{bmatrix} \quad C_{34} = \alpha \begin{bmatrix} 0 & 1 & 0 \\ a & 0 & 0 \\ be^{j\theta_k} & 0 & 0 \\ 0 & 0 & 1 \end{bmatrix}$$

$$C_{35} = \alpha \begin{bmatrix} 0 & 1 & 0 \\ a & 0 & 0 \\ 0 & 0 & 1 \\ be^{j\theta_k} & 0 & 0 \end{bmatrix} \quad C_{36} = \alpha \begin{bmatrix} 0 & 1 & 0 \\ 0 & 0 & 1 \\ a & 0 & 0 \\ be^{j\theta_k} & 0 & 0 \end{bmatrix}$$

In Table 45, a is a power scaling factor, and may have any one of values {1, 1/2, 1/√2(, 1/root 2)}. a and b are power scaling factors, and may have any one of values {1, 1/2, 1/√2 (, 1/root 2)}. $\exp(j\theta_k)$ may have a complex value. For example, $\exp(j\theta_k)$ may have a value {1, (1+j)/2, j, (−1+j)/2, −1, (−1−j)/2, −j, (1−j)/2} in case of 8PSK, a value {1, −1, j, −j}, in case of QPSK, and a value {1,−1} or {j, −j} in case of BPSK.

In Table 45, $C_{31}, C_{32}, C_{33}, C_{34}, C_{35},$ and $C_{36}$ respectively correspond to the groups A, B, C, D, E, and F of Table 33. Therefore, elements of the groups A, B, C, D, E, and F may be combined with the permutation vector to configure a precoding weight. A signal is transmitted through an antenna obtained by combining two virtual antennas by selecting and using any antenna combination matrices of Table 45 above. Layer swapping may be achieved on a symbol or slot basis by using the permutation matrix of Table 44 above so that the virtual antenna can experience an average spatial channel.

In case of multi-codeword transmission, different antenna combination matrices and permutation matrices are used on a symbol or slot basis, so that each codeword can experience all antenna channels. In addition, a fixed antenna combination matrix may be used, and different permutation matrices may be used on a symbol or slot basis.

For example, in case of using a matrix $C_{21}$, an antenna #1 and an antenna #2 are combined, and thus data of three virtual antennas is transmitted through antennas #(1, 2), #3, and #4. Each virtual antenna can experience channels of the physical antennas #1, #2, #3, and #4 by using the permutation matrix. When three codewords are mapped to each layer, each codeword can experience channels of physical antennas #1 to #4. This can be expressed by Equation 19 below.

$$W(i)=CP_k, i=0, 1, M_{symb}^{ap}-1, M_{symb}^{ap}=M_{symb}^{layer}$$
[Equation 19]

In Equation 19, $P_k=P_{3k}$ and k=mod(s,6), where k=1, ..., 6. s denotes a symbol or slot index. C implies that the same precoding weight is used irrespective of each symbol index. For example, in case of using $C=C_{21}$, $P_k$ is given by Table 46 below.

TABLE 46

| virtual antenna | $P_{31}$ | $P_{32}$ | $P_{33}$ | $P_{34}$ | $P_{35}$ | $P_{36}$ |
|---|---|---|---|---|---|---|
| 1 | (1, 2) | (1, 2) | 3 | 3 | 4 | 4 |
| 2 | 3 | 4 | (1, 2) | 4 | (1, 2) | 3 |
| 3 | 4 | 3 | 4 | (1, 2) | 3 | (1, 2) |

The permutation matrix may use only a subset. For example, if a codeword 1 is mapped to a first layer and a codeword 2 is mapped to two layers (e.g., a second layer and a third layer) in a system having two codewords, by using three matrices of ($P_{31}, P_{33}, P_{35}$), the codeword 1 may experience a channel of physical antennas #(1, 2), #3, and #4 and the codeword 2 may experience a channel of physical antennas #3 or #4, #(1, 2) or #4, and #(1, 2) or #3.

Such a case can be expressed by Equation 20 below.

$$W(i)=CP_k, i=0, 1, M_{symb}^{ap}-1, M_{symb}^{ap}=M_{symb}^{layer}$$ [Equation 20]

In Equation 20, $P_1=P_{31}$, $P_2=P_{33}$, $P_3=P_{35}$, and k=mod(s,3), where k=1, ..., 3. s denotes a symbol or slot index.

TABLE 47

| virtual antenna | $P_{31}$ | $P_{33}$ | $P_{35}$ |
|---|---|---|---|
| 1 | (1, 2) | 3 | 4 |
| 2 | 3 | (1, 2) | (1, 2) |
| 3 | 4 | 4 | 3 |

For another example, if a codeword 1 is mapped to a first layer and a codeword 2 is mapped to two layers (e.g., a second layer and a third layer) in a system having two codewords, each codeword may experience a channel of physical antennas # (1, 2), #3, and #4 by using three matrices of ($P_{31}$, $P_{34}$, $P_{35}$). Such a case is expressed by Equation 21 below.

$$W(i)=CP_k, i=0, 1, M_{symb}^{ap}-1, M_{symb}^{ap}=M_{symb}^{layer}$$ [Equation 21]

In Equation 2, $P_1=P_{31}$, $P_2=P_{34}$, $P_3=P_{35}$, and k=mod(s,3), where k=1, ..., 3. s denotes a symbol or slot index.

Although it is described that each codeword experiences a channel of a physical channel by using a permutation matrix, the present invention is not limited to the use of the permutation matrix. A method depending on a specific rule for changing a column to which each symbol stream mapped to a column of a precoding matrix is mapped on a time basis can also be included in the present invention.

Figure 8:
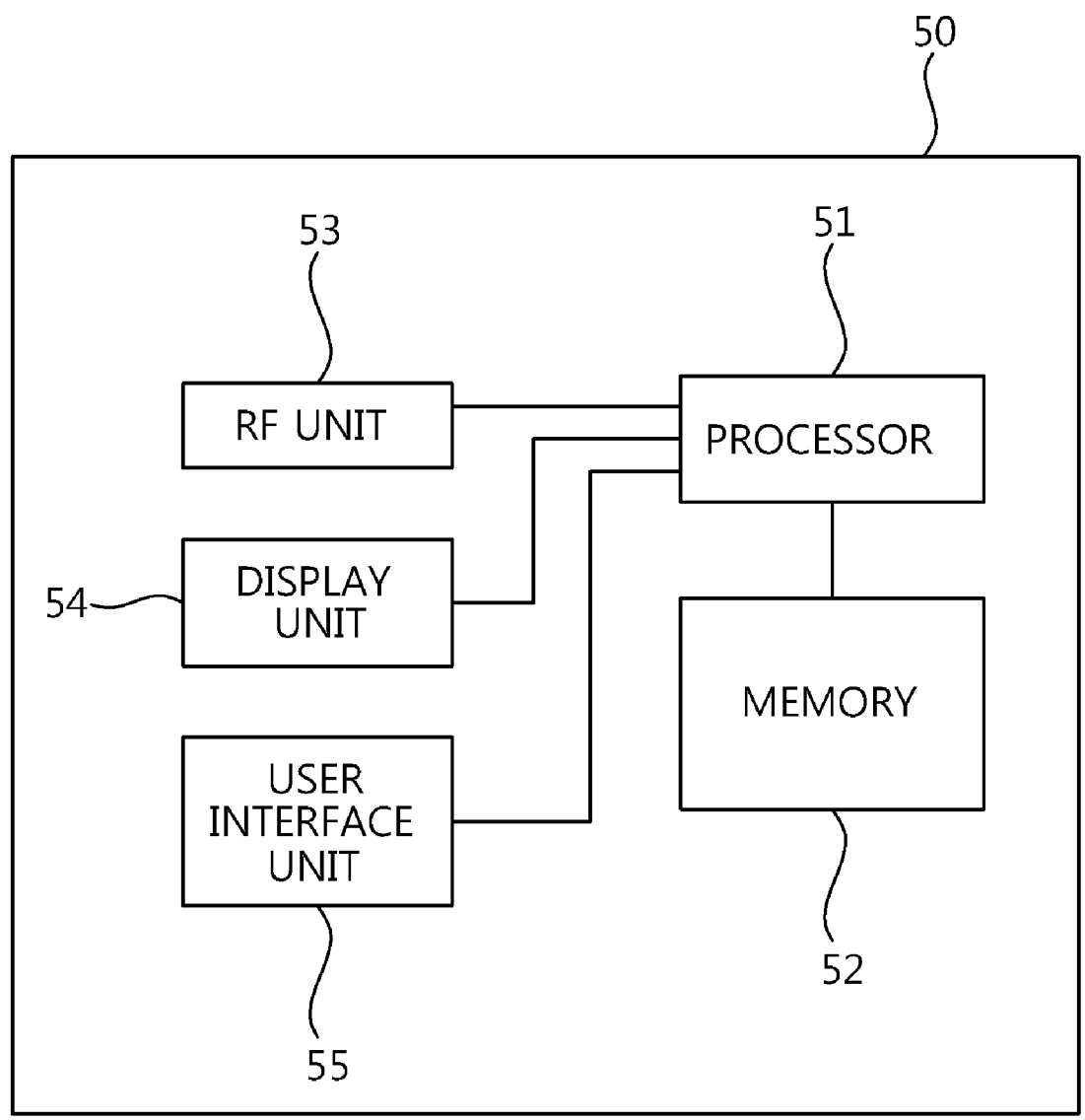
FIG. 8 is a block diagram showing constitutional elements of a user equipment.

FIG. 8 is a block diagram showing constitutional elements of a UE. A UE 50 includes a processor 51, a memory 52, a radio frequency (RF) unit 53, a display unit 54, and a user interface unit 55. The UE 50 may employ a plurality of Tx antennas.

Layers of a radio interface protocol are implemented in the processor 51. The processor 51 provides a control plane and a user plane. A function of each layer can be implemented in the processor 51. The processor 51 can implement the proposed precoding method. The memory 52 is coupled to the processor 51 and stores operating systems, applications, and general files. The memory 52 can store a codebook defined to support codebook-based precoding. The display unit 54 displays a variety of information of the UE and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into L1 layer (a first layer), L2 layer (a second layer), and L3 layer (a third layer) based on the lower three layers of the open system interconnection (OSI) model that is well-known in the communication system. A physical layer (or simply a PHY layer) belongs to the first layer and provides an information transfer service through a physical channel. A radio resource control (RRC) layer belongs to the third layer and serves to control radio resources between the UE and the network. The UE and the network exchange RRC messages via the RRC layer.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting a signal in a multiple antenna system, the method performed at a transmitter and comprising:

pre-coding the signal based on a codebook, the codebook comprising pre-coding matrices, the pre-coding matrices including $$\frac{1}{2}\begin{bmatrix} 1 & 0 & 0 \\ 1 & 0 & 0 \\ 0 & 1 & 0 \\ 0 & 0 & 1 \end{bmatrix}, \frac{1}{2}\begin{bmatrix} 1 & 0 & 0 \\ -1 & 0 & 0 \\ 0 & 1 & 0 \\ 0 & 0 & 1 \end{bmatrix}, \frac{1}{2}\begin{bmatrix} 1 & 0 & 0 \\ 0 & 1 & 0 \\ 1 & 0 & 0 \\ 0 & 0 & 1 \end{bmatrix}, \frac{1}{2}\begin{bmatrix} 1 & 0 & 0 \\ 0 & 1 & 0 \\ -1 & 0 & 0 \\ 0 & 0 & 1 \end{bmatrix},$$

$$\frac{1}{2}\begin{bmatrix} 1 & 0 & 0 \\ 0 & 1 & 0 \\ 0 & 0 & 1 \\ 1 & 0 & 0 \end{bmatrix}, \frac{1}{2}\begin{bmatrix} 1 & 0 & 0 \\ 0 & 1 & 0 \\ 0 & 0 & 1 \\ -1 & 0 & 0 \end{bmatrix}, \frac{1}{2}\begin{bmatrix} 0 & 1 & 0 \\ 1 & 0 & 0 \\ 1 & 0 & 0 \\ 0 & 0 & 1 \end{bmatrix}, \frac{1}{2}\begin{bmatrix} 0 & 1 & 0 \\ 1 & 0 & 0 \\ -1 & 0 & 0 \\ 0 & 0 & 1 \end{bmatrix},$$

$$\frac{1}{2}\begin{bmatrix} 0 & 1 & 0 \\ 1 & 0 & 0 \\ 0 & 0 & 1 \\ 1 & 0 & 0 \end{bmatrix}, \frac{1}{2}\begin{bmatrix} 0 & 1 & 0 \\ 1 & 0 & 0 \\ 0 & 0 & 1 \\ -1 & 0 & 0 \end{bmatrix}, \frac{1}{2}\begin{bmatrix} 0 & 1 & 0 \\ 0 & 0 & 1 \\ 1 & 0 & 0 \\ 1 & 0 & 0 \end{bmatrix} \text{ and}$$

$$\frac{1}{2}\begin{bmatrix} 0 & 1 & 0 \\ 0 & 0 & 1 \\ 1 & 0 & 0 \\ -1 & 0 & 0 \end{bmatrix};$$

and transmitting the pre-coded signal using a radio resource.

2. The method of claim 1, wherein the pre-coding matrices consist of $$\frac{1}{2}\begin{bmatrix} 1 & 0 & 0 \\ 1 & 0 & 0 \\ 0 & 1 & 0 \\ 0 & 0 & 1 \end{bmatrix}, \frac{1}{2}\begin{bmatrix} 1 & 0 & 0 \\ -1 & 0 & 0 \\ 0 & 1 & 0 \\ 0 & 0 & 1 \end{bmatrix}, \frac{1}{2}\begin{bmatrix} 1 & 0 & 0 \\ 0 & 1 & 0 \\ 1 & 0 & 0 \\ 0 & 0 & 1 \end{bmatrix}, \frac{1}{2}\begin{bmatrix} 1 & 0 & 0 \\ 0 & 1 & 0 \\ -1 & 0 & 0 \\ 0 & 0 & 1 \end{bmatrix},$$

$$\frac{1}{2}\begin{bmatrix} 1 & 0 & 0 \\ 0 & 1 & 0 \\ 0 & 0 & 1 \\ 1 & 0 & 0 \end{bmatrix}, \frac{1}{2}\begin{bmatrix} 1 & 0 & 0 \\ 0 & 1 & 0 \\ 0 & 0 & 1 \\ -1 & 0 & 0 \end{bmatrix}, \frac{1}{2}\begin{bmatrix} 0 & 1 & 0 \\ 1 & 0 & 0 \\ 1 & 0 & 0 \\ 0 & 0 & 1 \end{bmatrix}, \frac{1}{2}\begin{bmatrix} 0 & 1 & 0 \\ 1 & 0 & 0 \\ -1 & 0 & 0 \\ 0 & 0 & 1 \end{bmatrix},$$

-continued $$\frac{1}{2}\begin{bmatrix} 0 & 1 & 0 \\ 1 & 0 & 0 \\ 0 & 0 & 1 \\ 1 & 0 & 0 \end{bmatrix}, \frac{1}{2}\begin{bmatrix} 0 & 1 & 0 \\ 1 & 0 & 0 \\ 0 & 0 & 1 \\ -1 & 0 & 0 \end{bmatrix}, \frac{1}{2}\begin{bmatrix} 0 & 1 & 0 \\ 0 & 0 & 1 \\ 1 & 0 & 0 \\ 1 & 0 & 0 \end{bmatrix} \text{ and}$$

$$\frac{1}{2}\begin{bmatrix} 0 & 1 & 0 \\ 0 & 0 & 1 \\ 1 & 0 & 0 \\ -1 & 0 & 0 \end{bmatrix}.$$

3. The method of claim 1, wherein the radio resource comprises a Single-Carrier Frequency Division Multiple Access (SC-FDMA) signal.

4. The method of claim 1, wherein the codebook is for rank 3 transmission.

5. The method of claim 1, wherein the pre-coded signal is transmitted via four transmit antennas.

6. The method claim 1, wherein the transmitter is implemented in a user equipment.

7. A user equipment comprising:
a pre-coder for pre-coding a signal based on a codebook, the codebook comprising pre-coding matrices, the pre-coding matrices including $$\frac{1}{2}\begin{bmatrix} 1 & 0 & 0 \\ 1 & 0 & 0 \\ 0 & 1 & 0 \\ 0 & 0 & 1 \end{bmatrix}, \frac{1}{2}\begin{bmatrix} 1 & 0 & 0 \\ -1 & 0 & 0 \\ 0 & 1 & 0 \\ 0 & 0 & 1 \end{bmatrix}, \frac{1}{2}\begin{bmatrix} 1 & 0 & 0 \\ 0 & 1 & 0 \\ 1 & 0 & 0 \\ 0 & 0 & 1 \end{bmatrix}, \frac{1}{2}\begin{bmatrix} 1 & 0 & 0 \\ 0 & 1 & 0 \\ -1 & 0 & 0 \\ 0 & 0 & 1 \end{bmatrix},$$

$$\frac{1}{2}\begin{bmatrix} 1 & 0 & 0 \\ 0 & 1 & 0 \\ 0 & 0 & 1 \\ 1 & 0 & 0 \end{bmatrix}, \frac{1}{2}\begin{bmatrix} 1 & 0 & 0 \\ 0 & 1 & 0 \\ 0 & 0 & 1 \\ -1 & 0 & 0 \end{bmatrix}, \frac{1}{2}\begin{bmatrix} 0 & 1 & 0 \\ 1 & 0 & 0 \\ 1 & 0 & 0 \\ 0 & 0 & 1 \end{bmatrix}, \frac{1}{2}\begin{bmatrix} 0 & 1 & 0 \\ 1 & 0 & 0 \\ -1 & 0 & 0 \\ 0 & 0 & 1 \end{bmatrix},$$

$$\frac{1}{2}\begin{bmatrix} 0 & 1 & 0 \\ 1 & 0 & 0 \\ 0 & 0 & 1 \\ 1 & 0 & 0 \end{bmatrix}, \frac{1}{2}\begin{bmatrix} 0 & 1 & 0 \\ 1 & 0 & 0 \\ 0 & 0 & 1 \\ -1 & 0 & 0 \end{bmatrix}, \frac{1}{2}\begin{bmatrix} 0 & 1 & 0 \\ 0 & 0 & 1 \\ 1 & 0 & 0 \\ 1 & 0 & 0 \end{bmatrix} \text{ and}$$

$$\frac{1}{2}\begin{bmatrix} 0 & 1 & 0 \\ 0 & 0 & 1 \\ 1 & 0 & 0 \\ -1 & 0 & 0 \end{bmatrix};$$

and
a transmitter for transmitting the pre-coded signal using a radio resource.

8. The user equipment of claim 7, wherein the pre-coding matrices consist of $$\frac{1}{2}\begin{bmatrix} 1 & 0 & 0 \\ 1 & 0 & 0 \\ 0 & 1 & 0 \\ 0 & 0 & 1 \end{bmatrix}, \frac{1}{2}\begin{bmatrix} 1 & 0 & 0 \\ -1 & 0 & 0 \\ 0 & 1 & 0 \\ 0 & 0 & 1 \end{bmatrix}, \frac{1}{2}\begin{bmatrix} 1 & 0 & 0 \\ 0 & 1 & 0 \\ 1 & 0 & 0 \\ 0 & 0 & 1 \end{bmatrix}, \frac{1}{2}\begin{bmatrix} 1 & 0 & 0 \\ 0 & 1 & 0 \\ -1 & 0 & 0 \\ 0 & 0 & 1 \end{bmatrix},$$

$$\frac{1}{2}\begin{bmatrix} 1 & 0 & 0 \\ 0 & 1 & 0 \\ 0 & 0 & 1 \\ 1 & 0 & 0 \end{bmatrix}, \frac{1}{2}\begin{bmatrix} 1 & 0 & 0 \\ 0 & 1 & 0 \\ 0 & 0 & 1 \\ -1 & 0 & 0 \end{bmatrix}, \frac{1}{2}\begin{bmatrix} 0 & 1 & 0 \\ 1 & 0 & 0 \\ 1 & 0 & 0 \\ 0 & 0 & 1 \end{bmatrix}, \frac{1}{2}\begin{bmatrix} 0 & 1 & 0 \\ 1 & 0 & 0 \\ -1 & 0 & 0 \\ 0 & 0 & 1 \end{bmatrix},$$

$$\frac{1}{2}\begin{bmatrix} 0 & 1 & 0 \\ 1 & 0 & 0 \\ 0 & 0 & 1 \\ 1 & 0 & 0 \end{bmatrix}, \frac{1}{2}\begin{bmatrix} 0 & 1 & 0 \\ 1 & 0 & 0 \\ 0 & 0 & 1 \\ -1 & 0 & 0 \end{bmatrix}, \frac{1}{2}\begin{bmatrix} 0 & 1 & 0 \\ 0 & 0 & 1 \\ 1 & 0 & 0 \\ 1 & 0 & 0 \end{bmatrix} \text{ and}$$

$$\frac{1}{2}\begin{bmatrix} 0 & 1 & 0 \\ 0 & 0 & 1 \\ 1 & 0 & 0 \\ -1 & 0 & 0 \end{bmatrix}.$$

9. The user equipment of claim 7, wherein the radio resource comprises a Single-Carrier Frequency Division Multiple Access (SC-FDMA) signal.

10. The user equipment of claim 7, wherein the codebook is for rank 3 transmission.

11. The user equipment of claim 7, wherein the pre-coded signal is transmitted via four transmit antennas.

12. A method for transmitting a signal in a multiple antenna system, the method performed at a transmitter and comprising:
pre-coding the signal based on a codebook comprising pre-coding matrices, each pre-coding matrix containing a first column including two nonzero elements, a second column including one nonzero element, and a third column including one nonzero element; and
transmitting the pre-coded signal using a radio resource,
wherein the codebook is a 4-Tx rank 3 codebook, the nonzero elements of the first column are selected from orthogonal vector sets, and each row vector of the pre-coding matrices contains one nonzero element and two zero elements.

13. The method of claim 12, wherein the orthogonal vector sets are determined based on a Binary Phase Shift Keying (BPSK) scheme.

14. The method of claim 12, wherein each of the pre-coding matrices further contains a normalization factor, which is ½.

15. The method of claim 12, wherein the first column is an antenna combination vector and the second and third columns are an antenna selection vector.

16. The method of claim 12, wherein the codebook consists of 12 different pre-coding matrices.

* * * * *